(12) United States Patent
Thibault et al.

(10) Patent No.: US 12,146,448 B2
(45) Date of Patent: Nov. 19, 2024

(54) SYSTEM AND METHOD FOR MANAGING PISTON TEMPERATURE IN A VEHICLE

(71) Applicant: BRP-ROTAX GMBH & CO. KG, Gunskirchen (AT)

(72) Inventors: Sebastien Thibault, Sherbrooke (CA); Bruno Schuehmacher, Richmond (CA); Felix Labonte, Roxton Pond (CA); Luc Champigny, Racine (CA); Frederic Desjardins, Orford (CA); Michael Seyrl, Wels (AT); Roland Ennsmann, Gunskirchen (AT); Roland Wimmer, Eberstalzell (AT)

(73) Assignee: BRP-ROTAX GMBH & CO. KG, Valcourt (CA)

( * ) Notice: Subject to any disclaimer, the term of this patent is extended or adjusted under 35 U.S.C. 154(b) by 0 days.

(21) Appl. No.: 18/019,428

(22) PCT Filed: Aug. 4, 2021

(86) PCT No.: PCT/EP2021/071821
§ 371 (c)(1),
(2) Date: Oct. 2, 2023

(87) PCT Pub. No.: WO2022/029208
PCT Pub. Date: Feb. 10, 2022

(65) Prior Publication Data
US 2023/0358185 A1 Nov. 9, 2023

(51) Int. Cl.
*F02D 35/02* (2006.01)
*F02D 41/00* (2006.01)

(52) U.S. Cl.
CPC ....... *F02D 35/026* (2013.01); *F02D 41/0007* (2013.01); *F02D 2200/022* (2013.01);
(Continued)

(58) Field of Classification Search
CPC ............... F02D 35/026; F02D 41/0007; F02D 2200/022; F02D 2200/023;
(Continued)

(56) References Cited

U.S. PATENT DOCUMENTS 9,816,454 B1 * 11/2017 Anderson ............. F02D 41/402
10,029,567 B2   7/2018 Lefebvre et al.
(Continued)

FOREIGN PATENT DOCUMENTS

CN     102269081 B  *  4/2013
CN     113217181 A  *  8/2021   ............. F02B 47/02
(Continued)

OTHER PUBLICATIONS

Translation CN-102269081-B (Year: 2024).*
(Continued)

*Primary Examiner* — J. Todd Newton
(74) *Attorney, Agent, or Firm* — BCF LLP

(57) ABSTRACT

A vehicle including an engine; a turbocharger, an intake air flow path of the vehicle defined from air entering the vehicle, passing through the compressor, and flowing into the engine air inlet; a coolant container assembly; a temperature sensor configured for determining a temperature in the intake air flow path; and a controller configured to selectively cause cooling liquid to flow from the coolant container into the intake air flow path. A method for managing engine air intake temperature or piston temperature of a turbocharged vehicle including: sensing a temperature of fluid within the air intake flow path, determining an estimated piston temperature; and in response to the estimated piston temperature and/or the temperature of the fluid being above threshold temperatures, causing an amount of cooling liquid to flow from a coolant container to the air intake flow path.

23 Claims, 49 Drawing Sheets

(52) U.S. Cl.
CPC .......... *F02D 2200/023* (2013.01); *F02D 2200/0404* (2013.01); *F02D 2200/0406* (2013.01); *F02D 2200/101* (2013.01); *F02D 2200/703* (2013.01)

(58) Field of Classification Search
CPC ..... F02D 2200/0404; F02D 2200/0406; F02D 2200/101; F02D 2200/703; F02D 41/1448; F02D 2200/0414; F02M 25/0221; F02M 25/028; F02M 35/162; F02B 29/0493; F02B 37/12; Y02T 10/12
See application file for complete search history.

(56) References Cited

U.S. PATENT DOCUMENTS

| | | | |
|---|---|---|---|
| 10,288,012 | B2 | 5/2019 | Berkemeier et al. |
| 2002/0084125 | A1 | 7/2002 | Scheumacher et al. |
| 2009/0314005 | A1 | 12/2009 | Messmer |
| 2014/0074381 | A1 | 3/2014 | Sczomak et al. |
| 2014/0373803 | A1 | 12/2014 | Pendray |
| 2016/0237974 | A1* | 8/2016 | Pendray ............... F02M 25/028 |
| 2017/0175664 | A1 | 6/2017 | Mosburger |
| 2017/0218884 | A1* | 8/2017 | Berkemeier ......... F02C 7/1435 |
| 2018/0171864 | A1* | 6/2018 | Hakeem ................ F02B 33/40 |
| 2018/0202396 | A1 | 7/2018 | Zhang |
| 2021/0324809 | A1* | 10/2021 | Yoneya ............. F02M 25/0227 |

FOREIGN PATENT DOCUMENTS

| | | |
|---|---|---|
| DE | 102012200279 A1 | 7/2013 |
| DE | 102015103872 A1 | 10/2015 |
| JP | H1089127 A | 4/1998 |
| JP | 2006161607 A | 6/2006 |
| JP | 3901904 B2 | 4/2007 |
| JP | 4821750 B2 | 11/2011 |
| KR | 102079754 B1 | 2/2020 |
| WO | 2022029208 A2 | 2/2022 |

OTHER PUBLICATIONS

Translation CN-113217181-A (Year: 2024).*
International Search Report of PCT/EP2021/071821 issued from the ISA/EP; Richard Deseau; Jun. 8, 2022.
snowandmud.com, "Water/methanol injected Alpha! No way! | Snow and Mud Home", Apr. 26, 2021, copy received from the ISA/EP with the International Search Report of PCT/EP2023/054042.
International Search Report of PCT/EP2023/054042, Oct. 2, 2023, Vincent Schwaller.

* cited by examiner

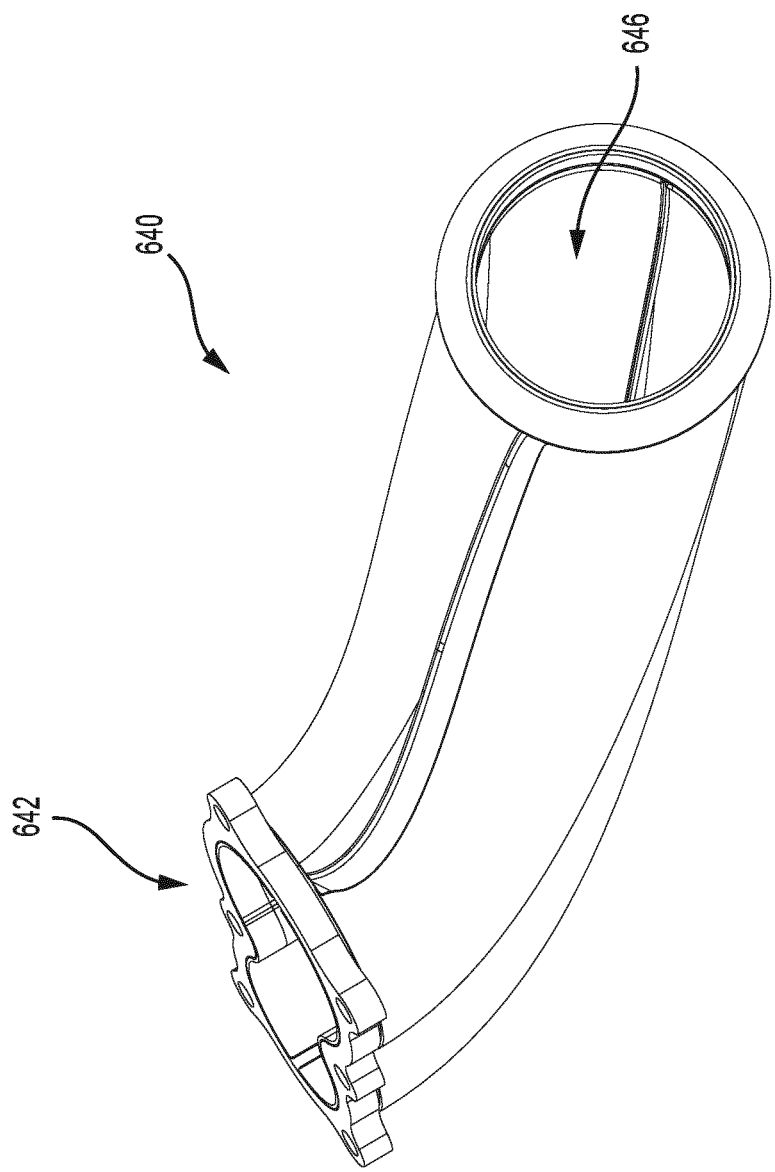

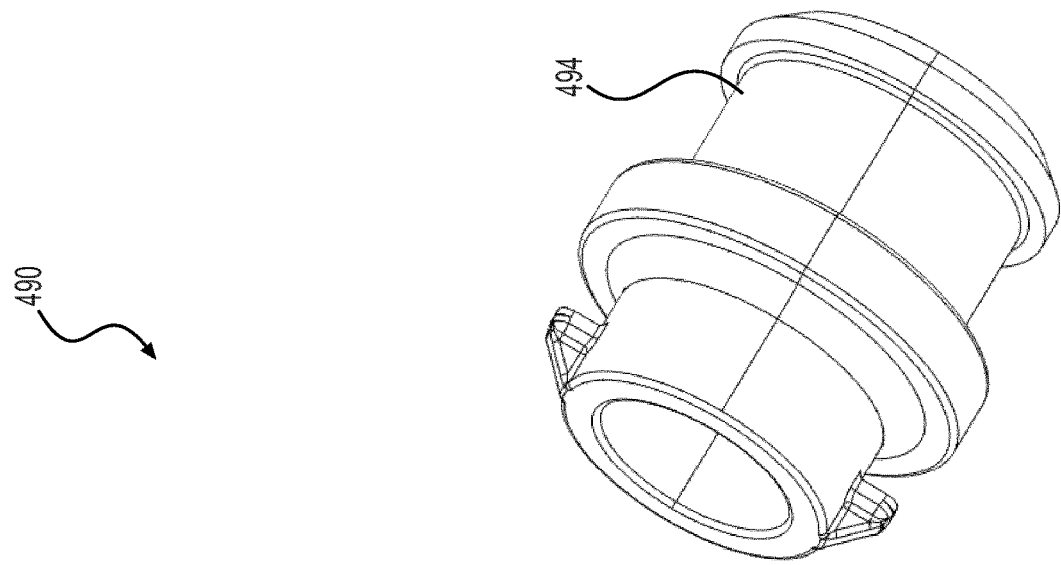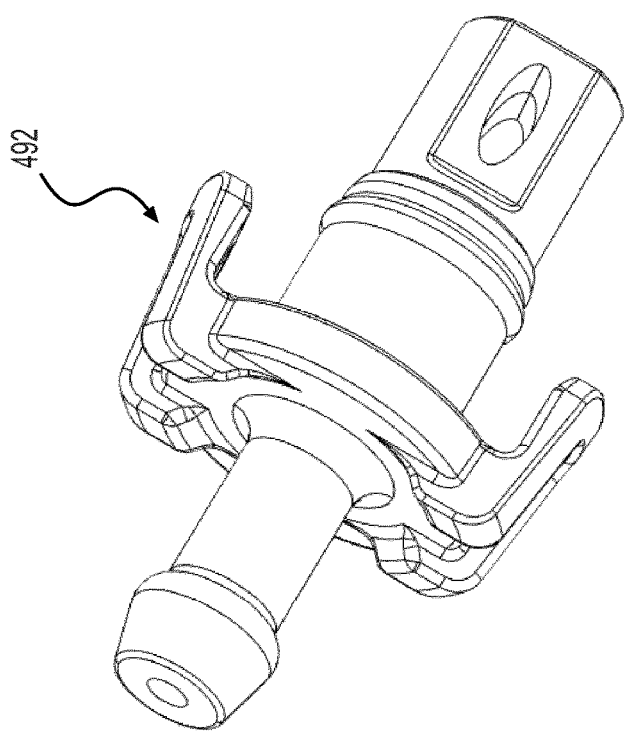
FIG. 48

SYSTEM AND METHOD FOR MANAGING PISTON TEMPERATURE IN A VEHICLE

The present application claims priority to U.S. Provisional Patent Application No. 63/061,501, entitled "Air Intake System for a Vehicle", filed Aug. 5, 2020, the entirety of which is incorporated herein by reference.

FIELD OF THE TECHNOLOGY

Field of the Technology

The present technology relates to managing piston temperature in an engine.

Background

For internal combustion engines, such as those used in snowmobiles, the efficiency of the combustion process can be increased by compressing the air entering the engine. This can be accomplished using a turbocharger connected to the air intake and exhaust systems of the snowmobiles. The compression of the air by the turbocharger may be of particular importance when the internal combustion engine is operated in environments where atmospheric pressure is low or when the air gets thinner.

While use of a turbocharger to increase air pressure can aid in improving engines efficiency, the process of compression can also cause the air to heat. Heating of air in a turbocharger can come from both pressure-related temperature rise due to the pressure-temperature relationship, as well as conduction of heat from exhaust gas turning the turbine through the turbocharger to the compressor. When compressed air from the turbocharger is too hot, the efficiency and performance of the engine can suffer due to engine detonation. Also referred to as "knocking", engine detonation decreases engine efficiency by consuming a portion of the air-gas mixture at the wrong part of the stroke cycle of the engine.

In response to engine detonation, compression by the turbocharger is generally decreased or completely shut off. This will decrease the heating of the air entering the engine (reducing or eliminating detonation), but any benefit from the turbocharger is then lost. In some cases, the engine load (RPMs) can be decreased to address detonation, but there is similarly a loss in engine efficiency or power.

One solution that has been proposed to address this issue is the inclusion of an intercooler for cooling the compressed air prior to entering the engine. The intercooler can be space consuming however, and must be both located near the engine and arranged to be cooled by oncoming air or snow projection (for snowmobiles). This can take up valuable space and complicates design in a compact engine arrangement. In some cases, an intercooler may also be less effective in high altitude, low pressure conditions due to the generally lower atmospheric air pressure.

There is thus a need for air intake systems for internal combustion engines that can benefit from the addition of a turbocharger while overcoming some of the previously known disadvantages of incorporating a turbocharger.

SUMMARY

It is an object of the present technology to ameliorate at least some of the inconveniences present in the prior art.

According to one aspect of the present technology, there is provided a vehicle including an air intake system which has a turbocharger and a coolant container fluidly connected to the intake air flow path, along which air flows prior to entering the engine. By providing cooling liquid from the coolant container to the intake air flow path, at least some heating of intake air can be reduced. When the coolant is added to the air flow upstream of the compressor, some heat produced by compression in the compressor will be absorbed by the cooling liquid in the compressor by evaporation and heating of the cooling liquid. In some cases, the coolant could be added downstream of the compressor, such that air previously heated by the compressor will cause some cooling liquid to warm and/or evaporate thereby reducing the air prior to intake in the engine.

While continuously providing cooling liquid to the air flow would ensure air cooling when the intake air becomes too hot, the coolant tanks necessary to provide enough cooling liquid for normal utilization of the vehicle would require a large volume and add a non-trivial weight to the vehicle. By the present technology, cooling liquid is thus selectively delivered to the intake air flow path when engine power or efficiency could be affected. Specifically, when the temperature of the intake air and/or an estimated piston temperature is above a threshold, i.e. when the intake air and/or the pistons 226 are heated to a temperature that causes a risk of detonation. The vehicle further includes a temperature sensor in the intake air flow path to measure the intake air temperature. A controller for the system determines an estimated piston temperature based on the sensed intake air temperature. The estimated piston temperature is retrieved from a model of piston temperature based on intake air temperature. In some cases the piston temperature model is further based on one or more engine operation values, including but not limited to: throttle position, engine speed (RPM), engine load, engine run time, ambient air temperature, ambient air pressure, engine coolant temperature, oxygen concentration in the exhaust (lambda), position of the exhaust valves, previous cooling liquid delivery, and boost pressure.

The present technology also provides methods for managing engine air intake temperature using the cooling liquid for cooling the intake air to aid in reducing engine detonation. The method includes determining the intake air temperature and/or one or more of the engine operation values, and then in turn estimating a piston temperature by retrieving the piston temperature from a model based on the air temperature and/or engine operation values. In response to the intake air temperature and/or the estimated piston temperature being above a threshold (either calculated based on operational values for the snowmobile or being a predetermined value), cooling liquid is delivered to the intake air flow path. This thus aids in reducing the intake air temperature in order to avoid or decrease engine detonation, without necessarily reducing boost from the turbocharger and/or reducing engine speed. The intake air threshold temperature and threshold piston temperature generally correspond to temperatures above which the engine begins to risk engine detonation, but different thresholds can be chosen.

To selectively deliver cooling liquid to the intake air flow path, the controller opens a valve connected to the coolant container to allow cooling liquid to flow to the intake air flow path. In such an implementation, the vehicle could include an air tube from the compressor to the coolant container to pressurize the coolant container. In this way, there is no additional weight or space taken by a pump for the coolant container-pressure from the compressed air entering the coolant container forces cooling liquid through the coolant tube when the valve is selectively opened. In some cases, a pump could be provided, however, and in such cases the controller would activate a pump connected to the coolant container to pump cooling liquid to the intake air flow path.

According to one aspect of the present technology, there is provided a vehicle including a frame; an engine supported by the frame, the engine having an engine air inlet; a turbocharger fluidly connected to the engine, the turbocharger including a compressor fluidly connected to the engine air inlet, the compressor having a compressor inlet and a compressor outlet, an intake air flow path of the vehicle being defined from air entering the vehicle, passing through the compressor inlet into the compressor, passing out of the compressor through the compressor outlet, and flowing into the engine air inlet; a coolant container assembly supported by the frame, the coolant container assembly including a coolant container for holding cooling liquid, the coolant container assembly being fluidly connected to the intake air flow path at a connection point; a controller communicatively connected with the coolant container assembly; and a temperature sensor communicatively connected with the controller, the temperature sensor being configured for determining a temperature of fluid in the intake air flow path; the controller being configured to selectively cause of an amount of cooling liquid to flow from the coolant container into the intake air flow path via the connection point based on at least the temperature of fluid determined by the temperature sensor.

In some implementations, the controller is further configured for determining an estimated piston temperature based on at least the temperature of fluid determined by the temperature sensor; and the controller is configured to selectively cause of the amount of cooling liquid to flow also based on the estimated piston temperature.

In some implementations, the controller is communicatively connected to the engine; and the controller is further configured to determine the estimated piston temperature based at least in part on at least one engine operation value received from the engine.

In some implementations, the vehicle further includes a first conduit fluidly connected to the compressor inlet at a first end, a second end of the first conduit receiving air from air surrounding the vehicle; and the connection point is located on the first conduit.

In some implementations, the vehicle further includes a second conduit fluidly connected to the compressor outlet at a first end, a second end of the second conduit being fluidly connected to the engine air inlet; and the connection point is located on the second conduit.

In some implementations, the connection point is disposed in the compressor inlet.

In some implementations, the vehicle further includes a coolant tube for delivering cooling fluid to the intake air flow path, the coolant tube being fluidly connected between the coolant container and the connection point.

In some implementations, the vehicle further includes a fuel reservoir supported by the frame; and the coolant container is disposed rearward of the fuel reservoir.

In some implementations, the coolant tube passes under the fuel reservoir.

In some implementations, the coolant container assembly further includes a pump fluidly connected to the coolant container for pumping cooling fluid through the coolant tube.

In some implementations, the coolant container assembly further includes a valve for controlling flow of cooling liquid, the valve being disposed between the coolant container and the coolant tube, the valve being communicatively connected to the controller.

In some implementations, the valve is a solenoid valve.

In some implementations, the compressor is fluidly connected to the coolant container; and when the vehicle is in use, air flows from the compressor to the coolant container to pressurize the coolant container.

In some implementations, a first end of the coolant tube is fluidly connected to the coolant container; and the vehicle further includes an injection nozzle connected to a second end of the coolant tube.

In some implementations, the vehicle further includes at least one ski connected to the frame; and the vehicle is a snowmobile.

In some implementations, the temperature sensor is configured to sense the temperature of fluid in the air intake flow path prior to passing through the compressor.

In some implementations, the temperature sensor is configured to sense the temperature of fluid having passed through the compressor.

According to another aspect of the present technology, there is provided a vehicle including a frame; an engine supported by the frame, the engine having an engine air inlet; a turbocharger fluidly connected to the engine, the turbocharger including a compressor fluidly connected to the engine air inlet, the compressor having a compressor inlet and a compressor outlet; a first conduit fluidly connected to the compressor inlet at a first end, a second end of the first conduit receiving air entering the vehicle; a second conduit fluidly connected to the compressor outlet at a first end, a second end of the second conduit being fluidly connected to the engine air inlet, an intake air flow path being defined from air entering the vehicle, passing through the first conduit, into the compressor inlet, through the compressor, out of the compressor outlet, through the second conduit, and into the engine air inlet; a coolant container assembly supported by the frame, the coolant container assembly including a coolant container for holding cooling liquid, the coolant container assembly being fluidly connected to the intake air flow path at a connection point; and a controller communicatively connected with the coolant container assembly, the controller being configured to selectively cause an amount of cooling liquid to flow from the coolant container into the intake air flow path via the connection point based on an estimated piston temperature determined by the controller.

In some implementations, the vehicle further includes a primary airbox fluidly connected between the second end of the second conduit and the engine air inlet; and a secondary airbox fluidly connected to second end of the first conduit, the secondary airbox being configured to conduct surrounding air into the vehicle.

In some implementations, the vehicle further includes a fuel reservoir supported by the frame; and the coolant container is disposed rearward of the fuel reservoir.

In some implementations, the vehicle further includes a coolant tube for delivering cooling fluid to the intake air flow path, the coolant tube being fluidly connected between the coolant container and the connection point.

In some implementations, the coolant tube passes under the fuel reservoir.

In some implementations, the coolant container assembly further includes a pump fluidly connected to the coolant container for pumping cooling fluid through the coolant tube.

In some implementations, the coolant container assembly further includes a valve for controlling flow of cooling liquid, the valve being disposed between the coolant container and the coolant tube, the valve being communicatively connected to the controller.

In some implementations, the valve is a solenoid valve.

In some implementations, the vehicle further includes the compressor is fluidly connected to the coolant container; and when the vehicle is in use, air flows from the compressor to the coolant container to pressurize the coolant container.

In some implementations, a first end of the coolant tube is fluidly connected to the coolant container; and the vehicle further includes an injection nozzle connected to a second end of the coolant tube.

In some implementations, the connection point is disposed on a crankcase of the engine.

In some implementations, the vehicle further includes at least one ski connected to the frame; and the vehicle is a snowmobile.

According to yet another aspect of the present technology, there is provided a method for managing engine air intake temperature of a turbocharged vehicle. The method includes sensing, by a temperature sensor, a temperature of fluid within an air intake flow path, the air intake flow path being defined from air entering the vehicle, passing through a turbocharger and into the engine; determining, by a controller, an estimated piston temperature of a piston of the engine based on at least the temperature of fluid; and in response to at least one of the estimated piston temperature being above a threshold piston temperature and the temperature of the fluid being above a threshold fluid temperature, causing, by the controller, an amount of cooling liquid to flow from a coolant container to the air intake flow path.

In some implementations, determining the estimated piston temperature is further based on at least one engine operation value received by the controller from the engine.

In some implementations, the method further includes determining, by the controller, at least one engine operation value, the at least one engine operation value being selected from: a throttle position, an engine speed, an engine load, an engine run time, an ambient air temperature, an ambient air pressure, an oxygen concentration in exhaust, an engine coolant temperature, a position of an exhaust valve, an amount of previous cooling liquid delivery, and a boost pressure; and determining the estimated piston temperature is further based on the at least one engine operation value.

In some implementations, determining the estimated piston temperature includes retrieving, by the controller, the estimated piston temperature from a piston temperature model.

In some implementations, causing the amount of cooling liquid to be delivered includes operating, by the controller, a solenoid valve of the coolant container assembly to allow the cooling liquid to flow from the coolant container.

In some implementations, causing the amount of cooling liquid to be delivered includes operating, by the controller, a pump of the coolant container assembly to pump the cooling liquid through a coolant tube from the coolant container.

According to yet another aspect of the present technology, there is provided a method for managing engine air intake temperature of a turbocharged vehicle. The method including determining, by a controller, at least one engine operation value; retrieving, by the controller, an estimated piston temperature of a piston of the engine from a piston temperature model based on the at least one engine operation value; and in response to the estimated piston temperature being above a threshold piston temperature, causing, by the controller, an amount of cooling liquid to be delivered from a coolant container to an air intake flow path, the intake air flow path being defined from air entering the vehicle, passing through a turbocharger and into the engine.

In some implementations, the at least one engine operation value is selected from: an air temperature of air within an air intake flow path, a throttle position, an engine speed, an engine load, an engine run time, an ambient air temperature, an ambient air pressure, an oxygen concentration in exhaust, an engine coolant temperature, a position of an exhaust valve, an amount of previous cooling liquid delivery, and a boost pressure.

According to yet another aspect of the present technology, there is provided a vehicle including a frame; an engine supported by the frame, the engine having an engine air inlet; a turbocharger fluidly connected to the engine, the turbocharger including a compressor fluidly connected to the engine air inlet, the compressor having a compressor inlet and a compressor outlet, an intake air flow path of the vehicle being defined from air entering the vehicle, passing through the compressor inlet into the compressor, passing out of the compressor through the compressor outlet, and flowing into the engine air inlet; a coolant container assembly fluidly connected to the intake air flow path at a connection point, the coolant container assembly including a coolant container for holding cooling liquid supported by the frame, the compressor being fluidly connected to the coolant container where, when the vehicle is in use, air flows from the compressor to the coolant container to pressurize the coolant container; a coolant tube fluidly connecting the coolant container with the connection point; and a valve for controlling flow of cooling liquid, the valve being disposed between the coolant container and the coolant tube; and a controller communicatively connected with the valve of the coolant container assembly; and the controller being configured to selectively cause of an amount of cooling liquid to flow from the coolant container into the intake air flow path via the connection point.

According to yet another aspect of the present technology, there is provided a vehicle including a frame; an engine supported by the frame, the engine having an engine air inlet, the engine having a crankcase; a turbocharger fluidly connected to the engine, the turbocharger including a compressor fluidly connected to the engine air inlet; a coolant container assembly supported by the frame, the coolant container assembly comprising a coolant container for holding cooling liquid, the coolant container assembly being fluidly connected to the engine at a connection point; and a controller communicatively connected with the coolant container assembly, the controller being further communicatively connected with the engine, the controller being configured to selectively cause an amount of cooling liquid to flow from the coolant container to the engine via the connection point based on at least one engine operation value.

According to yet another aspect of the present technology, there is provided a method for managing temperature of a piston of an engine of a vehicle. The method includes determining, by a throttle position sensor connected to a controller, a throttle position of a throttle valve of the engine; determining, by an engine speed sensor connected to the controller, an engine speed (RPM) of the engine; and determining, by the controller, an estimated piston temperature based on at least the throttle position and the engine speed.

In some embodiments, further including determining, by the controller, a difference between a desired piston temperature and the estimated piston temperature; and modifying, by the controller, at least one engine operation value of the engine, the modifying being based at least in part on the difference between the desired piston temperature and the estimated piston temperature.

In some embodiments, further including in response to the controller determining that the estimated piston temperature is above a threshold piston temperature, modifying, by the controller, at least one engine operation value of the engine.

In some embodiments, the at least one engine operation value is at least one of: an ignition timing of the engine; a fuel pressure; an exhaust valve position; a fuel injection timing; a fuel injection quantity; and a boost pressure from a turbocharger of the vehicle.

In some embodiments further including determining a temperature gradient caused by modifying the at least one engine operation value; determining, based at least on the temperature gradient and the difference between the desired piston temperature and the estimated piston temperature, a time of modification for the at least one engine operation value; and modifying the at least one engine operation value for the time of modification.

In some embodiments, further including determining, by an engine coolant temperature sensor connected to the controller, an engine coolant temperature; determining, by an air temperature sensor connected to the controller, an intake air temperature; determining, by the controller, a revised piston temperature based on at least the estimated piston temperature, the engine coolant temperature, and the intake air temperature.

In some embodiments, further including determining at least one of: an engine coolant temperature by an engine coolant temperature sensor connected to the controller, and an intake air temperature by a temperature sensor connected to the controller; and determining, by the controller, a revised piston temperature based on the estimated piston temperature and the at least one of: the engine coolant temperature, and the intake air temperature.

In some embodiments, further including detecting, by the controller, a change in at least one engine operation value of the engine; and in response to detecting the change in the at least one engine operation value, determining a revised estimated piston temperature based at least on the estimated piston temperature and the change in the at least one engine operation value.

In some embodiments, determining the revised estimated piston temperature is further based on a time duration of the change in the at least one engine operation value.

In some embodiments, determining the estimated piston temperature based on at least the throttle position and the engine speed includes retrieving the estimated piston temperature from a temperature dataset.

In some embodiments, determining the estimated piston temperature comprises: determining a steady state temperature (TS) based on at least the throttle position and the engine speed; determining a temperature gradient (dT/dt) based on a calibration equation saved to the controller; and calculating the estimated piston temperature (T) based on the steady state temperature TS, the temperature gradient dT/dt, and a time duration (t) using a temperature determination relation of:

$$T = T_S + \frac{dT}{dt} t.$$

In some embodiments, the estimated piston temperature is recalculated for repeating time durations t.

In some embodiments, further including, in response to the estimated piston temperature being above a threshold piston temperature, causing, by the controller, an amount of cooling liquid to flow from a coolant container to an air intake flow path, the intake air flow path being defined from air entering the vehicle and into the engine.

According to yet another aspect of the present technology, there is provided a vehicle including a frame; an engine supported by the frame, the engine having at least one engine air inlet; a turbocharger fluidly connected to the engine, the turbocharger including a compressor fluidly connected to the at least one engine air inlet, the compressor having a compressor inlet and a compressor outlet, an intake air flow path of the vehicle being defined from air entering the vehicle, passing through the compressor inlet into the compressor, passing out of the compressor through the compressor outlet, and flowing into the at least one engine air inlet; a coolant container assembly supported by the frame, the coolant container assembly comprising a coolant container for holding cooling liquid, the coolant container assembly being fluidly connected to the intake air flow path at at least one connection point; and a controller communicatively connected with the coolant container assembly, the controller being configured to selectively cause of an amount of cooling liquid to flow from the coolant container into the intake air flow path via the connection point.

In some embodiments, the engine includes at least one reed valve and at least one throttle valve; and the at least one connection point is disposed on the intake air flow path between the at least one reed valve and the at least one throttle valve.

In some embodiments, further including at least one coolant-injection collar fluidly connected to the at least one engine air inlet; at least one injection nozzle connected to and extending through the at least one coolant-injection collar, the at least one injection nozzle being fluidly connected to the coolant container assembly; and wherein the at least one connection point is defined by the at least one nozzle.

In some embodiments, the at least one engine air inlet includes: a first inlet providing air to a first cylinder of the engine, and a second inlet providing air to a second cylinder of the engine; the at least one coolant-injection collar includes: a first coolant-injection collar connected to the engine and aligned with the first inlet, and a second coolant-injection collar connected to the engine and aligned with the second inlet; and the at least one injection nozzle includes: a first nozzle connected to and extending through the first coolant-injection collar, the first nozzle being fluidly connected to the coolant container assembly; and a second nozzle connected to and extending through the second coolant-injection collar, the second nozzle being fluidly connected to the coolant container assembly.

In some embodiments, the controller is communicatively connected to the engine; and the controller is configured to: determine an estimated piston temperature based at least in part on at least one engine operation value received from the engine, and selectively cause of an amount of cooling liquid to flow from the coolant container into the intake air flow path via the at least one nozzle based on at least the estimated piston temperature.

For purposes of this application, the term "fluid" is meant to include at least both gases and liquids, as well as a combination of gases and liquids.

For purposes of this application, terms related to spatial orientation such as forwardly, rearward, upwardly, downwardly, left, and right, are as they would normally be understood by a driver of the snowmobile sitting thereon in a normal riding position. Terms related to spatial orientation when describing or referring to components or sub-assemblies of the snowmobile, separately from the snowmobile, such as a heat exchanger for example, should be understood as they would be understood when these components or sub-assemblies are mounted to the snowmobile, unless specified otherwise in this application.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein. The explanations provided above regarding the above terms take precedence over explanations of these terms that may be found in any one of the documents incorporated herein by reference.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 20C is a bottom plan view of the exhaust collector of FIG. 20A;

FIG. 26 is an elevation view of an upstream side of the valve of FIG. 14;

FIG. 27 is an elevation view of a downstream side of the valve of FIG. 26;

FIG. 48 is a perspective, exploded view of coolant injection nozzles of the coolant-injection collars of FIG. 45;

It should be noted that the Figures may not be drawn to scale, except where otherwise noted.

DETAILED DESCRIPTION

The present technology is described herein with respect to a snowmobile 10 having an internal combustion engine and two skis. However, it is contemplated that some aspects of the present technology may apply to other types of vehicles such as, but not limited to, snowmobiles with a single ski, road vehicles having two, three, or four wheels, off-road vehicles, all-terrain vehicles, side-by-side vehicles, and personal watercraft.

Figure 1:
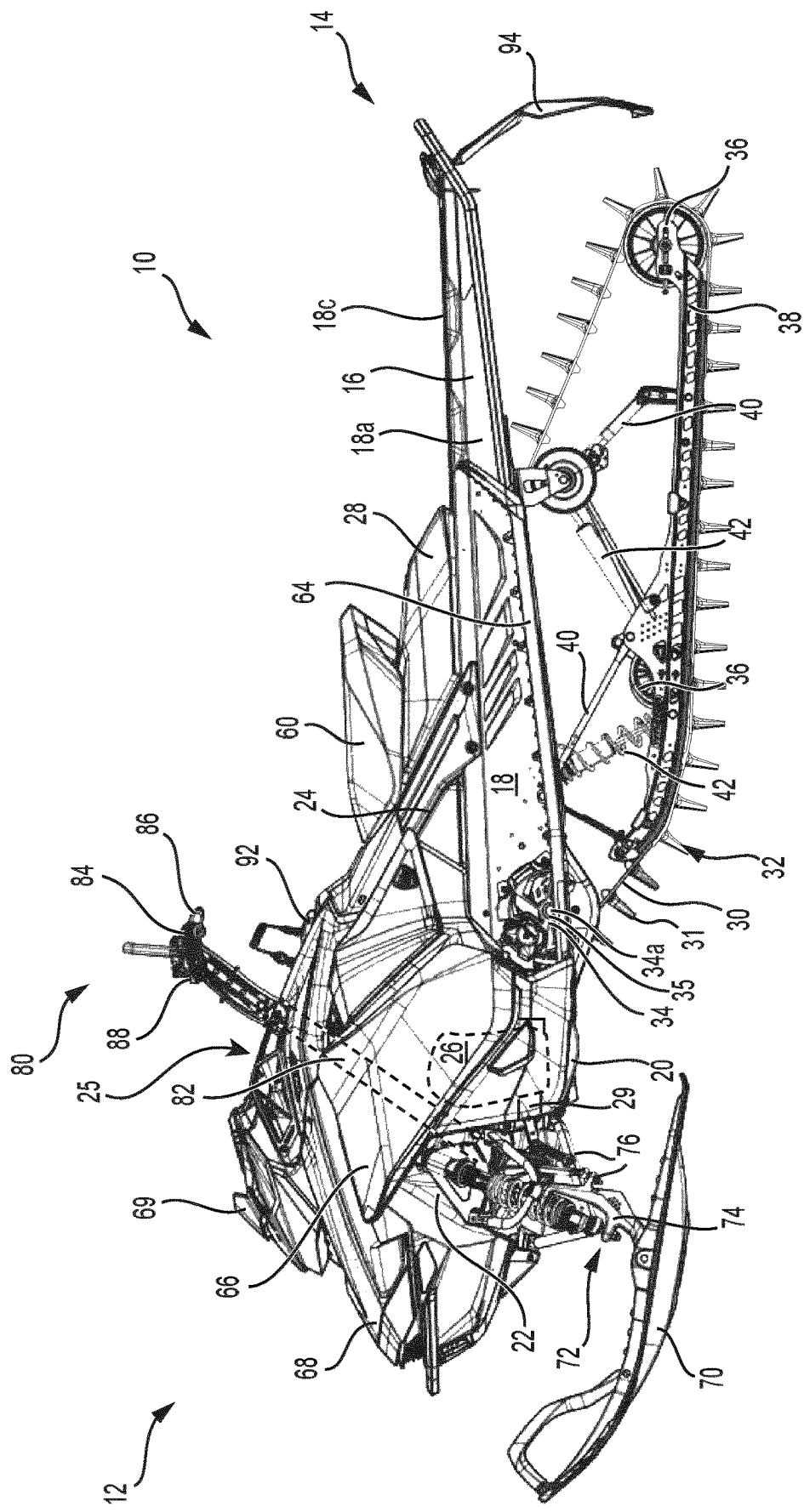
FIG. 1 is a left side elevation view of a snowmobile.
Figure 2:
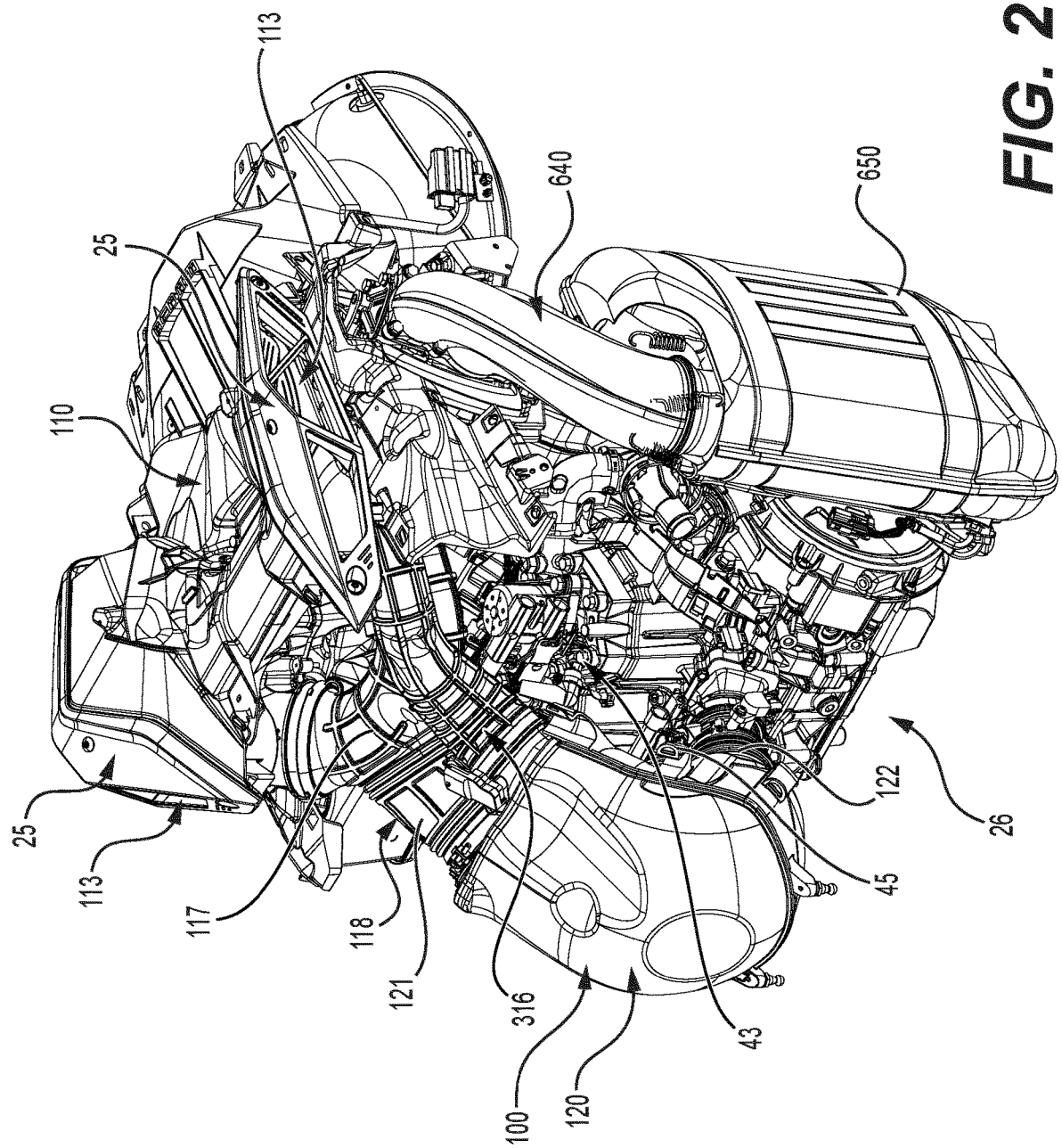
FIG. 2 is a top, rear, right side perspective view of an engine, air intake system and exhaust system of the snowmobile of FIG. 1.

With reference to FIGS. 1 and 2, a snowmobile 10 according to the present technology will be described. The snowmobile 10 includes a forward end 12 and a rearward end 14. The snowmobile 10 includes a vehicle body in the form of a frame or chassis 16 which includes a tunnel 18, an engine cradle portion 20, a front suspension module 22 and an upper structure 24.

An internal combustion engine 26 is carried in an engine compartment defined in part by the engine cradle portion 20 of the frame 16. A fuel tank 28, supported above the tunnel 18, supplies fuel to the engine 26 for its operation. The engine 26 receives air from an air intake system 100. The engine 26 and the air intake system 100 are described in more detail below.

An endless drive track 30 is positioned at the rear end 14 of the snowmobile 10. The drive track 30 is disposed generally under the tunnel 18, and is operatively connected to the engine 26 through a belt transmission system and a reduction drive. The endless drive track 30 is driven to run about a rear suspension assembly 32 operatively connected to the tunnel 18 for propulsion of the snowmobile 10. The endless drive track 30 has a plurality of lugs 31 extending from an outer surface thereof to provide traction to the track 30.

Figure 3:
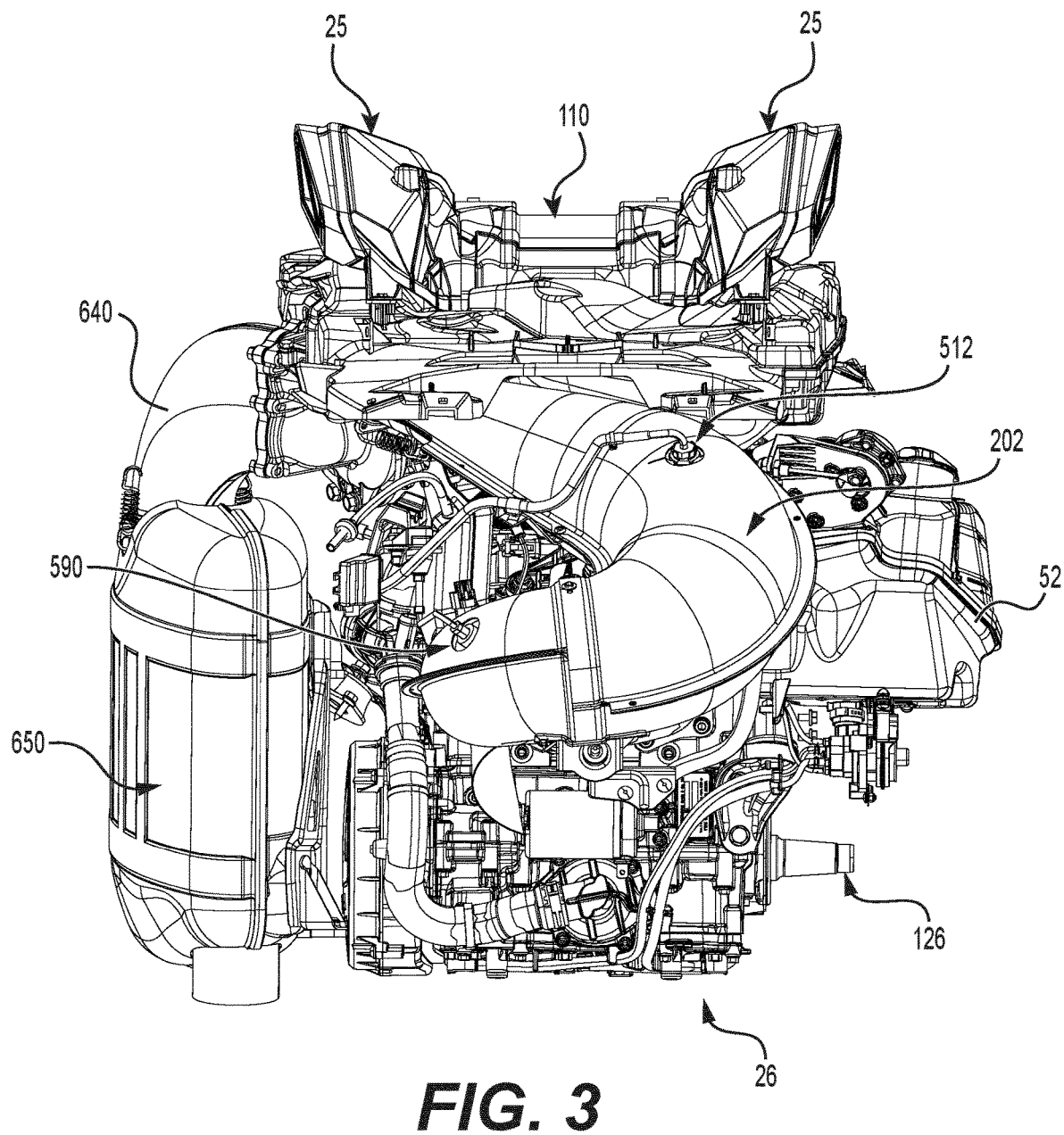
FIG. 3 is a front elevation view of the engine, air intake system and exhaust system of FIG. 2.

The rear suspension assembly 32 includes drive sprockets 34, idler wheels 36 and a pair of slide rails 38 in sliding contact with the endless drive track 30. The drive sprockets 34 are mounted on an axle 35 and define a sprocket axis 34a. The axle 35 is operatively connected to a crankshaft 126 (see FIG. 3) of the engine 26. The slide rails 38 are attached to the tunnel 18 by front and rear suspension arms 40 and shock absorbers 42. It is contemplated that the snowmobile 10 could be provided with a different implementation of a rear suspension assembly 32 than the one shown herein.

A straddle seat 60 is positioned atop the fuel tank 28. A fuel tank filler opening covered by a cap 92 is disposed on the upper surface of the fuel tank 28 in front of the seat 60. It is contemplated that the fuel tank filler opening could be disposed elsewhere on the fuel tank 28. The seat 60 is adapted to accommodate a driver of the snowmobile 10. The seat 60 could also be configured to accommodate a passenger. A footrest 64 is positioned on each side of the snowmobile 10 below the seat 60 to accommodate the driver's feet.

At the front end 12 of the snowmobile 10, fairings 66 enclose the engine 26 and the belt transmission system, thereby providing an external shell that not only protects the engine 26 and the transmission system, but can also make the snowmobile 10 more aesthetically pleasing. The fairings 66 include a hood 68 and one or more side panels which can be opened to allow access to the engine 26. A windshield 69 connected to the fairings 66 acts as a wind screen to lessen the force of the air on the rider while the snowmobile 10 is moving.

Two skis 70 positioned at the forward end 12 of the snowmobile 10 are attached to the front suspension module 22 of the frame 16 through a front suspension assembly 72. The front suspension module 22 is connected to the front end of the engine cradle portion 20. The front suspension assembly 72 includes ski legs 74, supporting arms 76 and ball joints (not shown) for operatively connecting to the respective ski leg 74, supporting arms 76 and a steering column 82 (schematically illustrated).

A steering assembly 80, including the steering column 82 and a handlebar 84, is provided generally forward of the seat 60. The steering column 82 is rotatably connected to the frame 16. The lower end of the steering column 82 is connected to the ski legs 74 via steering rods (not shown). The handlebar 84 is attached to the upper end of the steering column 82. The handlebar 84 is positioned in front of the seat 60. The handlebar 84 is used to rotate the steering column 82, and thereby the skis 70, in order to steer the snowmobile 10. A throttle operator 86 in the form of a thumb-actuated throttle lever is mounted to the right side of the handlebar 84. Other types of throttle operators, such as a finger-actuated throttle lever and a twist grip, are also contemplated. A brake actuator 88, in the form of a hand brake lever, is provided on the left side of the handlebar 84 for braking the snowmobile 10 in a known manner. It is contemplated that the windshield 69 could be connected directly to the handlebar 84.

At the rear end of the snowmobile 10, a snow flap 94 extends downward from the rear end of the tunnel 18. The snow flap 94 protects against dirt and snow that can be projected upward from the drive track 30 when the snowmobile 10 is being propelled by the moving drive track 30. It is contemplated that the snow flap 94 could be omitted.

The snowmobile 10 includes other components such as a display cluster, and the like. As it is believed that these components would be readily recognized by one of ordinary skill in the art, further explanation and description of these components will not be provided herein.

With additional reference to FIGS. 2 to 6, the engine 26 and the air intake system 100 will be described in more detail. Air from the atmosphere surrounding the snowmobile 10 flows through side apertures 113 defined in an upper portion 25 of the upper structure 24 of the chassis 16. The air then flows into a secondary airbox 110. The secondary airbox 110 is disposed above the front suspension module 22. A generally Y-shaped conduit 118 (FIG. 2) fluidly connects the secondary airbox 110, via a conduit portion 117, to a compressor inlet 312 of an air compressor 310 (FIG. 5) disposed on the right side of the engine 26. The conduit 118 further fluidly connects to an inlet 119 of a primary airbox 120 via a conduit portion 121. The primary airbox 120 includes a bypass valve 123 (see FIGS. 35 and 36) controlling air flow through the inlet 119 into the primary airbox 120. It is contemplated that the secondary airbox 110 could be omitted and that air from the atmosphere could directly enter into the inlet 312 and/or the inlet 119 of the primary airbox 120 without going through the secondary airbox 110.

Figure 42:
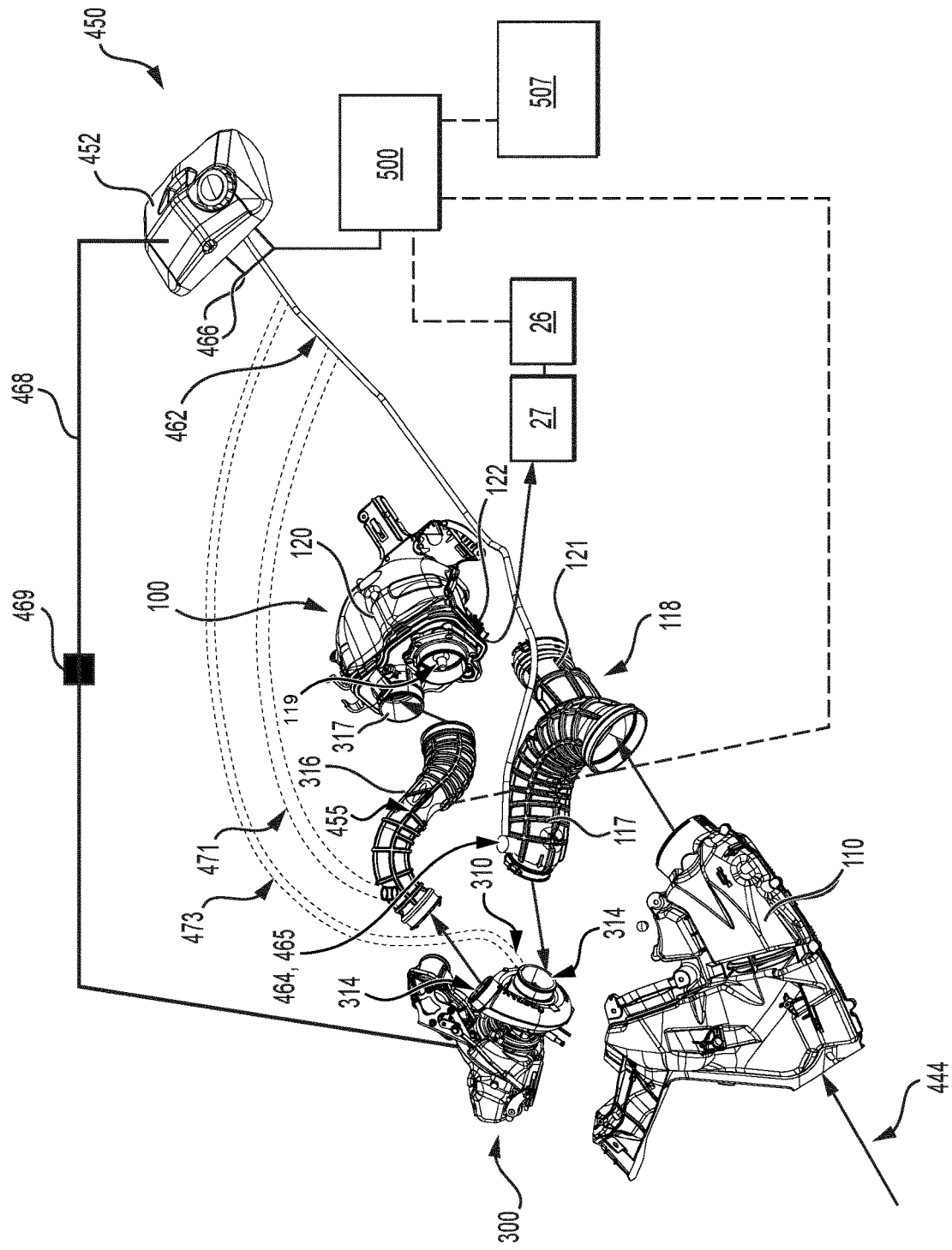
FIG. 42 is an exploded, top front, left side perspective view of the air intake system and coolant system portions of FIG. 40.

Air from the environment entering the snowmobile 10, passing through the air compressor 310, and flowing into the engine 26 generally follows an intake air flow path 444, further illustrated schematically in FIG. 42. Air from the atmosphere, passing through the secondary airbox 110 and into the air compressor 310 via the conduit 118 and inlet 312, is compressed by the air compressor 310. The compressed air then flows out of the air compressor 310 through an outlet 314, into a conduit 316 and into the primary air box 120. The primary airbox 120 is fluidly connected to the engine 26 via two air outlets 122 of the primary airbox 120 (see also FIG. 10).

Figure 35:
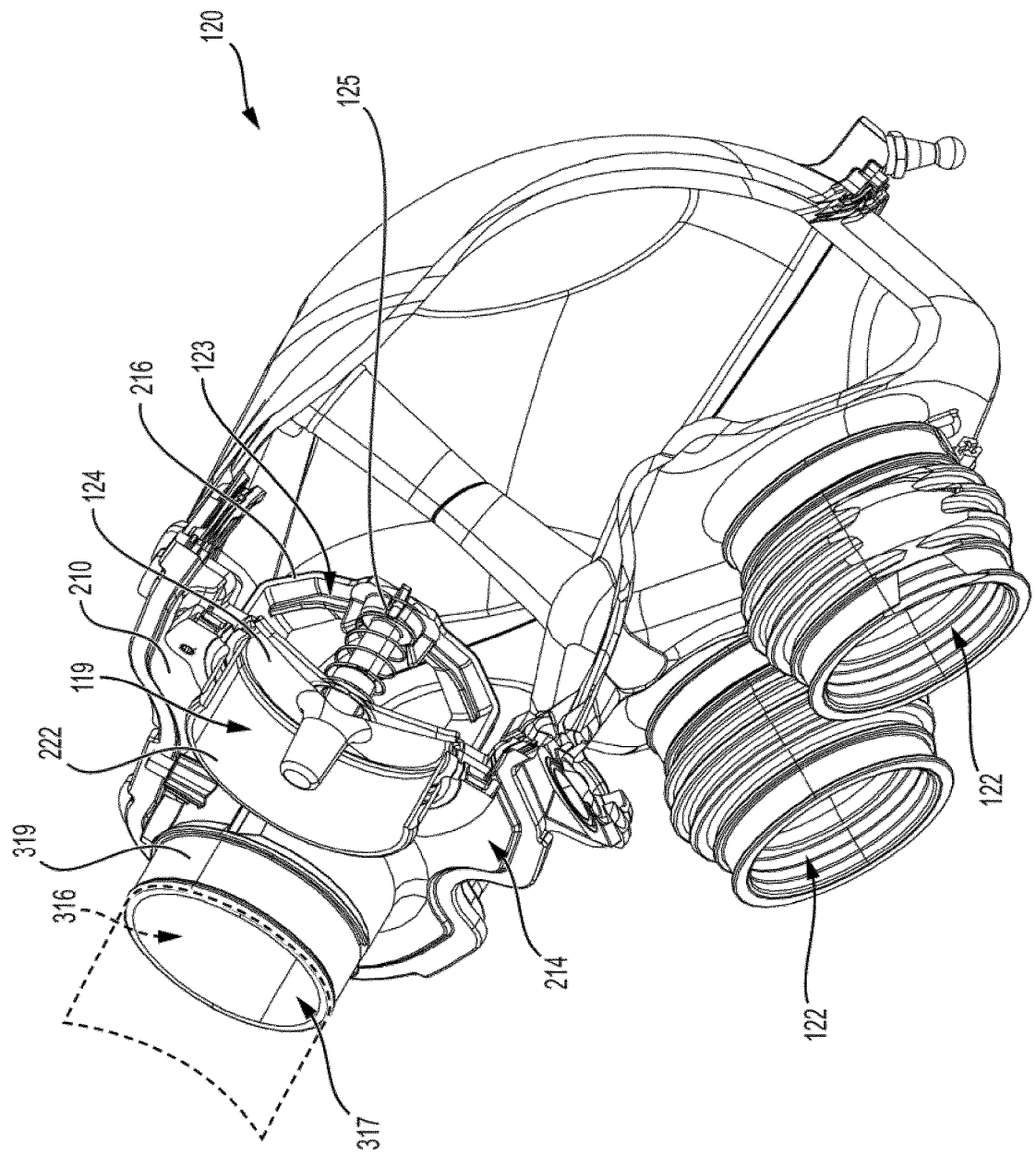
FIG. 35 is a partial cut-away view of an airbox of the air intake system of FIG. 2, with a portion of a left side of the airbox having been removed.
Figure 36:
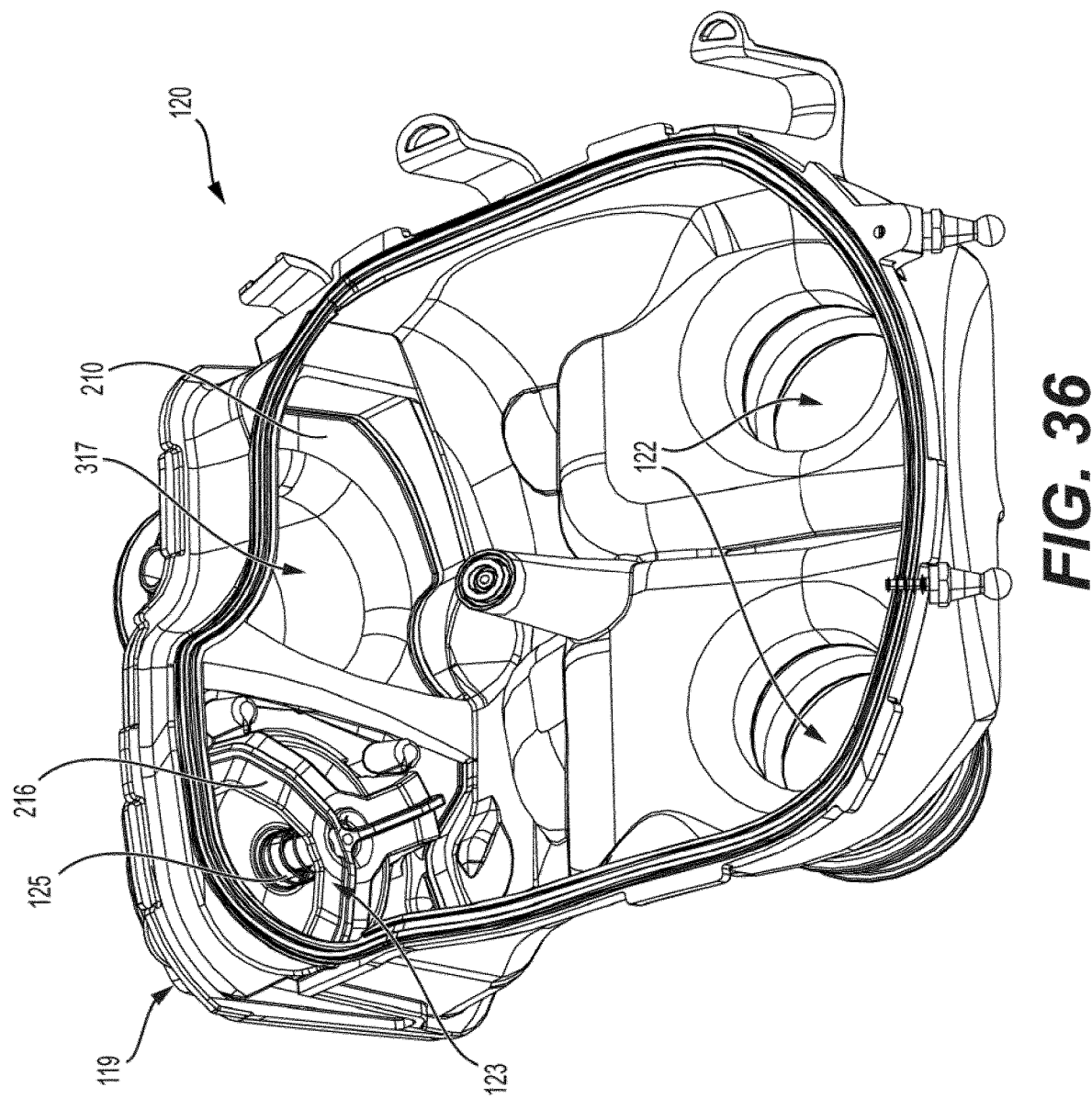
FIG. 36 is a partial cut-away view of the airbox of FIG. 35, with a portion of a rear side of the airbox having been removed.
Figure 37:
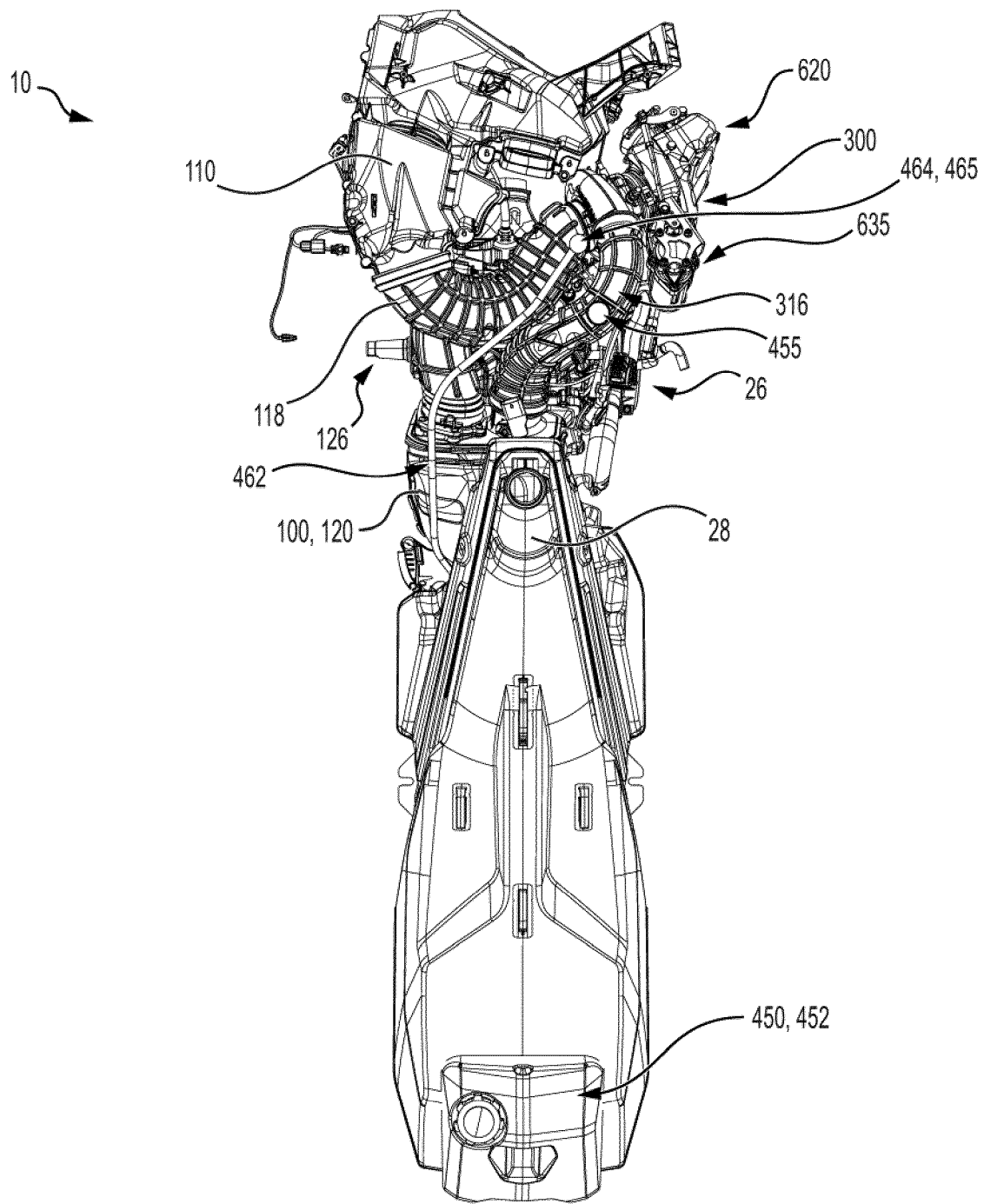
FIG. 37 is a top plan view of portions of the engine, the air intake system, a fuel tank, and a coolant system of the vehicle of FIG. 1.

The bypass valve 123 of the primary airbox 120 is spring-loaded to a closed position, such that air is preferentially received from the air compressor 310 via the conduit 316. When the air pressure within the primary airbox 120 falls below a threshold value, for example when the engine 26 is rotating at a speed that requires more air than is available in the primary airbox 120, the valve 123 opens to allow air from the atmosphere, via the secondary airbox 110, to enter the primary airbox 120 directly. In some situations, this can aid in obtaining optimal operation of the engine 26, especially when the turbocharger 300 is spooling and not supplying the necessary air flow to the primary airbox 120 for the air being requested by the engine 26. As shown in FIG. 35, valve 123 includes a spring 125. The spring constant of spring 125 is chosen such that valve 123 will open and close at a predetermined pressure within primary airbox 120. Thus once opened, the bypass valve 123 will automatically close when the airflow from the turbocharger 300 increases the pressure within the primary airbox 120 to the predetermined pressure, and vice versa. The diameter of valve 123 is sized to allow for a high flow capacity between the secondary and primary airboxes 110, 120. This aids in ensuring optimal pressure within primary airbox 120 and thus aids optimal engine performance in generally all situations even if turbocharger 300 is not spooled. The conduit portion 117 and the bypass valve 123 also reduce the air flow travel distance between the secondary airbox 110 and the primary airbox 120, when compared to the air flow travel distance through the conduit portion 121, the turbocharger 300 and the conduit 316. As such, depending on the air pressure within primary airbox 120, the airflow between the secondary and primary airboxes 110, 120 has either a short airflow path or a long airflow path available. Inclusion of the bypass valve 123 in the primary airbox 120 further allows the engine 26 to be operated in either a turbocharged mode or a naturally aspirated mode. Operation of the engine 26, and corresponding operation of the turbocharger 300, in order to operate in the two modes will be described in further detail below.

Figure 4:
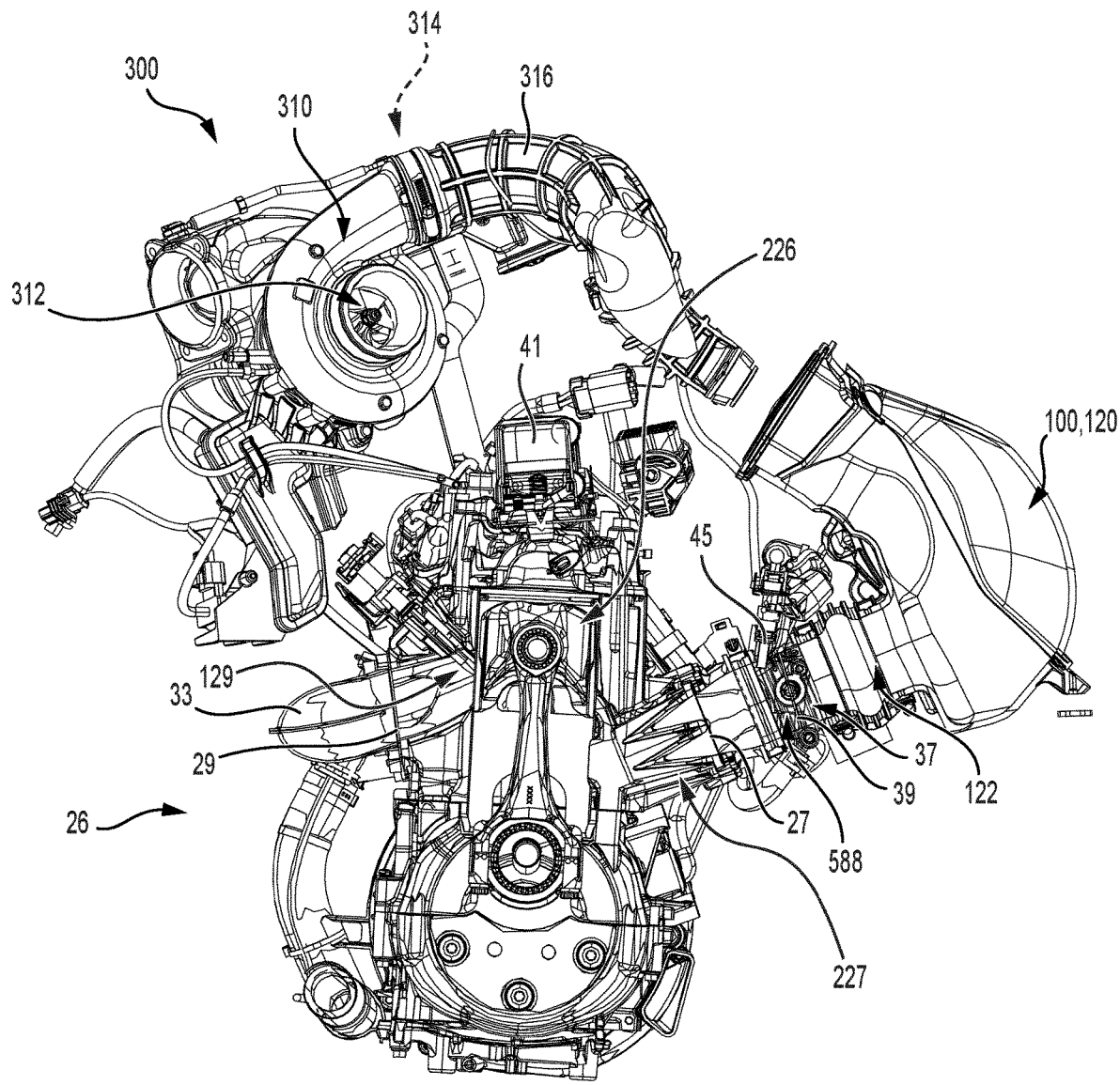
FIG. 4 is a cross-sectional view of the engine and some portions of the air intake system and the exhaust system of FIG. 2.

The engine 26 is an inline, two-cylinder, two-stroke, internal combustion engine. The two cylinders of the engine 26, with a piston 226 disposed in each cylinder, are oriented with their cylindrical axes disposed vertically, one piston 226 is illustrated in FIG. 4. It is contemplated that the engine 26 could be configured differently. For example, the engine 26 could have more or less than two cylinders, and the cylinders could be arranged in a V-configuration instead of in-line. It is contemplated that in some implementations the engine 26 could be a four-stroke internal combustion engine, a carbureted engine, or any other suitable engine capable of propelling the snowmobile 10. The engine 26 includes an engine coolant system 23 to aid in cooling the engine 26. The engine coolant system 23 includes an engine coolant temperature sensor 127 for monitoring the temperature of the engine coolant circulating in the engine coolant system 23.

Figure 46:
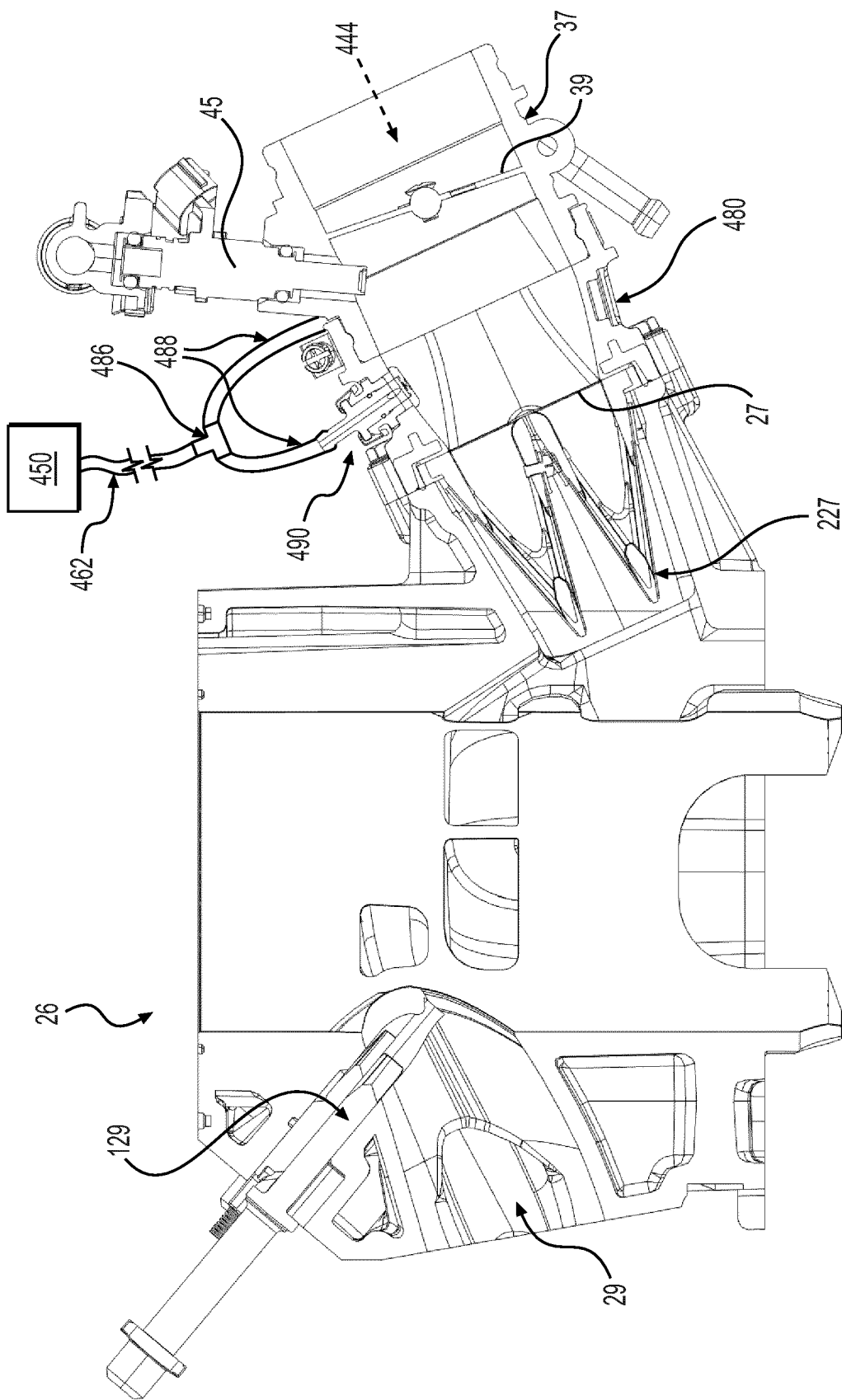
FIG. 46 is a cross-sectional view of the engine and the coolant-injection collars of FIG. 45, taken along line 46-46 of FIG. 45.
Figure 47:
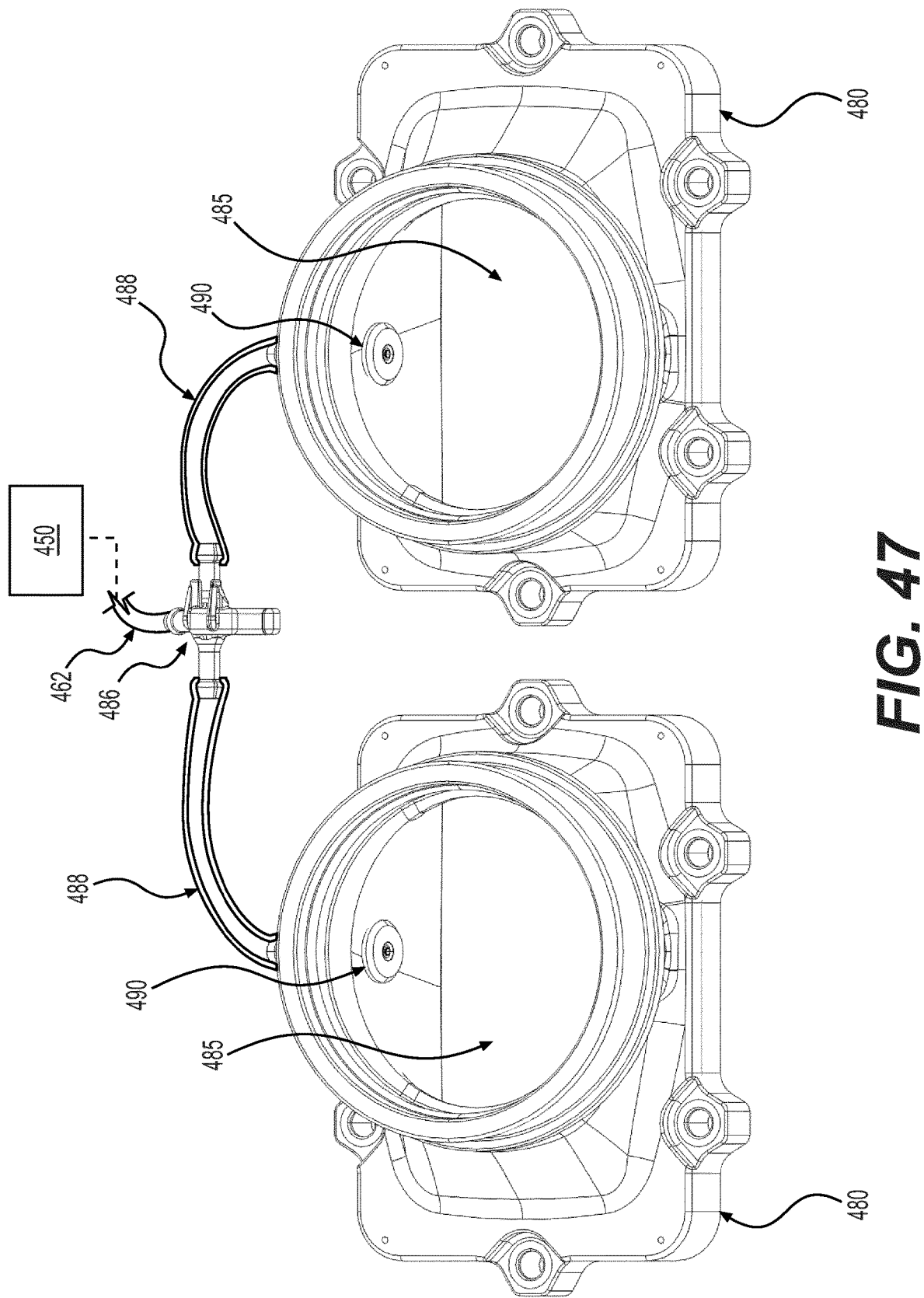
FIG. 47 is a perspective view of the coolant-injection collars of FIG. 45, with coolant tubes connected thereto.

As shown in FIGS. 1, 2, and 4, the engine 26 receives air from the air intake system 100, specifically the outlets 122 of the primary airbox 120, via engine air inlets 27 defined in the rear portion of each cylinder of the engine 26. The engine 26 includes reed valves 227 in each air inlet 27 (see also FIG. 46). Each air inlet 27 is connected to a throttle body 37 of the air intake system 100. The throttle body 37 includes a throttle valve 39 which rotates to regulate the amount of air flowing through the throttle body 37 into the corresponding cylinder of the engine 26. A throttle valve actuator (not shown) is operatively connected to the throttle valve 39 to change the position of the throttle valve 39 and thereby adjust the opening of the throttle valve 39 with operation of the throttle lever 86 on the handlebar 84. In the present implementation, the throttle valve actuator is a mechanical linkage, although this is simply one non-limiting implementation. The position and the movement of the throttle valve 39 is monitored by a throttle position sensor 588 (schematically illustrated in FIG. 8) operatively connected to the throttle valve 39, described in more detail below. It is also contemplated that the throttle valve actuator could be in the form of an electric motor. The electric motor could change the position of the throttle valve 39 based on input signals received from an electronic control module (not shown) which in turn receives inputs signals from a position sensor associated with the throttle lever 86 on the handlebars 84. Further details regarding such drive-by wire throttle systems can be found in U.S. Pat. No. 10,029,567 issued on Jul. 24, 2018, the entirety of which is incorporated herein by reference.

The engine 26 receives fuel from the fuel tank 28 via Direct Injection (DI) injectors 41 and Multi Point Fuel Injection (MPFI) injectors 45 (both shown in at least FIG. 4), having an opening in the cylinders. The fuel-air mixture in each of the left and right cylinders of the engine 26 is ignited by an ignition system including spark plugs 43 (best seen in FIG. 2). Engine output power, torque and engine speed are determined in part by throttle opening and in part by the ignition timing, and also by various characteristics of the fuel-air mixture such as its composition, temperature, pressure and the like. Methods of controlling the fuel-air mixture, according to some implementations of the present technology, will be described in more detail below in reference to FIG. 24.

Figure 5:
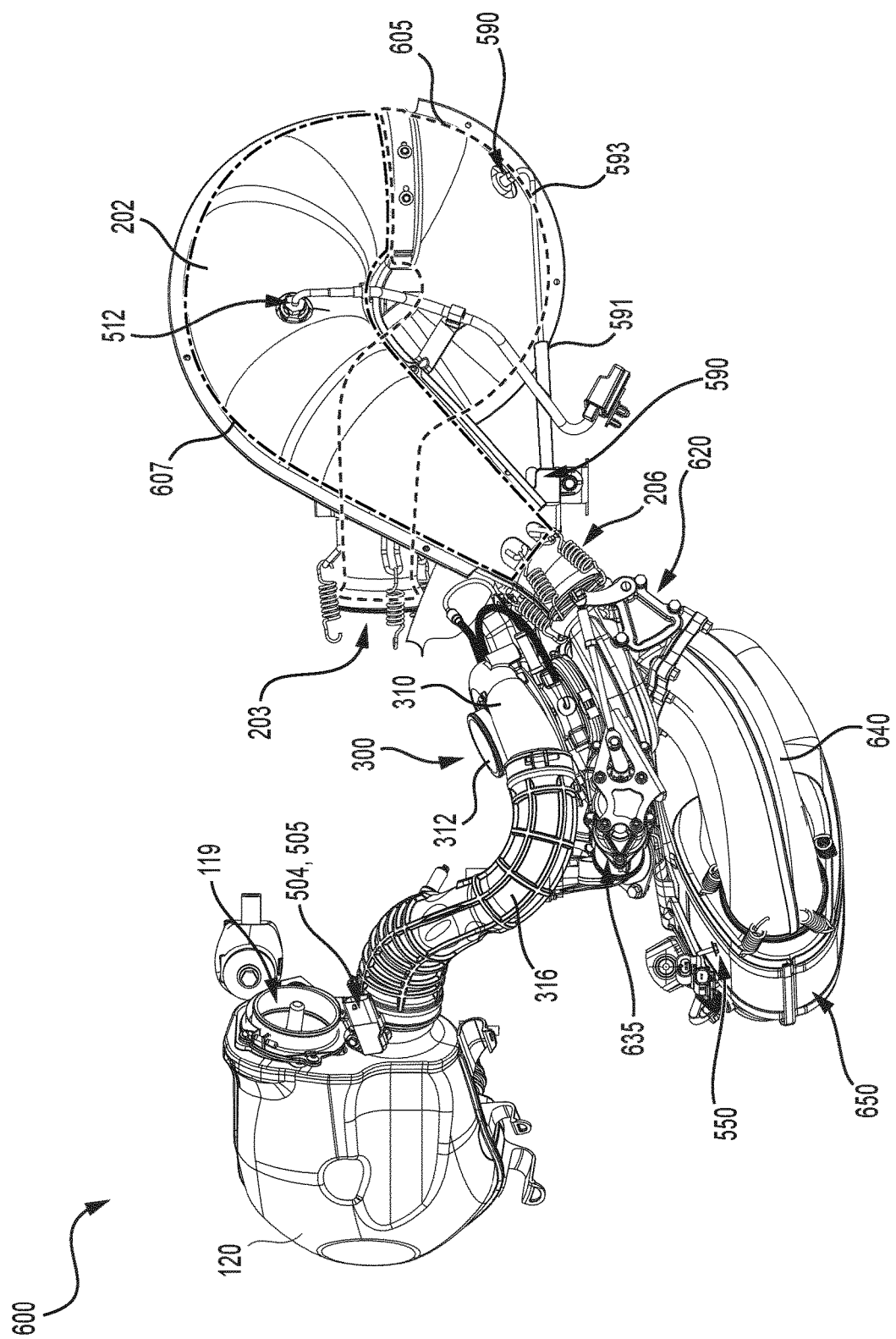
FIG. 5 is a top plan view of portions of the air intake system and the exhaust system of FIG. 2.

Exhaust gases resulting from the combustion events of the combustion process are expelled from the engine 26 via an exhaust system 600 (FIG. 5). As shown in FIG. 4, an exhaust outlet 29 is defined in the front portion of each cylinder of the engine 26. Each exhaust outlet 29 has an exhaust valve 129. The exhaust outlets 29 are fluidly connected to an exhaust manifold 33. The exhaust system 600 includes an exhaust pipe 202 which is connected to the exhaust manifold 33 and extends forwardly therefrom to direct the exhaust gases out of the engine 26.

In the present implementation, the exhaust pipe 202 is a tuned pipe which has a geometry suitable for improving efficiency of the engine 26.

Figure 6:
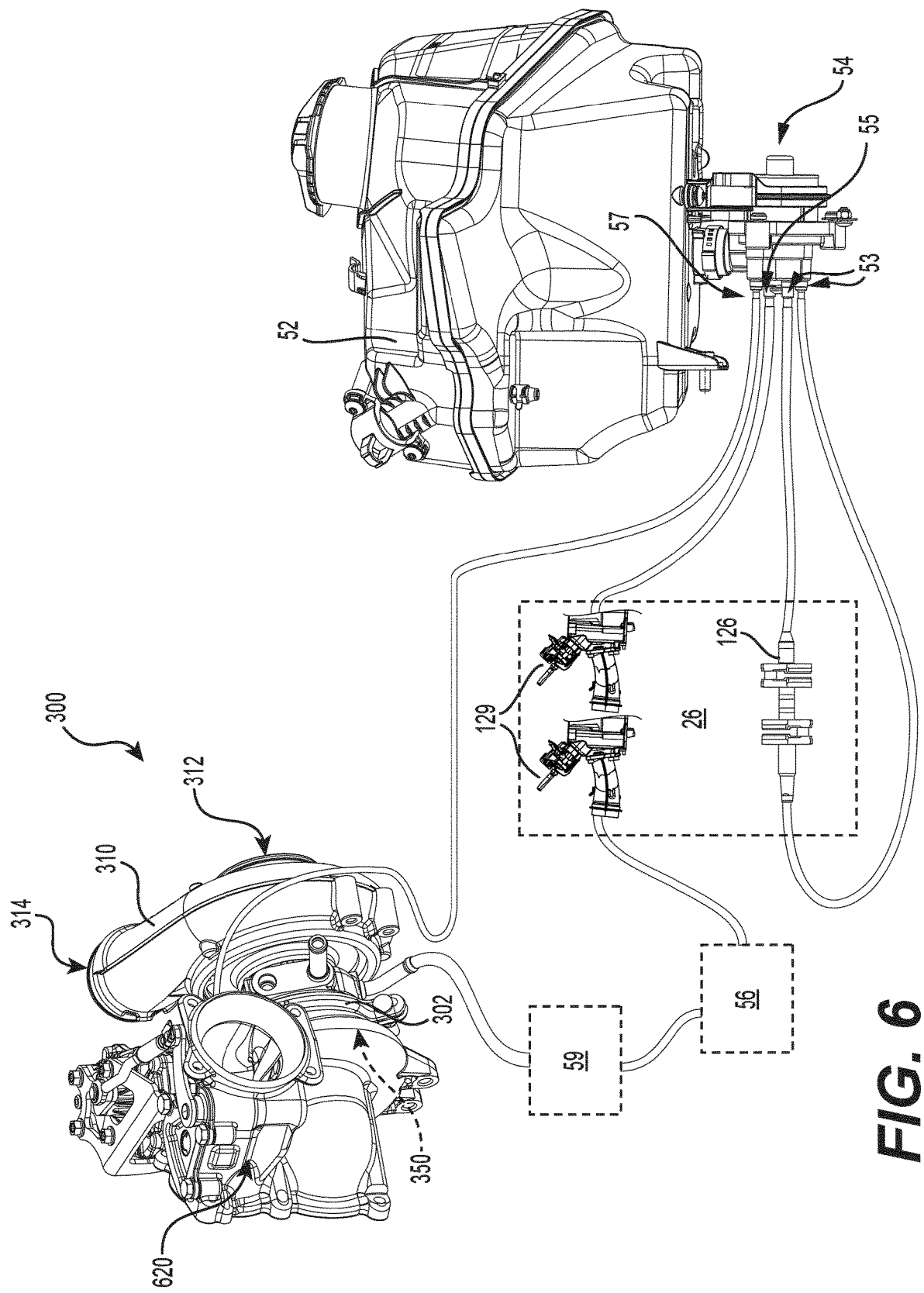
FIG. 6 is a schematic representation of a lubrication system of the snowmobile of FIG. 1.
Figure 12:
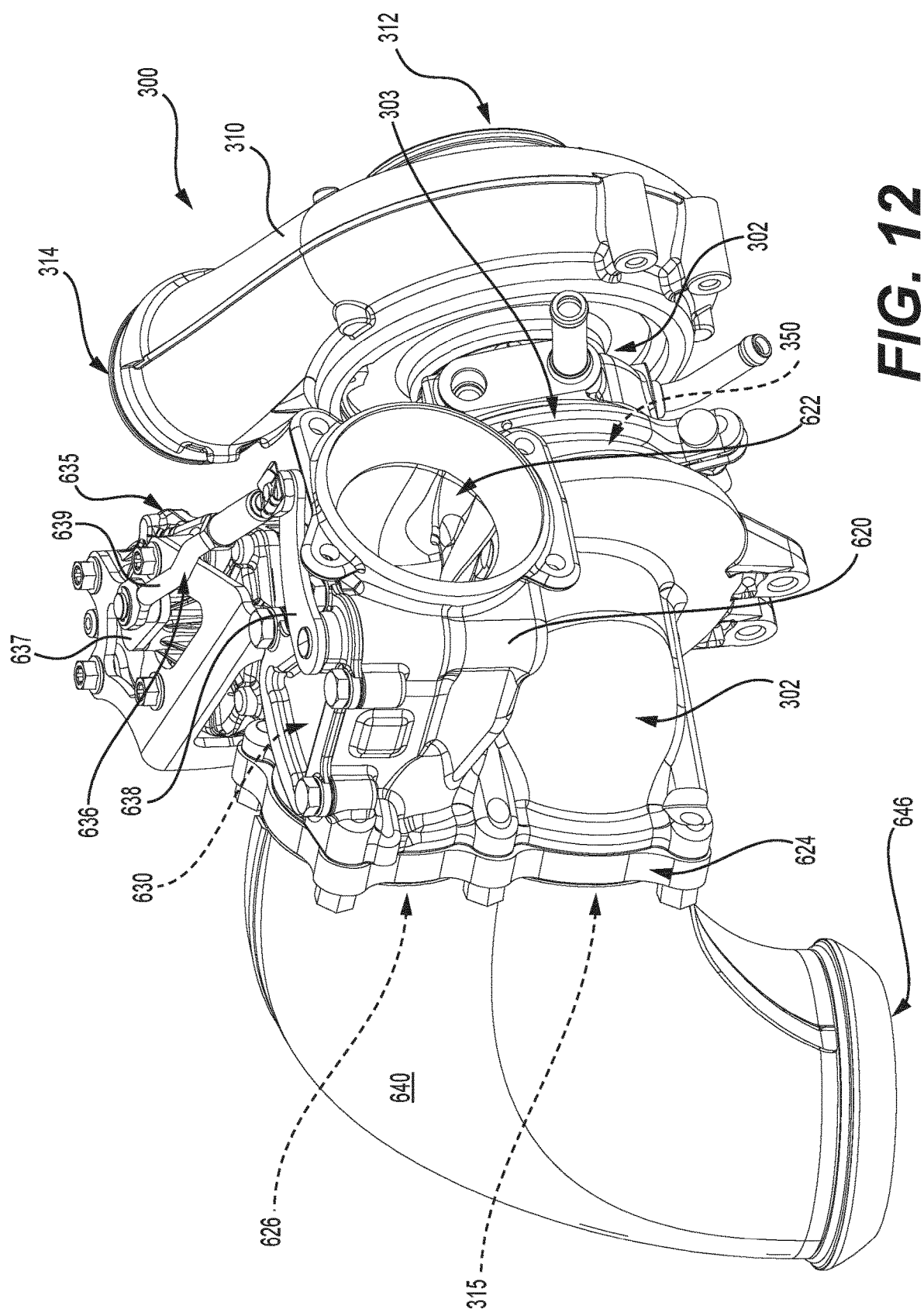
FIG. 12 is a front elevation view of a turbocharger, a bypass conduit, and an exhaust collector of the exhaust system of FIG. 2.
Figure 13:
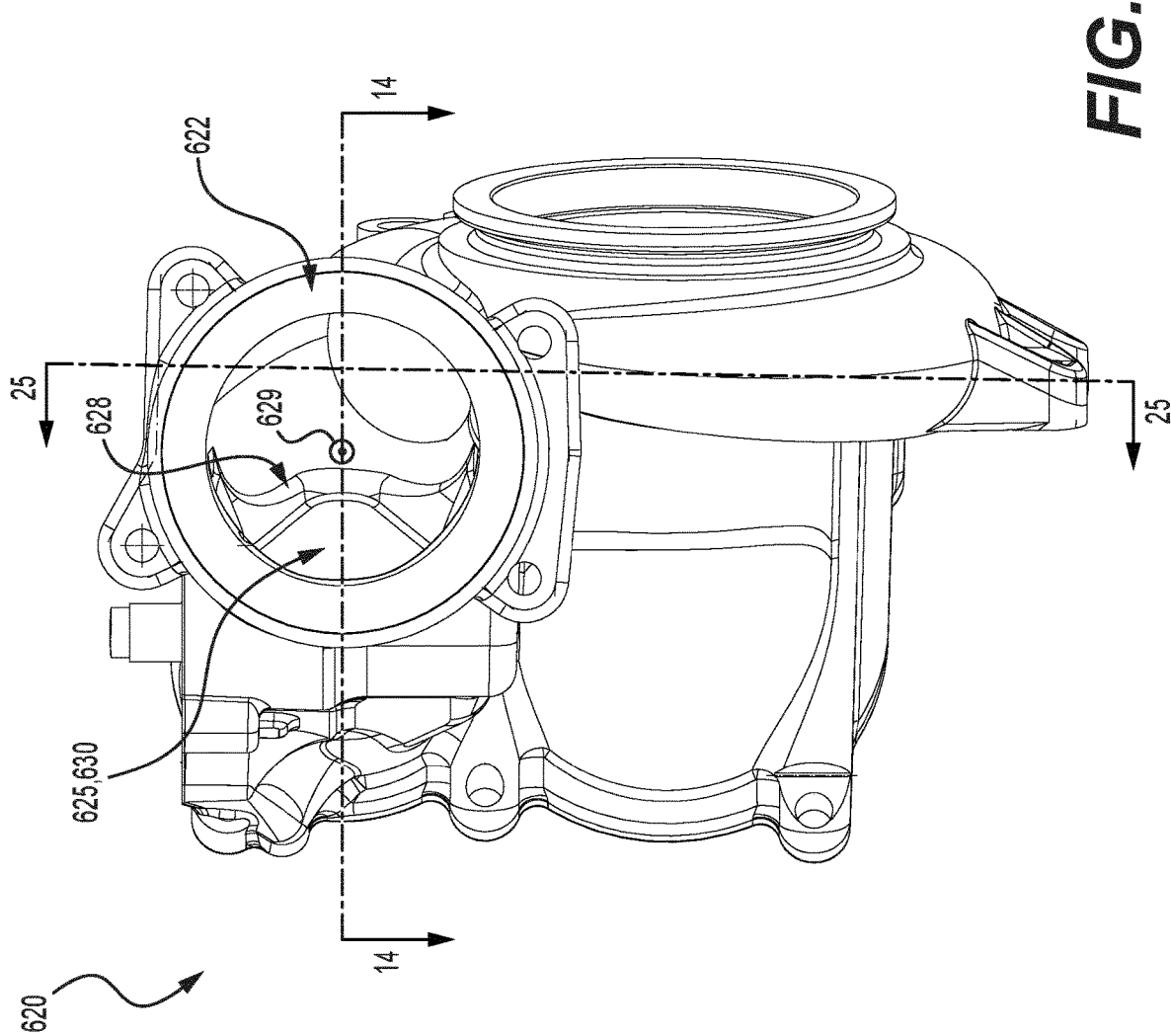
FIG. 13 is a perspective view of the bypass conduit of FIG. 12, shown in isolation.
Figure 19:
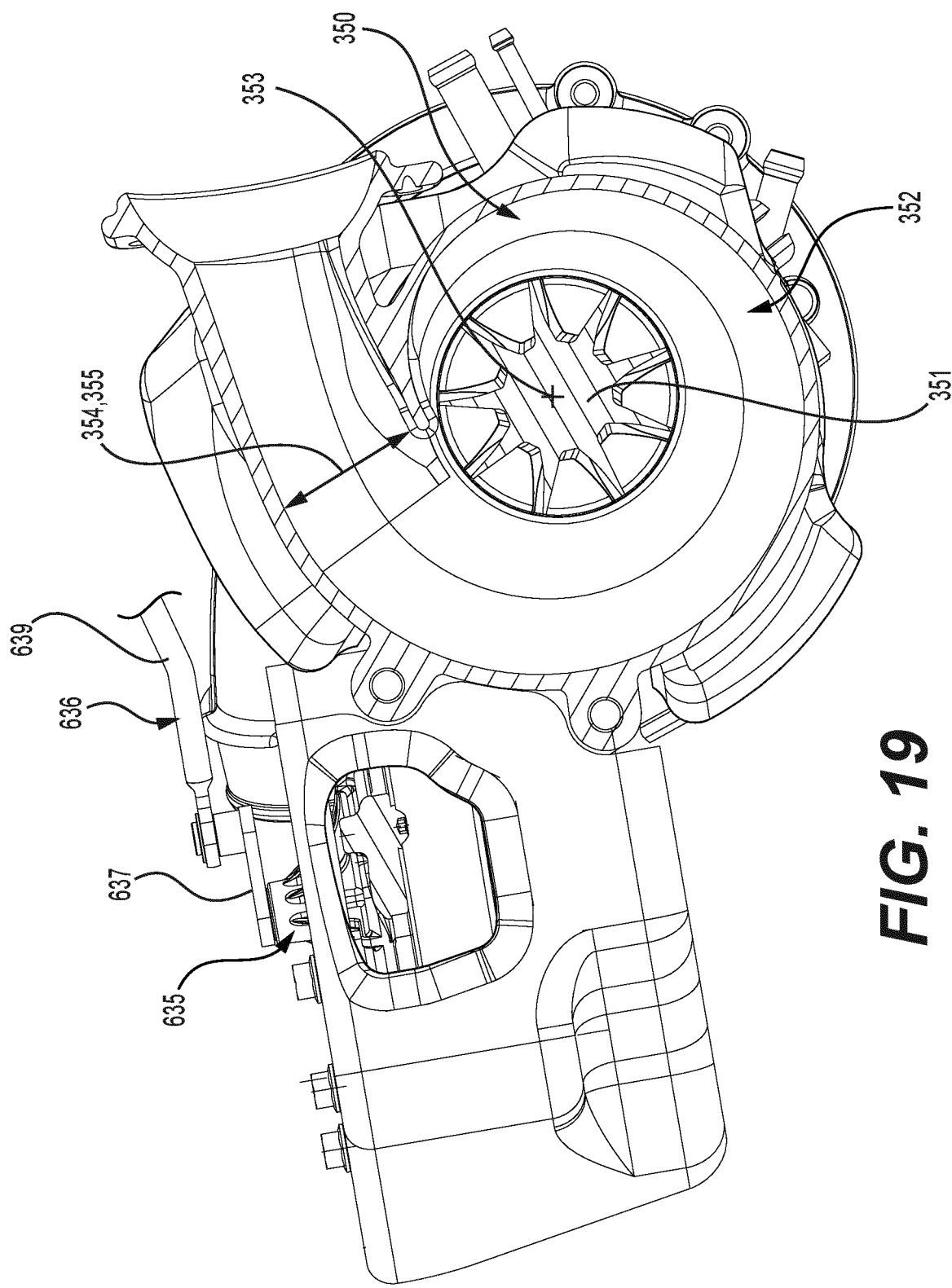
FIG. 19 is a cross-sectional view of the turbocharger of FIG. 18, taken along line 19-19 of FIG. 18.
Figure 25:
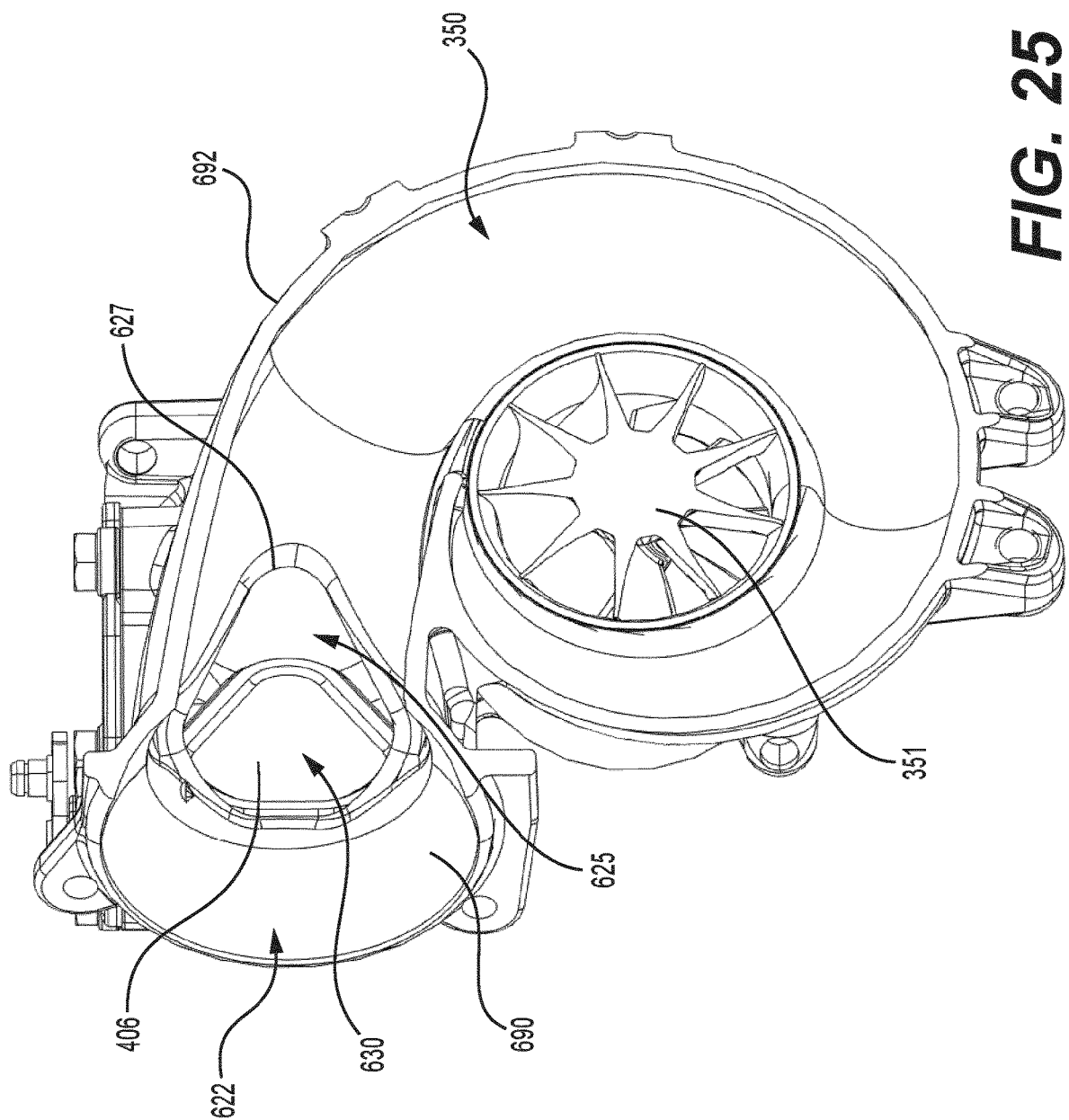
FIG. 25 is a cross-sectional view of the bypass conduit of FIG. 12, taken along line 25-25 of FIG. 13, with the valve in the open position.

A turbocharger 300 is operatively connected to the engine 26. The turbocharger 300 compresses air and feeds it to the engine 26. As shown in FIGS. 6 and 12, the turbocharger 300 has a housing 302 defining an air compressor 310 and an exhaust turbine 350. With additional reference to FIG. 19, the exhaust turbine 350 includes a turbine inlet 355 with an area 354, which is defined in turbochargers generally as the cross-sectional area of a volute 352 (measured at the tongue) of the exhaust turbine 350. The air compressor 310 includes a compressor wheel and is part of the air intake system 100. Intake air flowing past the rotating compressor wheel is compressed thereby, as described above. The rotation of the compressor wheel is powered by a turbine wheel 351 (FIGS. 19, 25) of the exhaust turbine 350, which is part of the exhaust system 600. The turbine wheel 351 is rotated about a turbine axis 353 (FIG. 19) by exhaust gases expelled from the engine 26 and directed to flow over the blades of the turbine wheel 351. It is contemplated that, in some implementations, the air compressor 310 could be a supercharger, in which the compressor wheel would be directly powered by the engine 26. The exhaust system 600 will be described in greater detail below.

Figure 7:
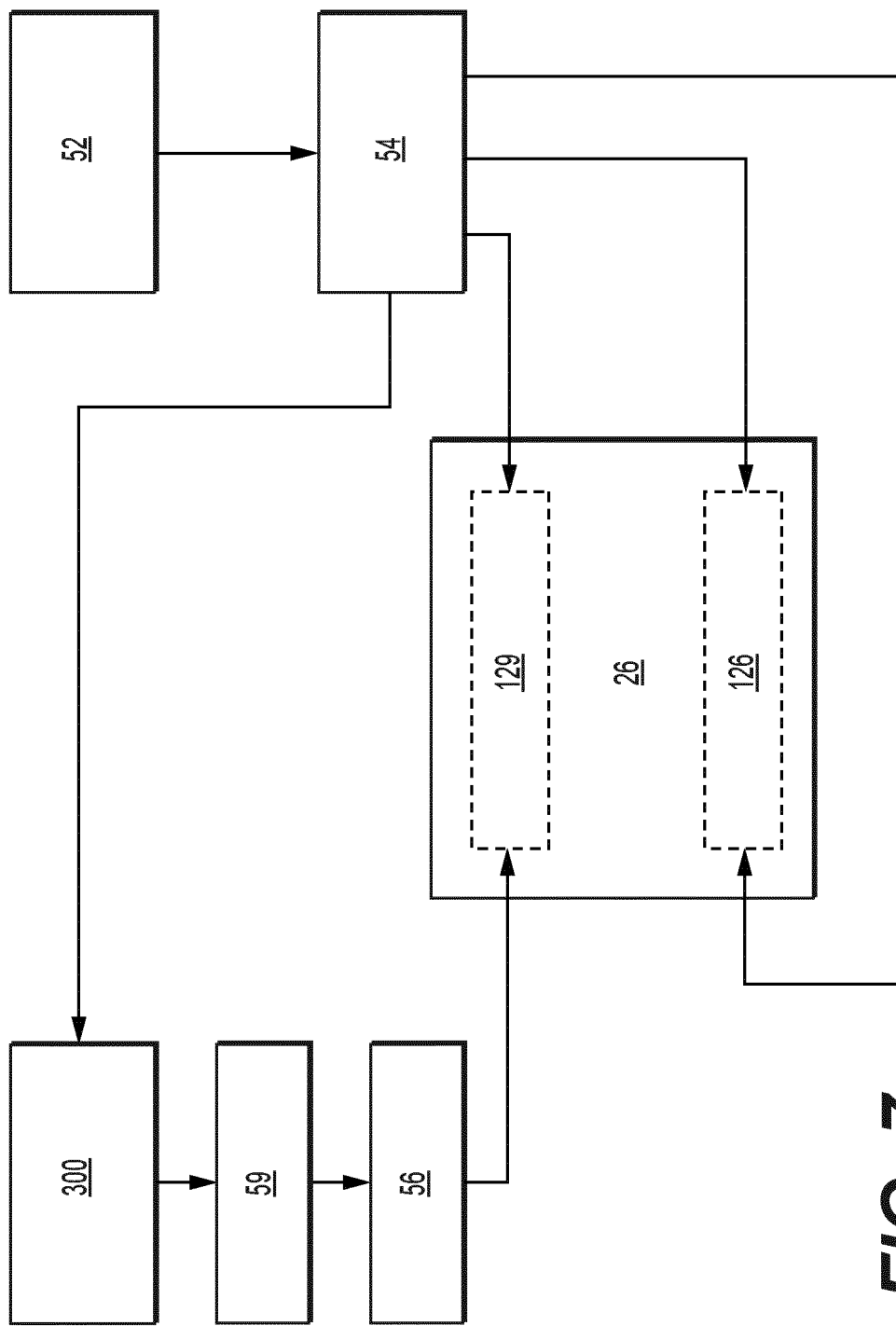
FIG. 7 is a schematic diagram of lubricating oil flow of the lubrication system of FIG. 6.

Referring to FIGS. 6 and 7, the snowmobile 10 further includes a lubrication system to provide lubricating oil to the engine 26 and to the turbocharger 300. The engine 26 is fluidly connected to an oil reservoir 52 which supplies oil to the crankshaft 126 and the exhaust valves 129 of the engine 26. The oil reservoir 52 is also fluidly connected to the turbocharger 300 to provide lubricating oil thereto. The turbocharger 300 is also fluidly connected to the engine 26, as will be described further below.

A primary oil pump 54 is fastened to and fluidly connected to the oil reservoir 52. It is contemplated that the pump 54 and the oil reservoir 52 could be differently connected together or could be disposed separately in the snowmobile 10. The primary oil pump 54 pumps oil from the reservoir 52 to the engine 26 and the turbocharger 300. The primary oil pump 54 includes four outlet ports for pumping out oil from the oil reservoir 52. Two outlet ports 53 supply oil to the crankshaft 126. Another outlet port 55 supplies oil to one of the exhaust valves 129. The fourth outlet port 57 supplies oil to the turbocharger 300. Depending on the implementation, it is contemplated that the primary oil pump 54 could include more or fewer outlet ports depending on specific details of the implementation.

A secondary oil pump 56 and an oil/vapor separator tank 59 are fluidly connected between the turbocharger 300 and the engine 26. The secondary oil pump 56 receives oil that has passed through the turbocharger 300, and pumps that oil to the other exhaust valve 129.

FIG. 7 illustrates the flow directions of oil from the pumps 54, 56 and through the turbocharger 300 to the engine 26 via schematic diagram. It is further noted that in the present implementation, the turbocharger 300 is a ball-bearing based turbocharger 300 which is dimensioned for low oil flow lubrication in order to provide efficient responsiveness. It is contemplated that different types of turbochargers could be used in differed implementations.

With this configuration, only one oil reservoir 52 is utilized for lubricating both the turbocharger 300 and the engine 26. It is contemplated that the snowmobile 10 could also be arranged such that the secondary oil pump 56 could be omitted. It is also contemplated that oil could be circulated to the crankshaft 126, rather than the exhaust valves 129, after having passed through the turbocharger 300.

With additional reference to FIGS. 8 to 19, the exhaust system 600 will now be described in further detail. The exhaust gas expelled from the engine 26 flows through the exhaust outlets 29, through the exhaust manifold 33, and into the exhaust pipe 202, as is mentioned above. The exhaust pipe 202, which as mentioned above is a tuned pipe 202, is curved and has a varying diameter along its length. Other types of exhaust pipes 202 are contemplated. As shown in FIG. 5, the exhaust pipe 202 includes a pipe inlet 203 fluidly connected to the exhaust manifold 33 and a pipe outlet 206 located at the end of the exhaust pipe 202. The exhaust pipe 202 further has a divergent portion 605 adjacent the pipe inlet 203 and a convergent portion 607 adjacent the pipe outlet 206. The pipe outlet 206 is positioned downstream from the pipe inlet 203. It is well known in the art of two stroke engines that the goal of the converging-diverging type tuned pipe is to have the diverging section create a returning rarefaction wave and the converging section create a returning pressure wave which pushes any excess fresh air-fuel mixture which flowed out of the cylinder into the exhaust pipe, back into the cylinder. Pushing the fresh mixture back into the cylinder is desired since this allows the returning pressure wave to "super charge" the cylinder giving it more fresh mixture than if the cylinder was filled at ambient pressure. The nomenclature "tuned pipe" is used because the dimensions of the pipe are specifically chosen so this super charging occurs within the pipe at a particular value of one or more parameters, or range of values thereof such as at a particular temperature and/or pressure, which coincide with a desired operating RPM or desired operating RPM range of the engine. Once the physical dimensions of the tuned pipe are selected, the super charging actions of that pipe will be optimal at the specific parameter values for which it was tuned and because conventional tuned pipes are fixed in dimension, these parameters are not adjustable during use of the vehicle in which the engine is installed. When the tuned pipe is not operating at these specific tuned parameter values, the super charging effect will be less than optimal and consequently the operation of the engine will be less than optimal at the desired operating RPM. For this reason, when the restrictions of a turbocharger or a variable valve such as the valve 630 are added along the flow path of the exhaust which causes the temperature and/or pressure to be changed within the tuned pipe at any given time of operation, compensations must be made in order to prevent these changes from negatively affecting engine performance or otherwise limit negative effects on engine performance. It should thus be understood that two stroke engines, due to this super charging action, are sensitive to variations within the tuned pipe.

The exhaust system 600 also includes a bypass conduit 620 to direct the flow of the exhaust gas to either bypass the turbocharger 300 or to pass through the exhaust turbine 350 of the turbocharger 300 to operate the air compressor 310. The pipe outlet 206 located at the end of the exhaust pipe 202 fluidly communicates with the bypass conduit 620. Specifically, the bypass conduit 620 defines an exhaust inlet 622 which is fluidly connected to the pipe outlet 206. The exhaust inlet 622 and the pipe outlet 206 are arranged such that exhaust gas passing from the pipe outlet 206 into the exhaust inlet 622 passes through the inlet 622 generally normal to the inlet 622. A central axis 629 (FIGS. 13, 14) of the exhaust inlet 622 illustrates the general direction of exhaust gas flow into the bypass conduit 620. In the present implementation, the central axis 629 coincides with the center of the circular inlet 622, but that may not always be the case.

The bypass conduit 620 is further fluidly connected to the housing 302 of the turbocharger 300. More specifically, the bypass conduit 620 is mechanically connected to the turbocharger housing 302 in the present implementation by a clamp 303. It is contemplated that the bypass conduit 620 could be an independent apparatus from the turbocharger 300. It is also contemplated that the bypass conduit 620 could be fastened or otherwise mechanically connected to the turbocharger housing 302. It is further contemplated that the bypass conduit 620 and the turbocharger housing 302 could be integrally formed.

Figure 14:
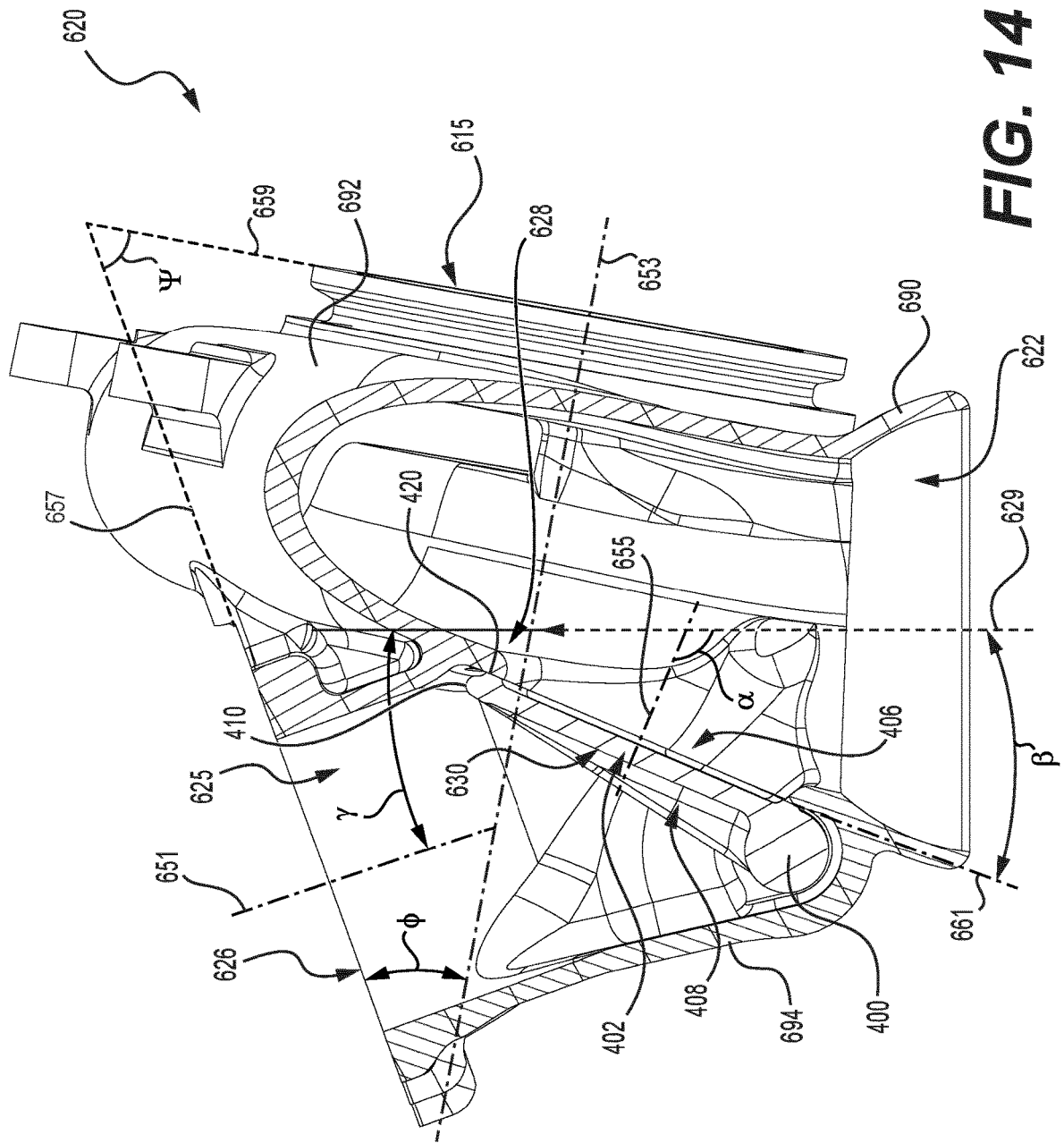
FIG. 14 is a cross-sectional view of the bypass conduit of FIG. 12, taken along line 14-14 of FIG. 13, with a valve in a closed position.

The bypass conduit 620 is generally Y-shaped, with an inlet conduit portion 690 extending from the exhaust inlet 622 and branching into two outlet conduit portions 692, 694 (FIG. 14). As such and as is mentioned above, the bypass conduit 620 serves to selectively direct the exhaust gas which enters through the exhaust inlet 622 either into the exhaust turbine 350 or bypassing the exhaust turbine 350. As shown in FIG. 14, the turbine outlet portion 692 of the bypass conduit 620 (one branch of the Y-shape) defines a passage ending in an outlet 615 that fluidly communicates with the turbine inlet 355. A bypass outlet portion 694 (the other branch of the Y-shape) allows exhaust gas to bypass the turbocharger 300 to exit the bypass conduit 620 through a bypass outlet 626. The bypass outlet portion 694 defines a passage 625 which allows for fluid communication between the exhaust inlet 622 and the outlet 626. The outlet 626 and the passage 625 can be seen in FIG. 17. Best seen in FIG. 16, the bypass conduit 620 further includes a flow divider 628 disposed between the conduit portions 692, 694. The flow divider 628 aids in smoothly dividing the exhaust gas flow through the bypass conduit 620, in order to aid in avoiding flow separation or the creation of vortices in the exhaust gas flow. To that end, the flow divider 628 is generally shaped and arranged to avoid abrupt edges.

Flow of the exhaust gas through the passage 625 is selectively controlled by a valve 630 disposed in the bypass conduit 620, in conjunction with a system controller 500 controlling the valve 630. More specifically, the valve 630 is a valve for selectively diverting exhaust gas away from the turbocharger 300. In the present implementation, the valve 630 is disposed in the passage 625, and more specifically at a valve seat 623 thereof. It is contemplated that the valve 630 could be disposed elsewhere in the bypass conduit 620, for example nearer the exhaust inlet 622 and just upstream from the passage 625, depending on the specific implementation of the valve 630. It is also contemplated that in some implementations, the valve 630 could selectively open or close the turbine outlet portion 692 rather than the bypass passage 625.

With reference to FIGS. 26 to 29, the valve 630 has a base portion 400 and a body portion 402 extending from the base portion 400. The base portion 400 is configured for pivotably mounting the valve 630 within the bypass conduit 620 and thus defines a valve pivot axis 404 about which the valve 630 is pivotable during use. More specifically, the base portion 400 is generally cylindrical and has an axle 440 including two axle portions 441 extending in opposite directions from a central section of the base portion 400. While the axle 440 is made integrally with the valve 630 in this embodiment, it is contemplated that, in other embodiments, the axle 440 could be a separate component (e.g., two separate axle portions connectable to the base portion 400).

The body portion 402 is the portion of the valve 630 which is used to block the passage 625. The body portion 402 has an upstream side 406 and a downstream side 408 opposite the upstream side 406. The upstream side 406 is exposed, during use, to fluid flow in the bypass conduit 620. In other words, the upstream side 406 generally faces the inlet 622 while the downstream side 408 faces the bypass outlet 626. The body portion 402 of the valve 630 is shaped to facilitate control of exhaust gas flow through the passage 625. Notably, the body portion 402 has a generally pointed shape defining a rounded tip 410 at a location of the body portion 402 furthest from the base portion 400 in a length direction of the valve 630 (generally perpendicular to the valve pivot axis 404). As such, the body portion 402 of the valve 630 (i.e., the portion of the valve 630 used to block the passage 625) can be said to be generally elongated.

A periphery 412 of the body portion 402 generally defines the shape thereof. The periphery 412 includes two opposite lengthwise edges 414 that extend from the base portion 400 in a direction generally parallel to the length direction of the valve 630. The periphery 412 also includes a rounded edge 416 defined by the rounded tip 410, and two converging angular edges 418 extending between the two lengthwise edges 414 and respective ends of the rounded edge 416 (i.e., the angular edges 418 connect the lengthwise edges 414 to the rounded edge 416). The angular edges 418 converge toward each other as the two angular edges 418 extend from the two lengthwise edges 414 to the ends of the rounded edge 416. Each of the angular edges 418 is thus disposed at an angle θ relative to the length direction of the valve 630. The angle θ may be between 10° and 45° inclusively. For instance, in this implementation, the angle θ is approximately 30°.

Figures 26, 27:
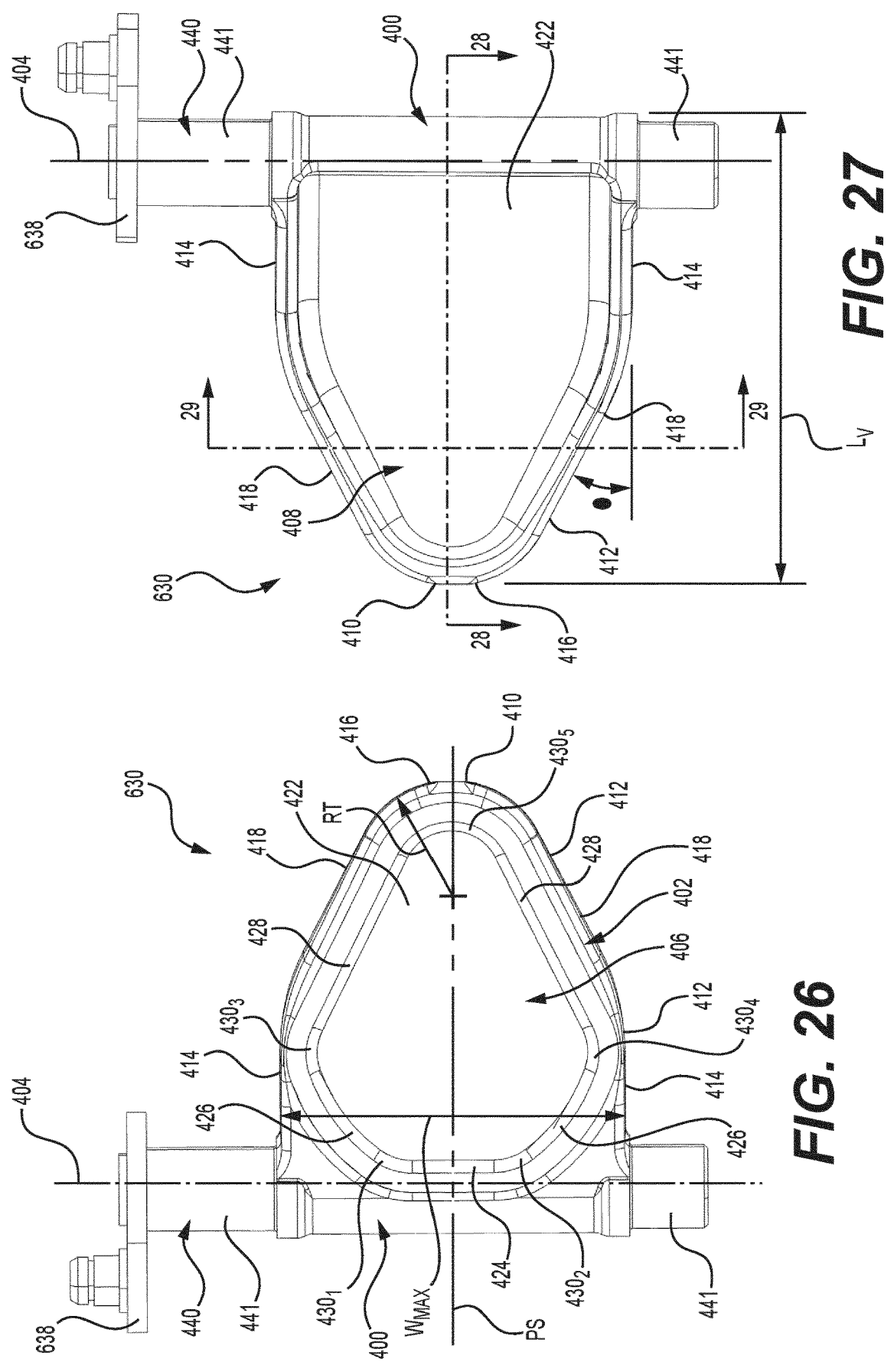

As shown in FIG. 26, the body portion 402 of the valve 630 is generally symmetrical about a plane of symmetry PS bisecting the rounded tip 410. The plane of symmetry PS is perpendicular to the valve pivot axis 404. One of each of the lengthwise edges 414 and angular edges 418 is disposed on either side of the plane of symmetry PS. Moreover, in this implementation, the base portion 402 of the valve 630 is also symmetrical about the plane of symmetry PS. However, it is contemplated that the valve 630 could not be symmetrical about the plane PS.

A width of the body portion 402, measured in a direction parallel to the valve pivot axis 404, varies along the length direction of the valve 630. For instance, the width of the body portion 402 is largest adjacent the base portion 400. More specifically, a maximal width $W_{max}$ of the body portion 402 is measured between the two opposite lengthwise edges 414. The width of the body portion 402 decreases at the angular edges 418 along the length direction of the valve 630 toward the rounded tip 410. Notably, the width of the body portion 402 is smallest at the rounded tip 410.

As shown in FIG. 27, a length $L_V$ of the valve 630 is measured from the base portion 400 to the rounded tip 410 in the length direction of the valve 630. In this implementation, the length $L_V$ of the valve 630 is greater than or equal to the maximal width $W_{max}$ of the body portion 402. Notably, the length $L_V$ is greater than the maximal width $W_{max}$ such that a ratio $L_V/W_{max}$ of the length $L_V$ of the valve 630 over the maximal width $W_{max}$ of the body portion 402 is greater than 1. For instance, the ratio $L_V/W_{max}$ may be between 1 and 2 inclusively. Notably, the ratio $L_V/W_{max}$ is between 1.2 and 1.6. In one particular embodiment, the ratio $L_V/W_{max}$ is approximately 1.3.

Furthermore, a ratio $W_{max}/RT$ of the maximal width $W_{max}$ of the body portion 402 over a tip radius RT of the rounded tip 410 is greater than 2. For instance, the ratio $W_{max}/RT$ may be between 2 and 6 exclusively. In this implementation, the ratio $W_{max}/RT$ is approximately 3.

As shown in FIG. 26, the body portion 402 of the valve 630 has a ridge 420 disposed on the upstream side 406. Notably, the ridge 420 protrudes from a generally planar surface 422 of the upstream side 406. In this implementation, a height of the ridge 420 measured from the surface 422 is constant. The ridge 420 forms a closed shape which, in this implementation, is generally pentagonal. As will be described in more detail below, the periphery 412 contours part of the ridge 420.

In this implementation, the ridge 420 has five edges including a base edge 424, two outwardly-extending edges 426 and two inwardly-extending edges 428. The base edge 424 extends generally parallel to the valve pivot axis 404 and is disposed near the base portion 400 of the valve 630. Each outwardly-extending edge 426 extends from a corresponding end of the base edge 424 outwardly toward a corresponding one of the lengthwise edges 414 of the periphery 412 of the body portion 402. The inwardly-extending edges 428 are generally parallel to corresponding ones of the angular edges 418 of the periphery 412 of the body portion 402. Each inwardly-extending edge 428 extends from an end of a corresponding one of the outwardly-extending edges 426.

The edges 424, 426, 428 of the ridge 420 meet at corresponding rounded vertices 4301-4305. Notably, the inwardly-extending edges 428 converge at a distal rounded vertex 4305 which, amongst the vertices 4301-4305, is furthest from the base portion 400. The distal rounded vertex 4305 is generally concentric with the rounded edge 416 of the periphery 412 of the body portion 402. Notably, the rounded edge 416 of the periphery 412 contours the rounded vertex 4305 of the ridge 420. Furthermore, the angular edges 418 and the lengthwise edges 414 contour the inwardly and outwardly-extending edges 428, 426 respectively.

Figure 29:
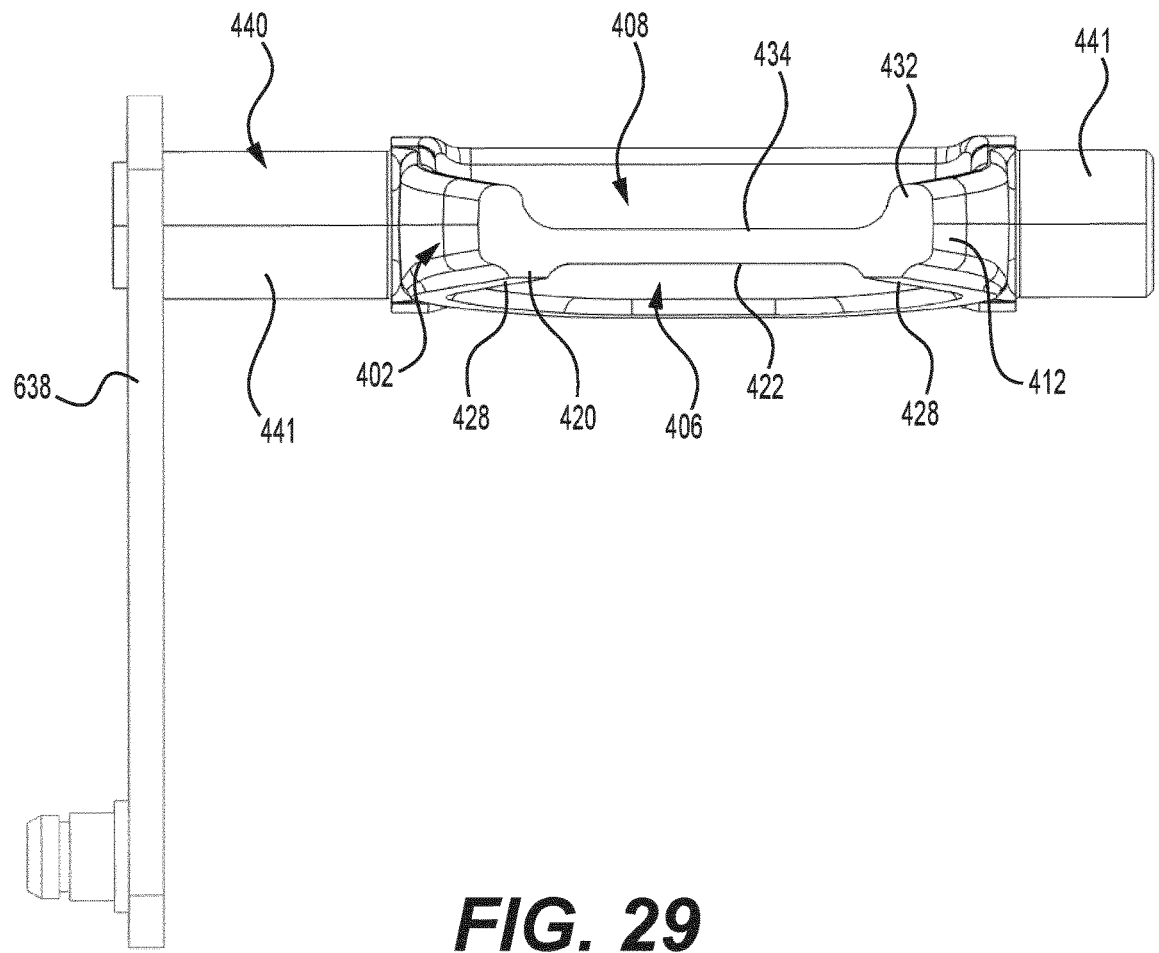
FIG. 29 is a cross-sectional view of the valve of FIG. 26, taken along line 29-29 of FIG. 27.

As shown in FIG. 29, a cross-sectional profile of the ridge 420, which can be observed for example along a plane normal to the length direction of the valve 630, is generally trapezoidal.

Figure 28:
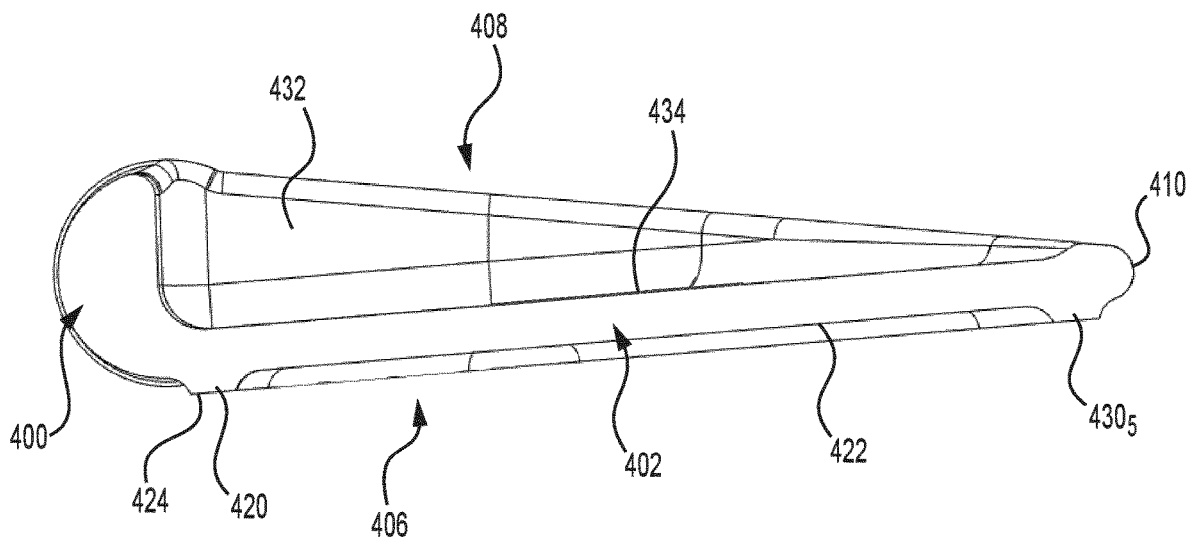
FIG. 28 is a cross-sectional view of the valve of FIG. 26, taken along line 28-28 of FIG. 27.

With reference to FIGS. 27 to 29, the body portion 402 of the valve 630 also has a peripheral lip 432 protruding on the downstream side 408 of the body portion 402. The peripheral lip 432 extends from the periphery 412 of the body portion 402. The peripheral lip 432 therefore has generally the same shape as that defined by the periphery 412. The peripheral lip 432 has a variable height measured from a surface 434 of the downstream side 408 of the body portion 402. The height of the peripheral lip 432 adjacent the base portion 400 is greater than the height of the ridge 420.

The valve 630 as described above is generally shaped to avoid abrupt edges to aid in preventing flow separation or the creation of vortices in the exhaust gas flow within the bypass conduit 620.

In this implementation, the valve 630 is a single-piece component in that the base portion 400 and the body portion 402 are made integrally. However, it is contemplated that, in alternative implementations, the base portion 400 and the body portion 402 may be made as separate components and connected to one another to form the valve 630.

With reference to FIG. 12, an actuator 635 is operatively connected to the valve 630 to cause the valve 630 to pivot about the valve pivot axis 404 (shown in FIG. 26). In this implementation, the actuator 635 is a servomotor. It is contemplated that any other suitable type of actuator may be used in other implementations. The actuator 635 is connected to the valve 630 via a linkage assembly 636. More specifically, in this implementation, the linkage assembly 636 includes three arms 637, 638, 639. The arm 637 is connected to the actuator 635 and is rotatable thereby. The arm 638 is connected to the axle 440 of the base portion 400 of the valve 630. The arm 639 is connected between the arms 637, 638. Rotation of the arm 637 therefore actuates the two other arms 638, 639 and causes the valve 630 to pivot between an open position, a closed position, and intermediate positions as will be described below. It is contemplated that, in some implementations, the valve 630 could rotate, translate, or be moved otherwise to control exhaust gas flow through the passage 625.

Figure 15:
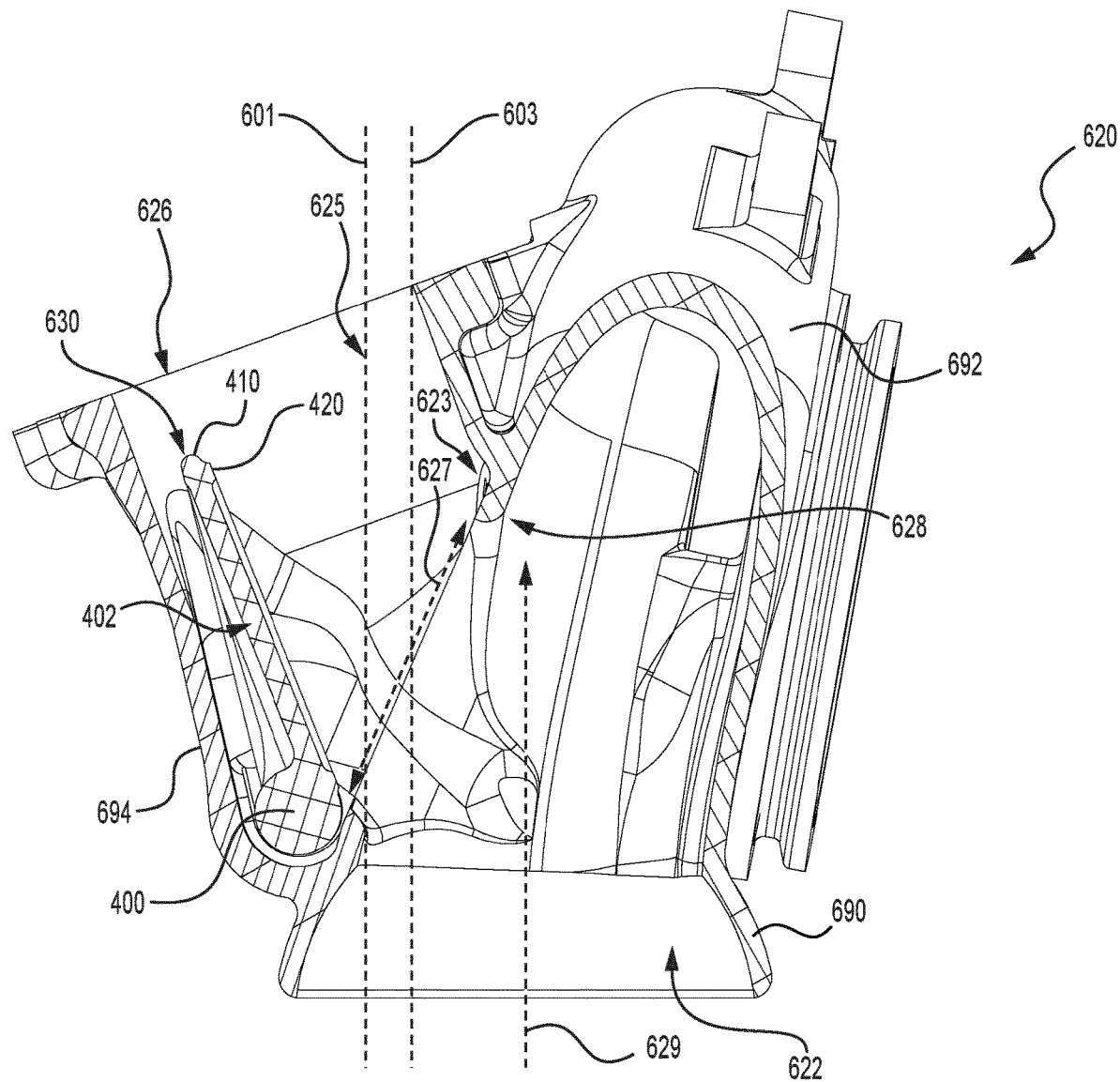
FIG. 15 is the cross-sectional view of FIG. 14, with the valve in an open position.

The valve 630 is controlled to regulate the flow of exhaust gas through the turbocharger 300 by selectively blocking or opening a valve opening 627 (FIG. 15) defined by the valve seat 623 of the passage 625. The valve opening 627 defined by the valve seat 623 is thus shaped such that it corresponds to the shape of the body portion 402 of the valve 630 (i.e., generally elongated and having a rounded tip). The valve 630 is pivotably mounted at the valve seat 623 via the base portion 400 of the valve 630 and is selectively movable between: an open position in which exhaust gas flow through the valve opening 627 (and thus the passage 625) is substantially unimpeded by the valve 630; a closed position in which the valve 630 fully closes the valve opening 627 such that exhaust gas flow through the valve opening 627 is cut-off by the valve 630; and any number of intermediate positions between the open and closed positions. In this implementation, as shown in FIG. 15, in its open position, the valve 630 is at approximately 45° (measured from the valve seat 623—i.e., 0° corresponding to the closed position of the valve 630). Moreover, in the open position, the valve 630 contacts a wall of the bypass conduit 620 on a side opposite the flow divider 628, but this may not be the case in all implementations.

Figure 16:
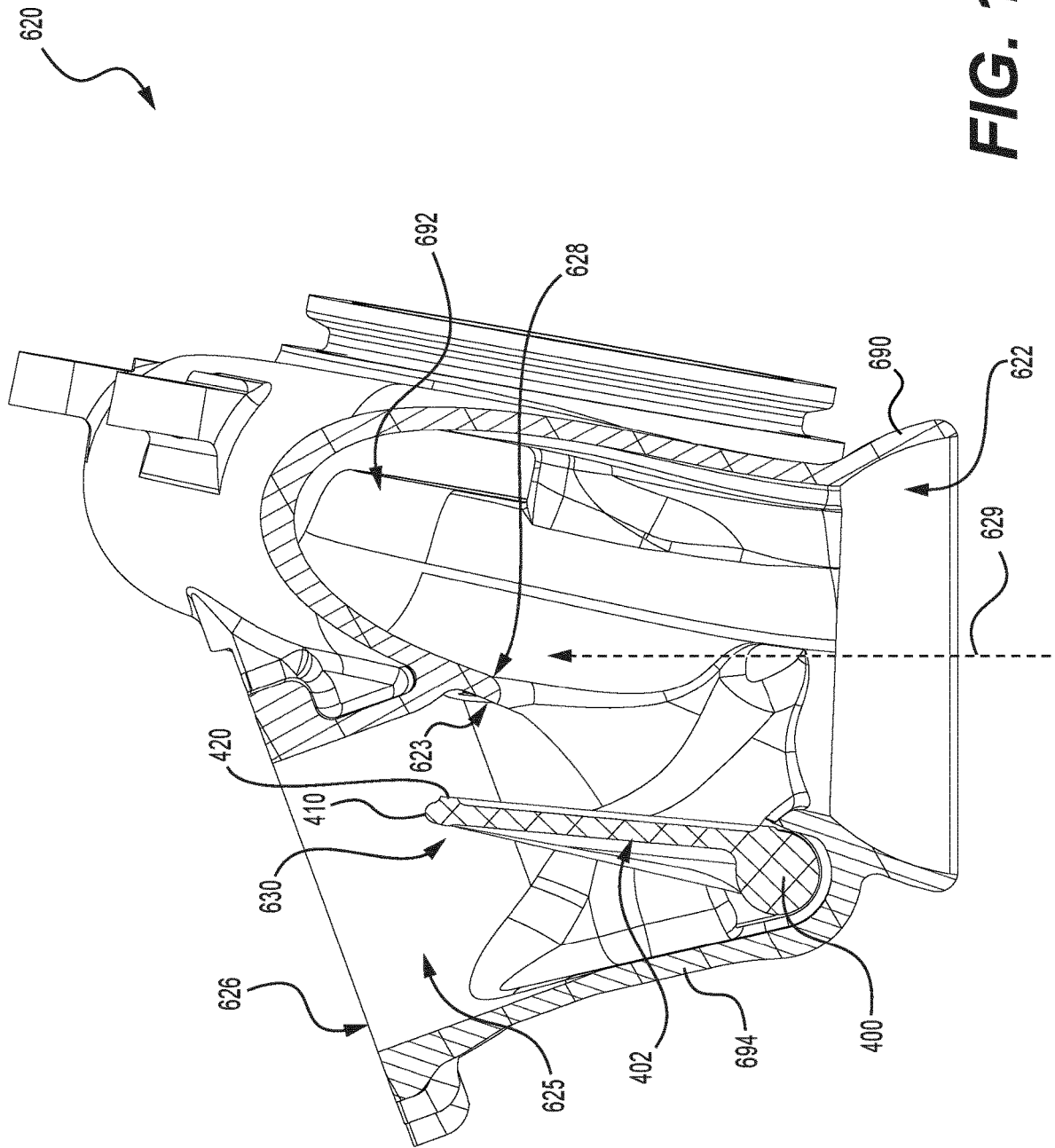
FIG. 16 is the cross-sectional view of FIG. 14, with the valve in an intermediate position.
Figure 17:
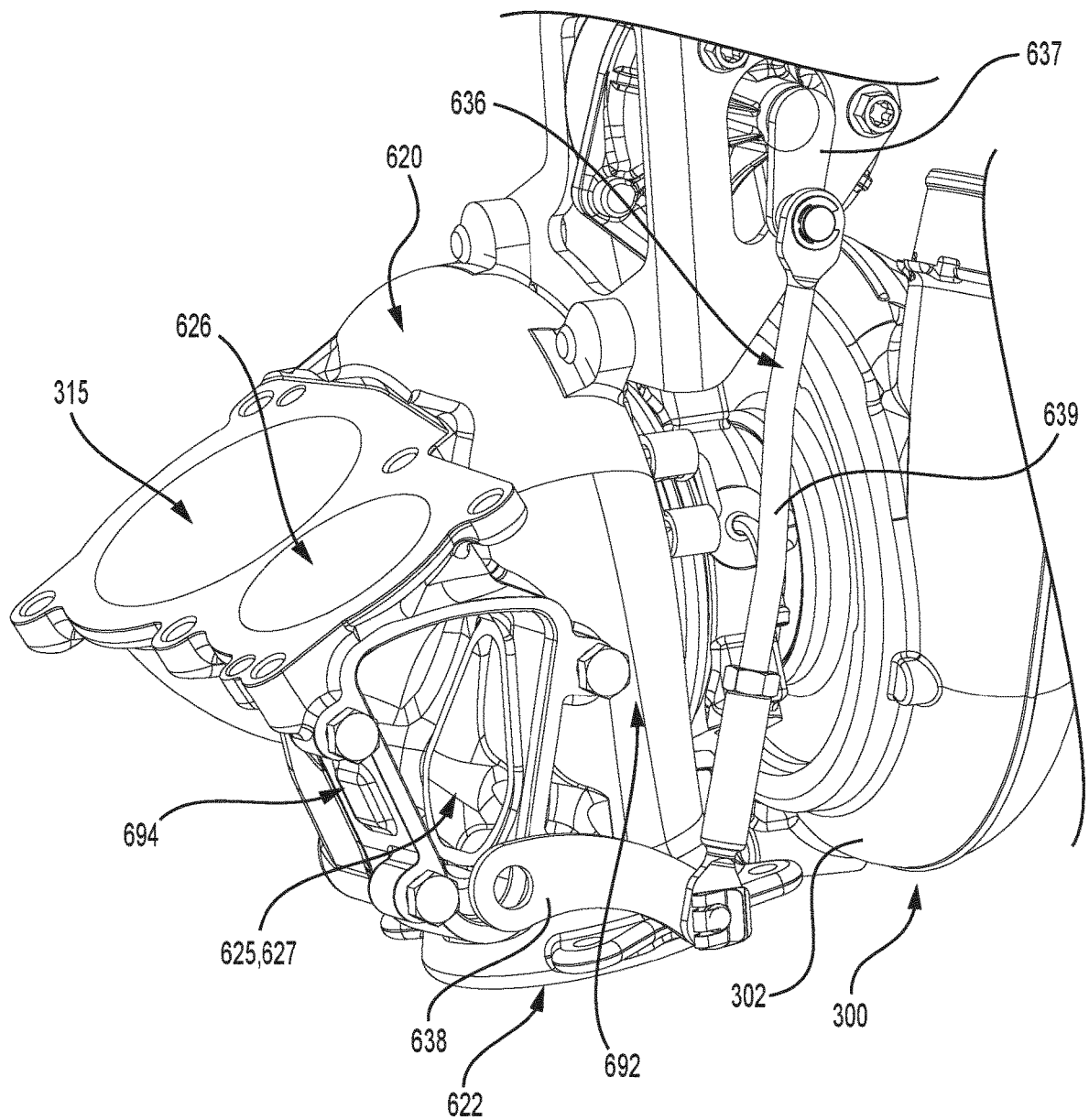
FIG. 17 is a perspective view of portions of the turbocharger and the bypass conduit of FIG. 12, with a portion of the top of the bypass conduit and the valve having been removed.
Figure 18:
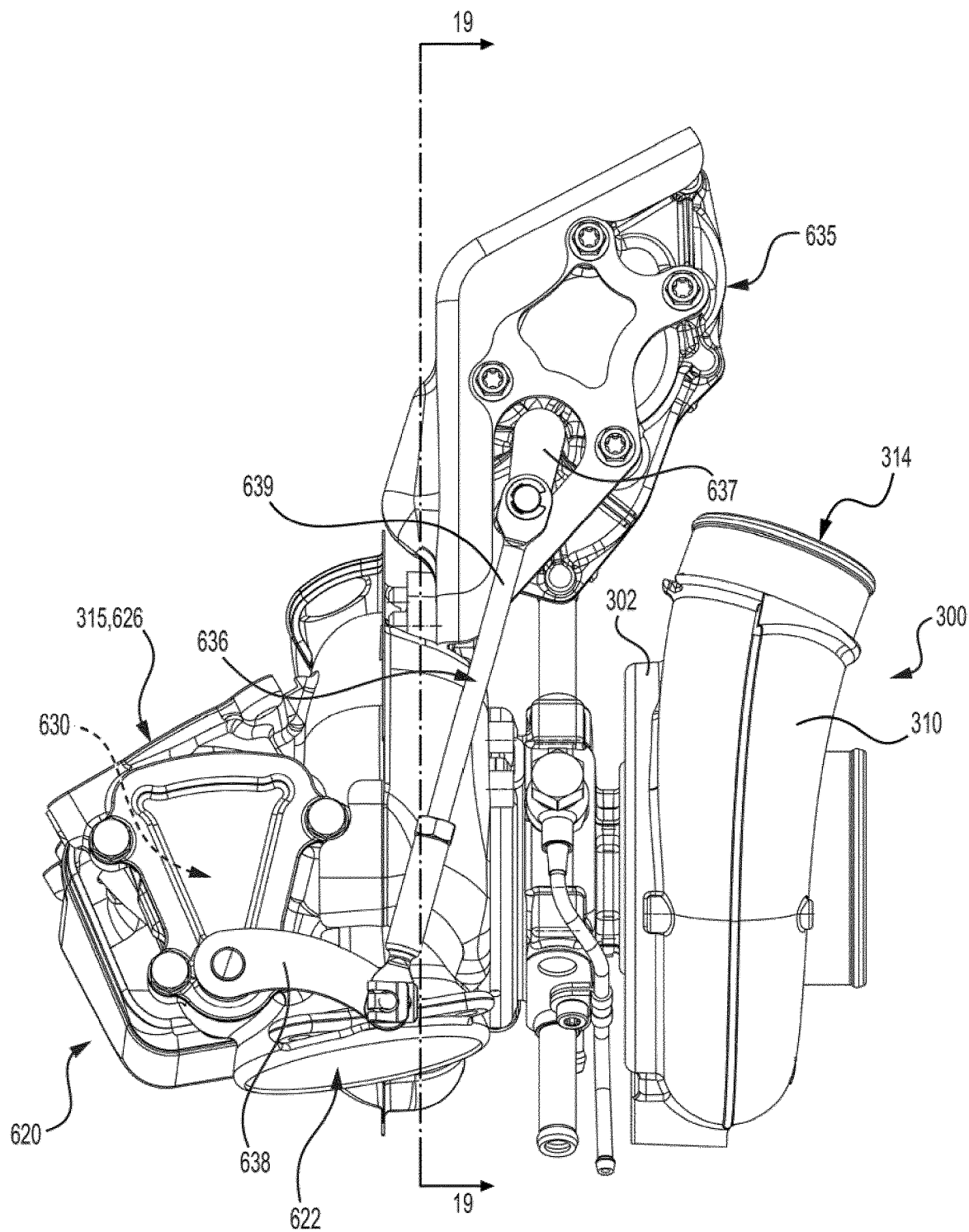
FIG. 18 is a top plan view of the turbocharger and bypass conduit of FIG. 12.

A cross-section of the bypass conduit 620 is illustrated in FIGS. 14 to 16 to show the different positions of the valve 630. FIG. 14 illustrates the closed position; FIG. 15 illustrates the open position (also illustrated in FIG. 25); and FIG. 16 illustrates one of the many possible intermediate positions of the valve 630. As can be seen, the valve 630 is oriented in the bypass conduit 620 such that the rounded tip 410 is downstream of the base portion 400. That is, in the open, closed and intermediate positions, the rounded tip 410 of the valve 630 is downstream of the base portion 400. The exhaust gas flow through the bypass conduit 620 for each of the relative positions of the valve 630 will be described in more detail below. As can be seen in FIG. 14, in its closed position, the valve 630 contacts the valve seat 623. More specifically, in the closed position, the ridge 420 of the body portion 402 of the valve 630 sits against the valve seat 623.

Figure 30:
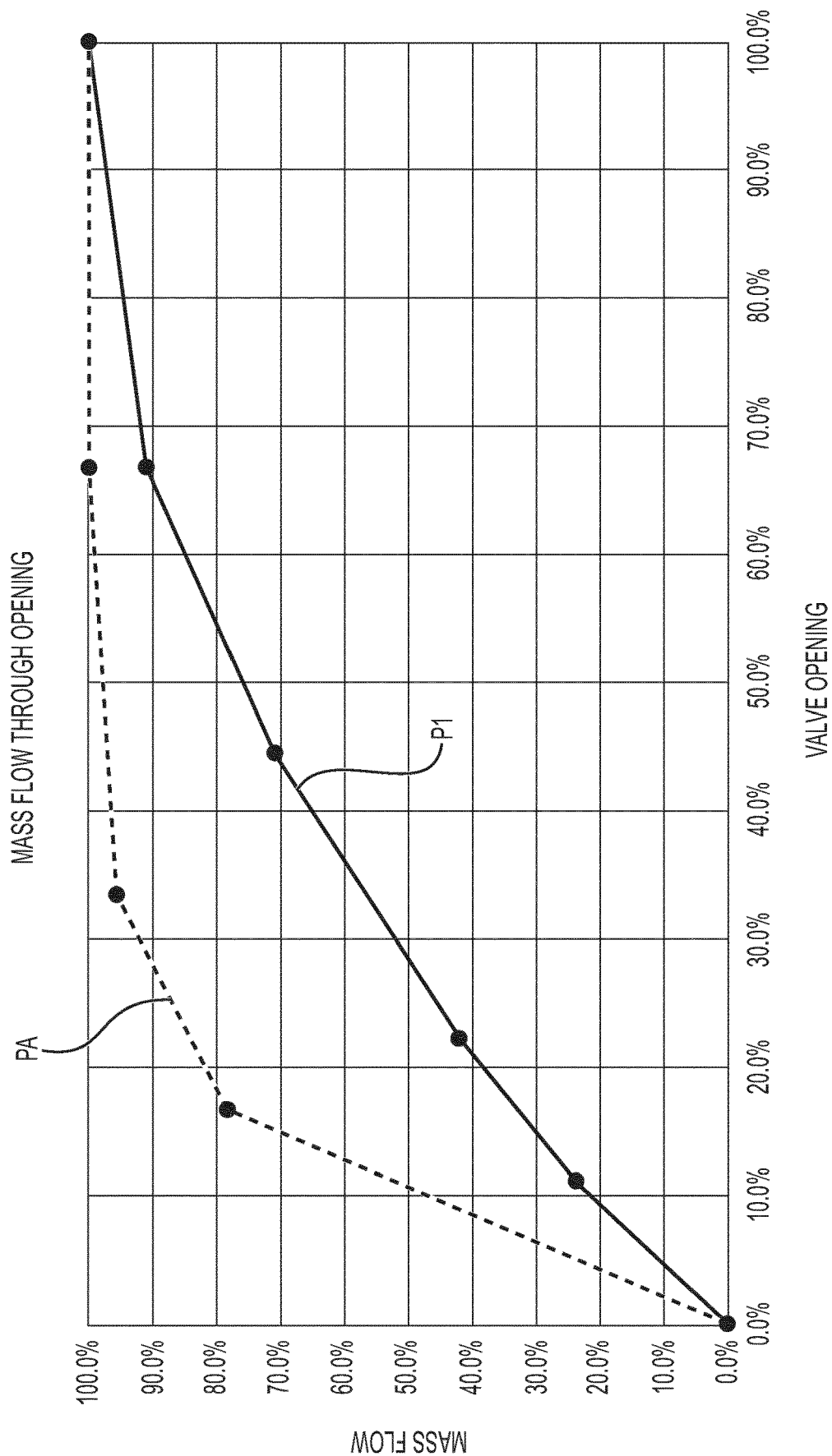
FIG. 30 is a chart representing a percentage mass flow through an opening as a function of a position of a valve.

In relation to a circular valve, the generally elongated shape of the valve 630 as described above establishes a more linear relationship between the mass flow of exhaust gas through the opening 627 and the angle at which the valve 630 is open. In other words, a greater control of the mass flow of exhaust gas through the opening 627 is made possible by the shape of the valve 630. Consequently, back pressure within the exhaust system 600 caused by opening the valve 630 can be controlled more precisely than with a circular valve. This can be seen in the chart of FIG. 30 which illustrates a percentage mass flow through an opening as a function of a position of a valve (expressed as a percentage—0% corresponding to the closed position of the valve; 100% corresponding to the fully open position of the valve) for the valve 630 of the present technology and for a circular valve. The percentage mass flow reaches 100% when the valve is in the open position (for the valve 630 this corresponds to a 45° angle, but is approximately 90° for the circular valve). Notably, the performance curve P1 represents the percentage mass flow through the opening 627 as a function of the position of the valve 630 in accordance with the present technology. By way of contrast, the performance curve PA represents the percentage mass flow through a circular opening as a function of the position of its corresponding circular valve. As can be seen, in accordance with the present technology, the relationship between the mass flow percentage through the opening 627 and the position of the valve 630 is markedly more linear than for the circular valve, particularly at smaller angles of the valve (e.g., below 45%—i.e., below 20° for the valve 630).

In addition to the particular shape of the valve 630, the different passages defined by the bypass conduit 620 are also oriented in a particular manner. For instance, with reference to FIG. 14, in this embodiment, the bypass outlet 626 of the bypass outlet portion 694 and the outlet 615 of the turbine outlet portion 692 face directions that are not parallel to one another. In particular, an angle ψ is formed between a plane 657 extending through the outermost face of the bypass outlet portion 694 that defines the bypass outlet 626 and a plane 659 extending through the outermost face of the turbine outlet portion 692 that defines the outlet 615. The angle ψ formed between the planes 657, 659 measures between 40° and 80° inclusively. More specifically, in this embodiment, the angle ψ measures approximately 60°.

Furthermore, with continued reference to FIG. 14, an angle β formed between a plane 661 extending through the periphery of the valve seat 623 that defines the opening 627 and the central axis 629 of the exhaust inlet 622 measures between 0° and 40° inclusively. In particular, in this embodiment, the angle β measures approximately 20°. An angle α formed between an axis 655 normal to the plane 661 and the central axis 629 of the exhaust inlet 622 measures between 100° and 140° inclusively. In particular, in this embodiment, the angle α measures approximately 115°. An angle γ formed between the central axis 629 of the exhaust inlet 622 and an axis 651 normal to the plane 657 extending through the outermost face of the bypass outlet portion 694 that defines the bypass outlet 626 measures between 0° and 40° inclusively. In particular, in this embodiment, the angle γ measures approximately 20°. Lastly, an angle φ formed between the plane 657 extending through the outermost face of the bypass outlet portion 694 that defines the bypass outlet 626 and an axis 653 normal to the plane 659 extending through the outermost face of the turbine outlet portion 692 that defines the outlet 615 measures between 10° and 50° inclusively. In particular, in this embodiment, the angle φ measures approximately 30°. It is to be understood that, in this embodiment, the axis 653 is parallel to the turbine axis 353 about which the turbine wheel 351 rotates. In particular, the axis 653 is coaxial with the turbine axis 353.

The exhaust system 600 further includes the system controller 500, which is operatively connected to an engine control unit (or ECU) and/or the electrical system (not shown) of the snowmobile 10. The engine control unit is in turn operatively connected to the engine 26. As will be described in more detail below, the system controller 500 is also operatively and communicatively connected to an atmospheric pressure sensor 504, also referred to as an air intake sensor 504, for sensing the atmospheric or ambient air pressure of the intake air coming into the air intake system 100. It should be noted that the atmospheric pressure sensor 504, also referred to herein as an intake pressures sensor 504, senses the air pressure in the primary airbox 120, and as such measures the air intake pressure from air entering either from the ambient air around the snowmobile 10 and/or the air entering the primary airbox 120 from the turbocharger 300.

Similarly, the system controller 500 is also operatively and communicatively connected to an atmospheric temperature sensor 505, also referred to as an air intake temperature sensor 505, for sensing the atmospheric or ambient air temperature of the intake air coming into the air intake system 100. It should be noted that the atmospheric temperature sensor 505 senses the air temperature in the primary airbox 120, and as such measures the air intake temperature from air entering either from the ambient air around the snowmobile 10 and/or the air entering the primary airbox 120 from the turbocharger 300.

The actuator 635 for selectively moving the valve 630 is communicatively connected to the system controller 500 such that the position of the valve 630 is controllable thereby. It is contemplated that the valve 630 could be differently controlled or moved, depending on the implementation.

As is illustrated in the schematic diagram of FIG. 8 and as will be described in more detail below, the system controller 500 is also operatively connected to the throttle valve position sensor 588 for determining the position of the throttle valve 39, a rate of opening of the throttle valve 39, or both. In some modes of operation of the exhaust system 600, the valve 630 is selectively moved based on the throttle valve position determined by the throttle valve position sensor 588. In some modes of operation of the exhaust system 600, the valve 630 is selectively moved based on the rate of change of the throttle valve position or the rate of opening of the throttle valve 39, as determined by the throttle valve position sensor 588.

As is illustrated schematically in FIG. 8 and as will also be described in more detail below, the system controller 500 is further connected to an exhaust pressure sensor 590 for sensing the pressure at a point along an exhaust path of the engine 26, near the exhaust outlets 29. The pressure sensed by the exhaust pressure sensor 590 is used to determine the back pressure of the engine 26. Back pressure is understood to be the resistance to the flow of the exhaust gas between the engine 26 and an outlet of the muffler 650 due, at least in part, to twists, bends, obstacles, turns and sharp edges present in the various components of the exhaust system 600. In the present technology, reducing back pressure can assist in optimizing performance of the engine 26, as high back pressure can negatively impact the efficiency of the engine performance. Reducing the amount of back pressure in the exhaust system 600 may also have the effect of reducing what is known as "turbo lag", which is a delay in the response of a turbocharged engine after the throttle lever 86 has been moved for operating the throttle system.

Furthermore, in order to ensure good scavenging within the cylinders of the engine 26, in this embodiment, a ratio of the exhaust pressure over the intake pressure (as measured by the sensors 590, 504 respectively) is kept relatively constant. Notably, in this embodiment, the ratio of the exhaust pressure over the intake pressure is maintained at about 1.1, although this could vary in different embodiments.

With reference to FIG. 5, in the present implementation, the exhaust pressure sensor 590 is configured to sense the pressure along the exhaust path of the engine 26. In particular, the exhaust pressure sensor 590 has a sensing port (not shown) which is fluidly connected to the exhaust pipe 202. In the present implementation, the exhaust pressure sensor 590 senses a pressure within the diverging portion 605 of the exhaust pipe 202 but it is contemplated that the exhaust pressure sensor 590 could be configured so as to sense a pressure along other areas of the exhaust pipe 202. The sensing port of the exhaust pressure sensor 590 is connected via intermediate tube members to the exhaust pipe 202 since the exhaust pressure sensor 590 is not designed to withstand the elevated temperatures within the exhaust pipe 202. Notably, a metallic tube 593 is fluidly connected to the exhaust pipe 202, and a rubber tube 591 is in turn fluidly connected between the metallic tube 593 and the sensing port of the exhaust pressure sensor 590. The lengths and diameters of the tubes 591, 593 are chosen so that pressure waves travelling through the exhaust pipe 202 are not significantly distorted when they arrive at the sensing port of the exhaust pressure sensor 590, thus ensuring greater accuracy of the pressure sensed by the exhaust pressure sensor 590. It is contemplated that the exhaust pressure sensor 590 could be differently arranged, depending on details of a particular implementation. In some implementations, the system 600 could further include a differential sensor for determining a pressure differential between the air intake pressure entering the engine 26 and the exhaust pressure of exhaust gas exiting the engine 26. It is also contemplated that the differential sensor could replace one or both of the intake pressure sensor 504 and the exhaust pressure sensor 590 in some implementations.

Figure 8:
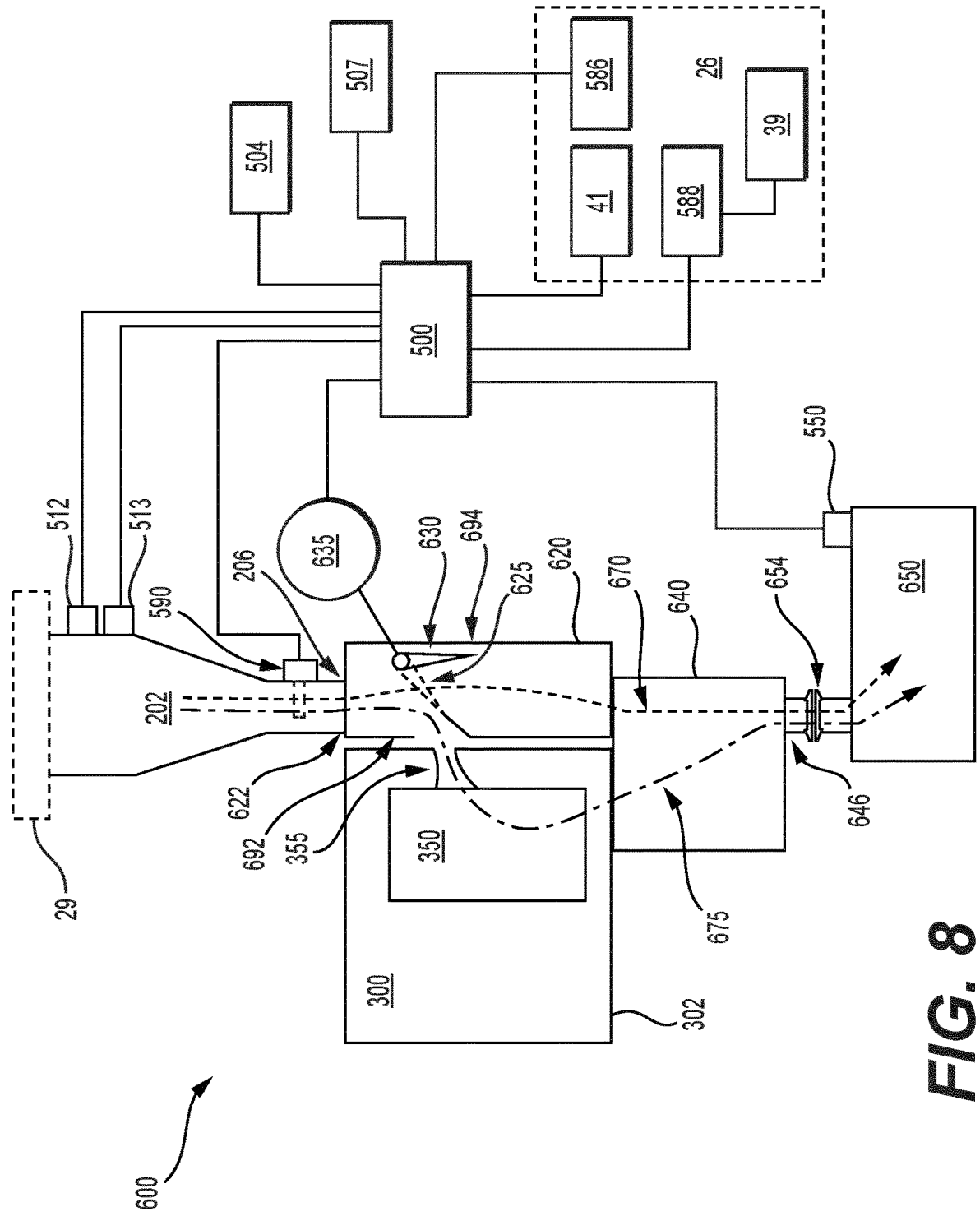
FIG. 8 is a schematic representation of the exhaust system of FIG. 2.
Figure 9:
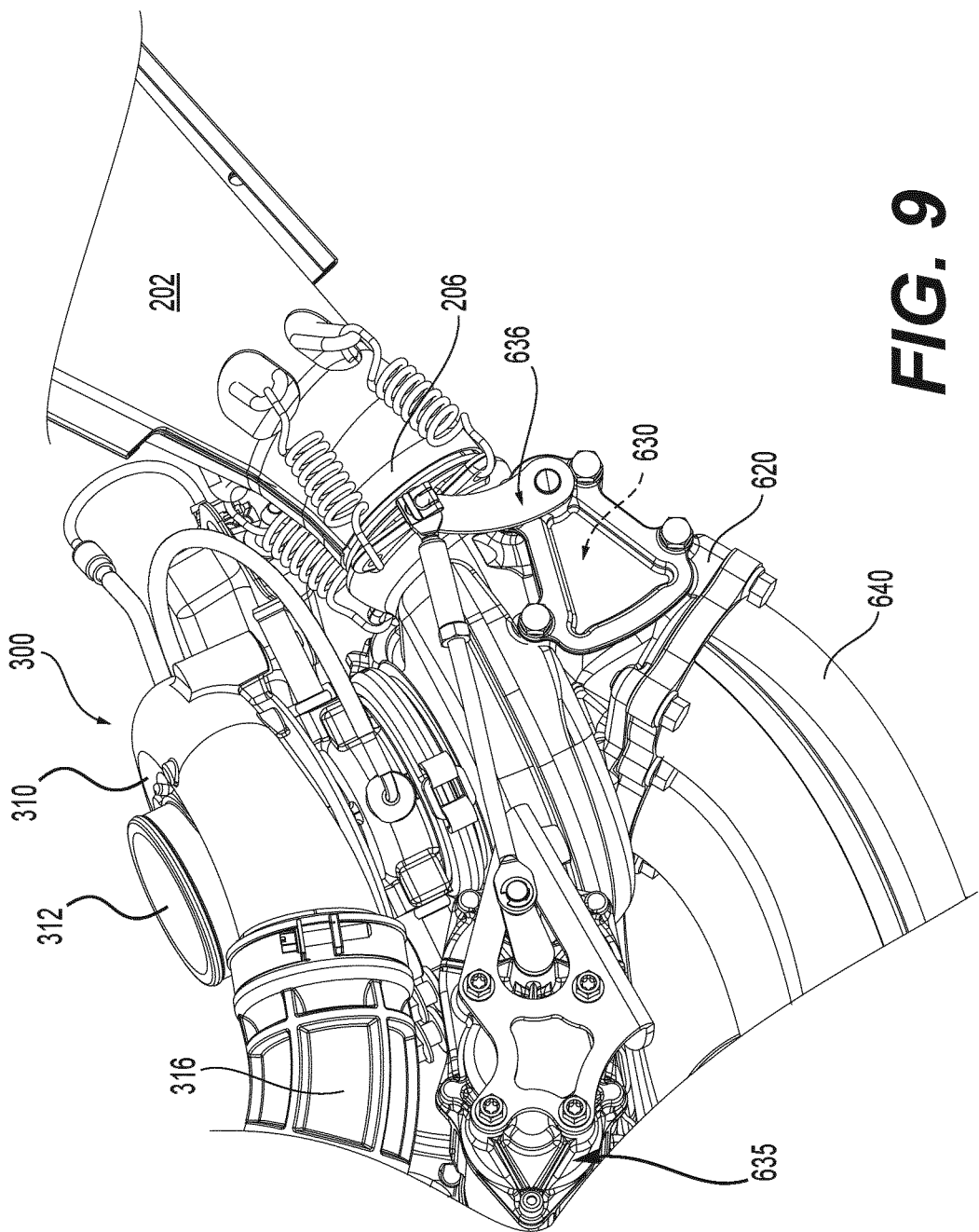
FIG. 9 is a close-up view of the portions of the air intake system and exhaust system of FIG. 5.

As is also illustrated in FIG. 8, the system controller 500 is further connected to several sensors for monitoring various exhaust system components. The system controller 500 is communicatively connected to an exhaust pipe temperature sensor 512 to detect the temperature of the exhaust pipe 202. As can be seen in FIG. 5, the exhaust pipe temperature sensor 512 includes a temperature probe connected to an outer wall of the exhaust pipe 202 within the converging section 607, but other positions along the exhaust pipe 202 are contemplated. The temperature probe extends within the exhaust pipe 202 so as to measure the temperature of the exhaust gas circulating therein. The system controller 500 is also communicatively connected to an exhaust oxygen sensor 513 to detect a concentration of oxygen in the exhaust transiting the exhaust pipe 202. As can be seen in FIG. 5, the exhaust oxygen sensor 513 includes a probe connected to and extending through the outer wall of the exhaust pipe 202 within the converging section 607, but other positions along the exhaust pipe 202 are contemplated.

Similarly, the system controller 500 is communicatively connected to a muffler temperature sensor 550 to detect the temperature of the muffler 650. These sensors 512, 550 could be used to monitor possible overheating or temperature imbalances, as well as to provide information to the system controller 500 to use in control methods such as those described herein. In order to determine an engine speed of the engine 26, the system controller 500 is further communicatively connected to an engine speed sensor 586 disposed in communication with the engine 26.

Figure 20B:
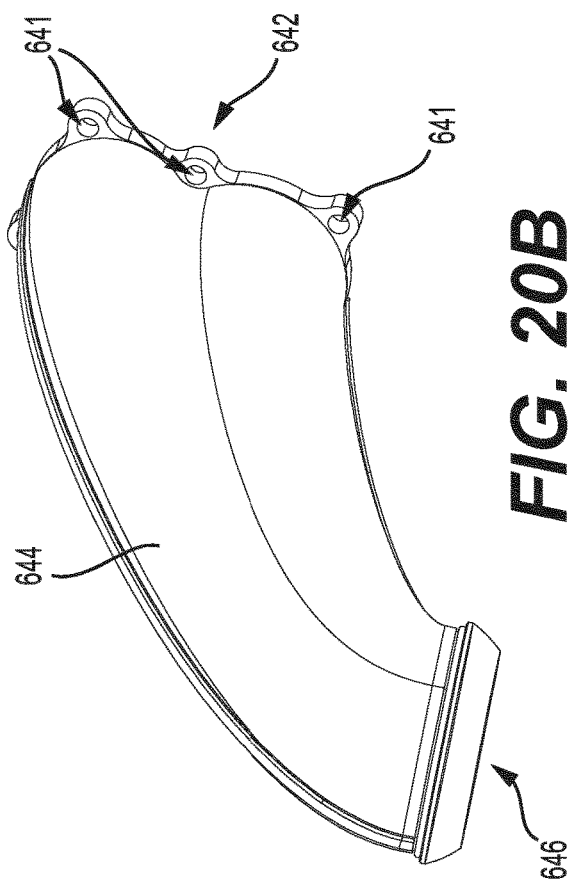
FIG. 20B is a top, right side perspective view of the exhaust collector of FIG. 20A.
Figure 20A:
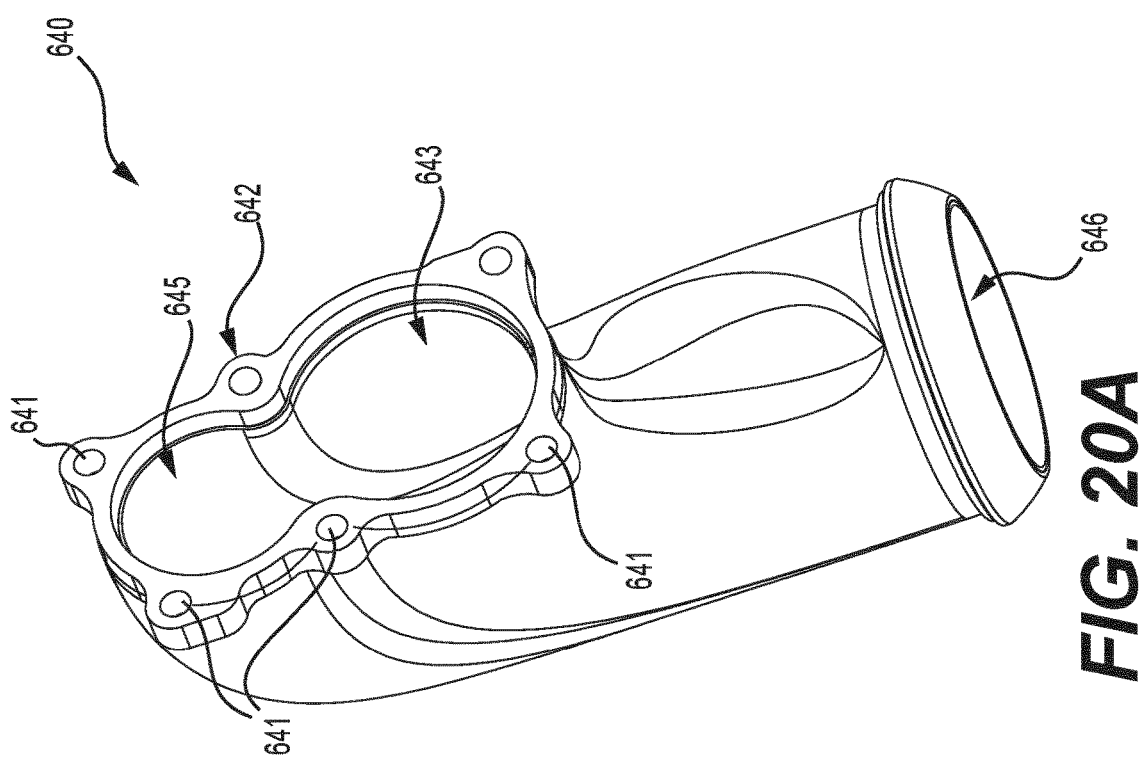
FIG. 20A is a left side elevation view of the exhaust collector of FIG. 12, shown in isolation.

The exhaust system 600 further includes an exhaust collector 640 fluidly connected to the bypass conduit 620 and the turbocharger 300. The exhaust collector 640, shown in isolation in FIGS. 20A to 20C, includes an inlet 642 through which the exhaust collector 640 receives exhaust gas from both the bypass conduit 620 and the exhaust turbine 350.

More specifically, the inlet 642 receives exhaust gas that bypasses the exhaust turbine 350 and exits through the outlet 626 of the bypass conduit 620. The inlet 642 also receives exhaust gas that has passed through the exhaust turbine 350 from an outlet 315 of the turbocharger housing 302. The inlet 642 includes two portions: a lower portion 643 and an upper portion 645. The lower and upper portions 643, 645 are integrally connected to define a peanut-shaped opening in the inlet 642. It is contemplated that the inlet 642 could be differently shaped depending on the implementation.

The lower portion 643 is fluidly connected to the housing 302 to receive exhaust gas therethrough from the exhaust turbine 350 through the outlet 315. The upper portion 645 is fluidly connected to the bypass conduit outlet 626 to receive therethrough the exhaust gas that has bypassed the exhaust turbine 350. The exhaust collector 640 also includes an outlet 646, through which exhaust gas passing into the exhaust collector 640 exits. It is contemplated that the two inlet portions 643, 645 could be separated in some implementations, such that the exhaust collector 640 could be generally Y-shaped for example.

The exhaust collector 640 is bolted to the housing 302 and the bypass conduit 620 using through-holes 641 defined in a periphery of the inlet 642. It is contemplated that the exhaust collector 640 could be differently connected to the turbocharger housing 302 and the bypass conduit 640 in different implementations. It is also contemplated that the exhaust collector 640 could be integrally formed with the bypass conduit 620 and/or the turbocharger housing 302.

Figure 10:
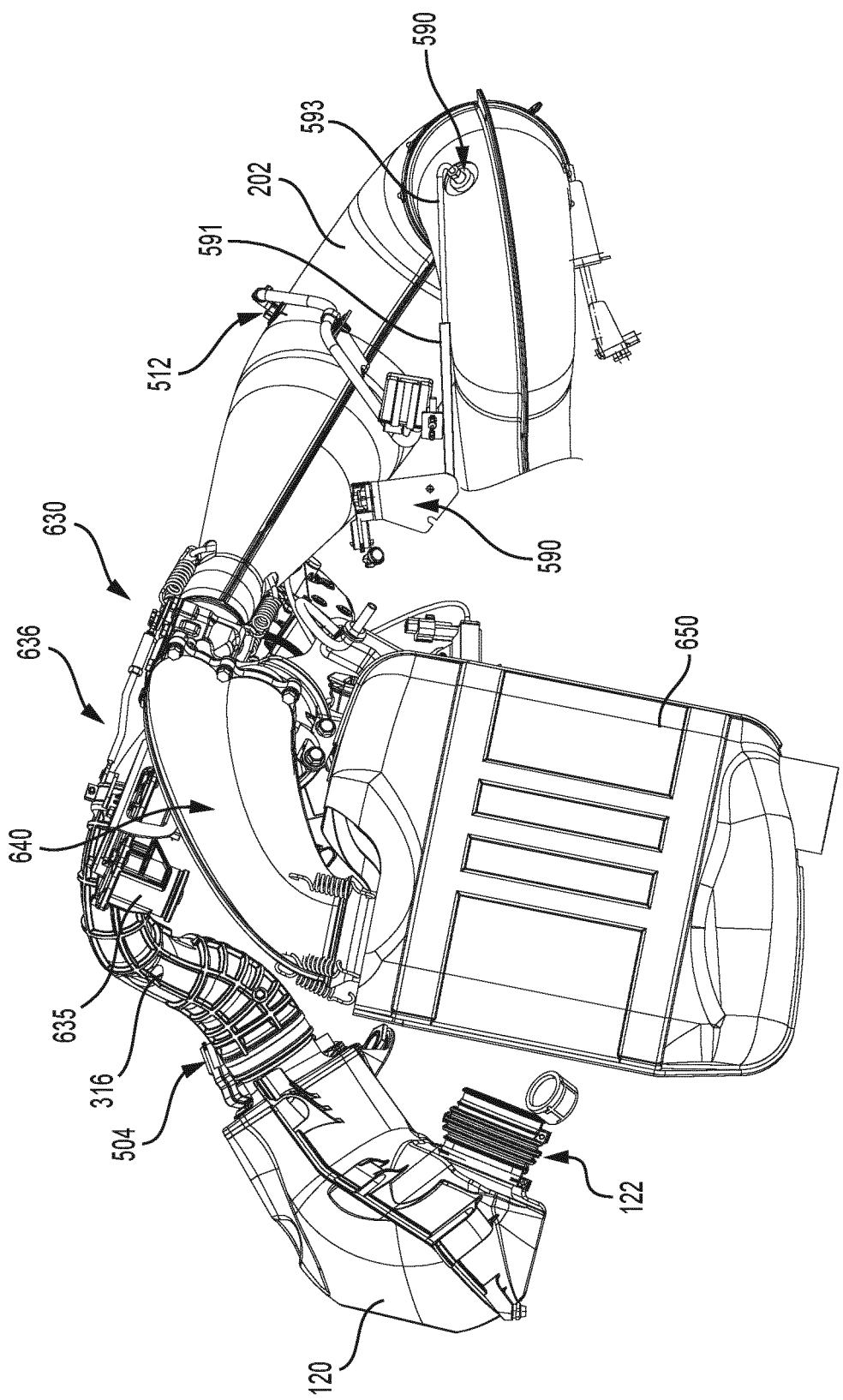
FIG. 10 is a right side elevation view of portions of the air intake system and the exhaust system of FIG. 2.
Figure 11:
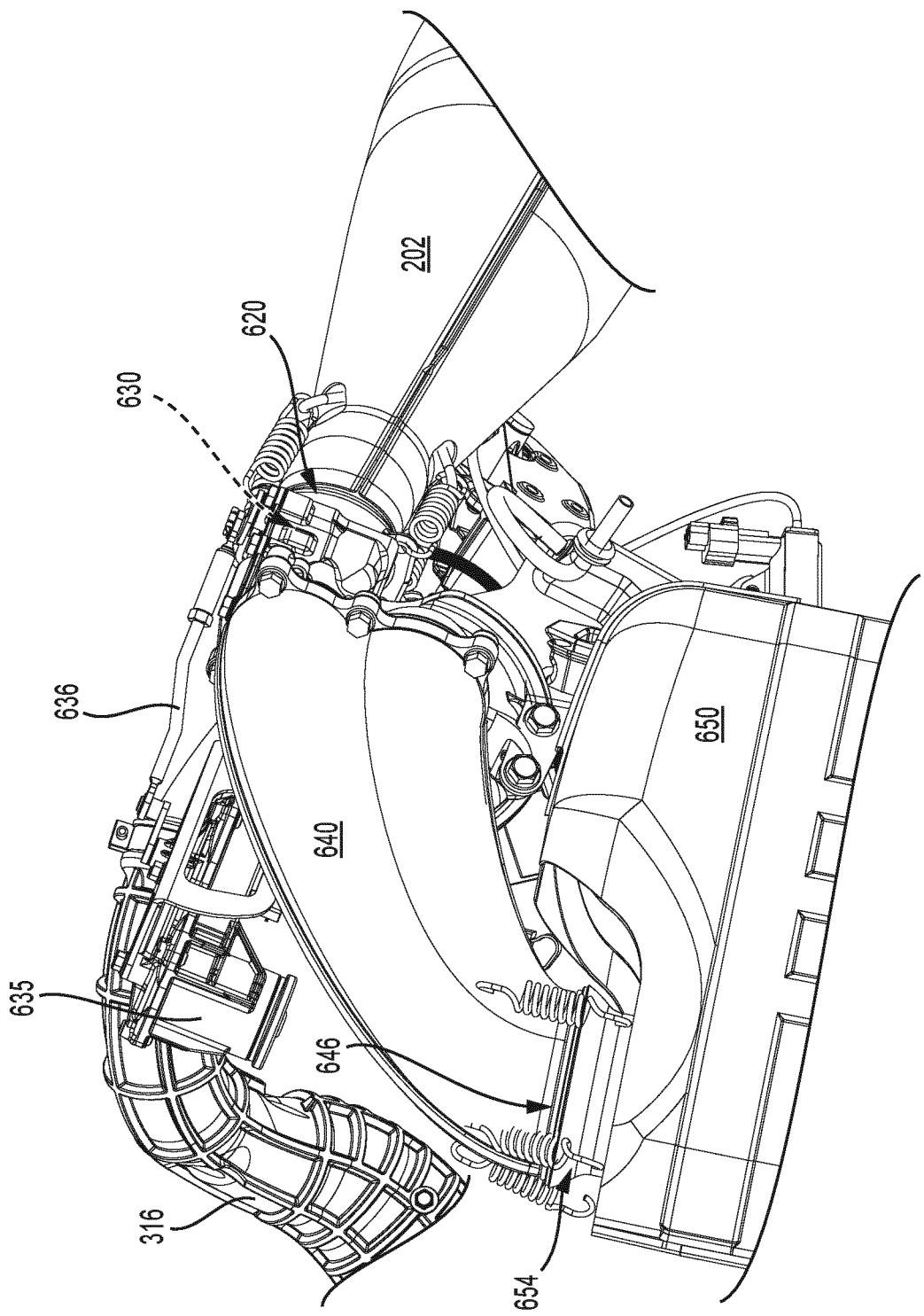
FIG. 11 is a close-up view of the portions of the air intake system and exhaust system of FIG. 10.

With reference to FIG. 10, the exhaust system 600 includes a muffler 650. The muffler 650 includes one muffler inlet 654 through which to receive exhaust gas from the exhaust system 600. The muffler 650 is fluidly connected to the collector outlet 646 of the exhaust collector 640. The muffler inlet 654 and the collector outlet 646 are held in place by springs as can be seen in the Figures. It is contemplated that different methods could be employed to connect the muffler 650 to the exhaust collector 640. As can be seen in the Figures, the muffler 650 includes only the single inlet 654 for receiving exhaust gas both bypassing and passing through the exhaust turbine 350.

Flow of the exhaust gas through the exhaust system 600, specifically between the exhaust pipe 202 and the muffler 650, will now be described in more detail. As is described briefly above, the valve 630 in the bypass conduit 620 selectively controls the flow of exhaust gas either into the exhaust turbine 350 or bypassing the exhaust turbine 350 by sending the exhaust gas out through the conduit outlet portions 692, 694.

In the present technology, the bypass conduit 620 is designed and arranged to balance two competing interests: the first being to allow for efficient exhaust gas flow when bypassing the turbocharger 300 in order to operate the engine 26 as a naturally aspirated engine 26, and the second being not impeding efficient operation of the turbocharger 300 when desired. In traditional turbo-charged engines, all exhaust gas would be directed to the turbocharger 300, with an associated bypass only being used in the case of too much exhaust gas flow into the turbocharger. In the present technology, exhaust gas can be directed either to bypass the turbocharger 300 for naturally aspirated operation or into the turbocharger 300 for turbo-charged operation. The inclusion of the intake bypass valve 123 further aids in allowing for naturally aspirated operation or turbo-charged operation of the engine 26. As is described above, the intake bypass valve 123 allows for atmospheric or ambient airflow into the primary airbox 120 when the pressure in the primary airbox 120 falls below a threshold, due the turbocharger 300 not operating or spooling up and thus not providing sufficient compressed air to the primary airbox 120. By including both the valve 630 and the bypass valve 123, each of which are independently operated, both air intake and exhaust gas are managed to allow for naturally aspirated or turbo-charged operation of the engine 26.

As is mentioned above, exhaust gas entering the bypass conduit 620 flows generally parallel to the central axis 629 of the inlet 622. As can be seen in FIGS. 13 to 16, the central axis 629, and thus the center of the flow of exhaust gas, is directed to the turbine outlet portion 692 side of the flow divider 628. As the flow divider 628 is situated toward the bypass side with respect to the central axis 629, it should be understood that more than half of the exhaust gas flow is therefore initially directed toward the turbine outlet portion 692.

On the bypass outlet portion 694 side of the central axis 629 (to the left of the axis 629 in the Figures), it can also be seen that some of the exhaust gas flow, parallel to the central axis 629, is directed toward the opening 627. As the conduit inlet 622 and opening 627 of the passage 625 are at least partially aligned along the direction of the central axis 629, at least a portion of the exhaust gas entering the conduit inlet 622 parallel to the flow axis flows unobstructed into the bypass passage 625 when the valve 630 is in the open position. As the engine 26 is intended to be naturally aspirated in standard operation, at least a portion of exhaust gas flowing generally directly through the bypass conduit 620 and into the exhaust collector 640, with a minimum of turns, bends, etc. further assists in decreasing back pressure, again in the aims of optimizing engine performance.

It should be noted that, as will be described further below, the percentage of exhaust gas flow directed toward each of the output conduits 692, 694 does not necessarily correspond to the percentage of exhaust gas that flows therethrough.

The two different flow patterns of exhaust gas entering the bypass conduit 620 will now be described in reference to flow paths 670, 675 schematically illustrated in FIG. 8. Depending on the position of the valve 630, the exhaust gas can flow along a bypass exhaust flow path 670, a turbine exhaust flow path 675, or a combination of the two paths 670, 675.

Exhaust gas flowing along the bypass exhaust flow path 670 passes through the passage 625, which is not blocked by the valve 630 when the valve 630 is in the open position. The bypass exhaust flow path 670 is defined from the exhaust inlet 622 of the bypass conduit 620 to the exhaust collector 640. Exhaust gas flowing along the bypass exhaust flow path 670 passes through the exhaust inlet 622, then through the bypass conduit 620, and then into the exhaust collector 640. Specifically, exhaust gas flowing along the bypass exhaust flow path 670 is received in the upper portion 645 of the inlet 642.

The turbine exhaust flow path 675 is similarly defined from the exhaust inlet 622 of the bypass conduit 620 to the exhaust collector 640. Exhaust gas flowing along the second exhaust flow path passes through the exhaust inlet 622, then through the turbine outlet portion 692 of the bypass conduit 620, then through the exhaust turbine 350, and then into the exhaust collector 640. Specifically, exhaust gas flowing along the turbine exhaust flow path 675 is received in the lower portion 643 of the inlet 642.

For each flow path 670, 675, exhaust gas passes out of the collector outlet 646 and into the muffler inlet 654. The single muffler inlet 654 of the muffler 650 receives the exhaust gas from both the bypass exhaust flow path 670 and turbine exhaust flow path 675.

Even though the majority of exhaust gas flow is oriented toward the turbine outlet portion 692, a majority of the exhaust gas entering the exhaust inlet 622 flows along the bypass exhaust flow path 670, through the bypass outlet portion 694, when the valve 630 is in the open position. The flow path 675 through the exhaust turbine 350, designed to turn under pressure from exhaust gas flowing therethrough, is more restrictive and causes more back pressure than the flow path 670 through the bypass passage 625. More of the exhaust gas is therefore directed through the passage 625, even if the initial flow direction is toward the turbine outlet portion 692. It should be noted that a portion of the exhaust gas entering the bypass conduit 620 will still flow through the exhaust turbine 350 even when the valve 630 is fully open.

When the valve 630 is in the closed position, a majority (generally all) of the exhaust gas entering the exhaust inlet 622 flows along the turbine exhaust flow path 675. As is illustrated schematically, exhaust gas flowing along the turbine exhaust flow path 675 is deflected by the valve 630, as the valve 630 blocks the passage 625 in the closed position. As some of the exhaust gas entering through the conduit inlet 622 flows in parallel to the central axis 629, at least a portion of the valve 630 is contacted by, and diverts, exhaust gas entering the inlet 622.

As is mentioned above, the valve 630 can also be arranged in an intermediate position, such as that illustrated in FIG. 16 (just as one non-limiting example). With the valve 630 in the intermediate position, a portion of the exhaust gas is allowed through the passage 625 to bypass the exhaust turbine 350 and a portion of the exhaust gas is deflected through the turbine outlet portion 692 toward the exhaust turbine 350. In the intermediate position, at least a portion of the valve 630 is contacted by the exhaust gas entering through the conduit inlet 622 and flowing parallel to the axis 629.

The exhaust gas thus flows along both of the bypass exhaust flow path 670 and the turbine exhaust flow path 675 when the valve 630 is in one of the intermediate positions. The ratio of the portion of exhaust gas flowing along the bypass exhaust flow path 670 to the portion of exhaust gas flowing along the turbine exhaust flow path 675 depends on various factors, including at least the angle at which the valve 630 is arranged. Generally, the closer the valve 630 is to the open position, the more exhaust gas will flow along the bypass exhaust flow path 670 and vice versa.

As will be described in more detail below, the valve 630 is used to manage exhaust gas flow through the flow paths 670, 675. For example, in some scenarios, the valve 630 is selectively moved to the closed position (or toward the closed position) when the engine 26 is operated below a threshold atmospheric pressure. In such a scenario, the turbocharger 300 could be used to help boost engine performance when the snowmobile 10 climbs in altitude, where the air is thinner and as such less oxygen will enter the engine 26 (having a detrimental effect on performance).

Regardless of the position of the valve 630, in this implementation, there is no physical barrier blocking air flow between the exhaust inlet 622 and the turbine inlet 355. As is mentioned above, a portion of the exhaust gas entering through the bypass inlet 622 passes through the turbine outlet portion 692 and enters the exhaust turbine 350 through the turbine inlet 355, even when the valve 630 is in the open position. The relatively small portion of exhaust gas entering the exhaust turbine 350 aids in creating a pressure difference between positions upstream from the exhaust turbine 350 and downstream therefrom. This pressure difference generally improves the responsiveness of the turbocharger 300, generally making the exhaust turbine 350 spool up more rapidly and assisting in decreasing the turbo lag.

Similarly, there is no physical barrier closing the turbine outlet 315 when the exhaust gas flows along the bypass exhaust flow path 670. As such, flow of exhaust gas out of the bypass outlet 626 causes an air pressure reduction in the turbine outlet 315. This low pressure zone also assists in decreasing the turbo lag and in increasing the spool up speed. It is also noted that there is also no barrier closing the bypass outlet 626 when the exhaust gas is directed to the turbine exhaust flow path 675 and flowing out of the turbine outlet 315.

The exhaust system 600, according to the present technology and as described above, is generally intended to be operated as a naturally aspirated engine system, with the exhaust gas generally bypassing the exhaust turbine 350, other than in specific scenarios where additional boost from the turbocharger 300 is necessitated. This is in contrast to some standard turbo-charged engine arrangements, where a turbocharger is used in standard operation and a turbocharger bypass is used to prevent overload of the compressor.

In the arrangement and alignment of the exhaust system 600 of the present technology, in contrast to conventional turbocharger arrangements, a majority of the exhaust gas flows through the passage 625 when the valve 630 is in the open position (described above). Exhaust gas flow, especially to allow the gas to bypass the turbocharger 300 without creating excessive back pressure, is further managed by the comparative cross-sections of the two flow paths 670, 675. Specifically, in the present technology, the area of the opening 627 of the passage 625 (for the bypassing flow path 670) and the intake area 354 of the exhaust turbine 350 (in the turbine flow path 675) are of similar dimensions.

The arrangement of the relative areas of the openings 627, 355 in the two flow paths 670, 675 allows exhaust gas to both bypass the exhaust turbine 350 without creating excessive back pressure (which can be detrimental to operation of the engine 26) while still allowing good exhaust gas flow through the turbine inlet 355 when the turbine 300 is solicited. According to the present technology, the area of the opening 627 is generally between 0.75 and 1.25 times the area 354 of the turbocharger inlet 355. In the present implementation, the area 354 of the turbocharger inlet 355 is slightly greater than the area of the opening 627. It is contemplated, however, that the area of the opening 627 could be greater than the area 354 of the turbocharger inlet 355 in some implementations.

In further contrast to conventional turbocharger arrangements, the bypass outlet 626 has been specifically arranged such that there is not an excessive amount of deviation of the exhaust flow necessary for the flow to travel from the bypass conduit inlet 622 to the bypass outlet 626. A normal of the bypass outlet 626 is at an angle of about 20 degrees to the central axis 629 in the present implementation (although the exact angle could vary). With this arrangement, a portion of the exhaust gas entering the inlet 622, illustrated between lines 601 and 603 in FIG. 15, both parallel to the central axis 620, will pass directly through the bypass conduit 620, meaning through the passage 625 and the opening 627, and out of the bypass outlet 626 without deviating. This is true even for a plurality of positions of the valve 630 between the fully open and fully closed positions.

When the snowmobile 10 is not being operated below a threshold atmospheric pressure, the exhaust system 600 will tend to send exhaust gas along the bypass exhaust flow path 670 bypassing the exhaust turbine 350 and the engine 26 will operate as a naturally aspirated engine 26. When the snowmobile 10 is operated below such a threshold air intake pressure, for example at high altitudes/low atmospheric pressure, the valve 630 will move toward the closed position (either partially or completely) to send some or all of the exhaust gas to the exhaust turbine 350 to provide boost to the engine 26. More details pertaining to operation of the valve 630 with respect to operating conditions will be provided below.

Example Operation of the Exhaust System

Figure 31:
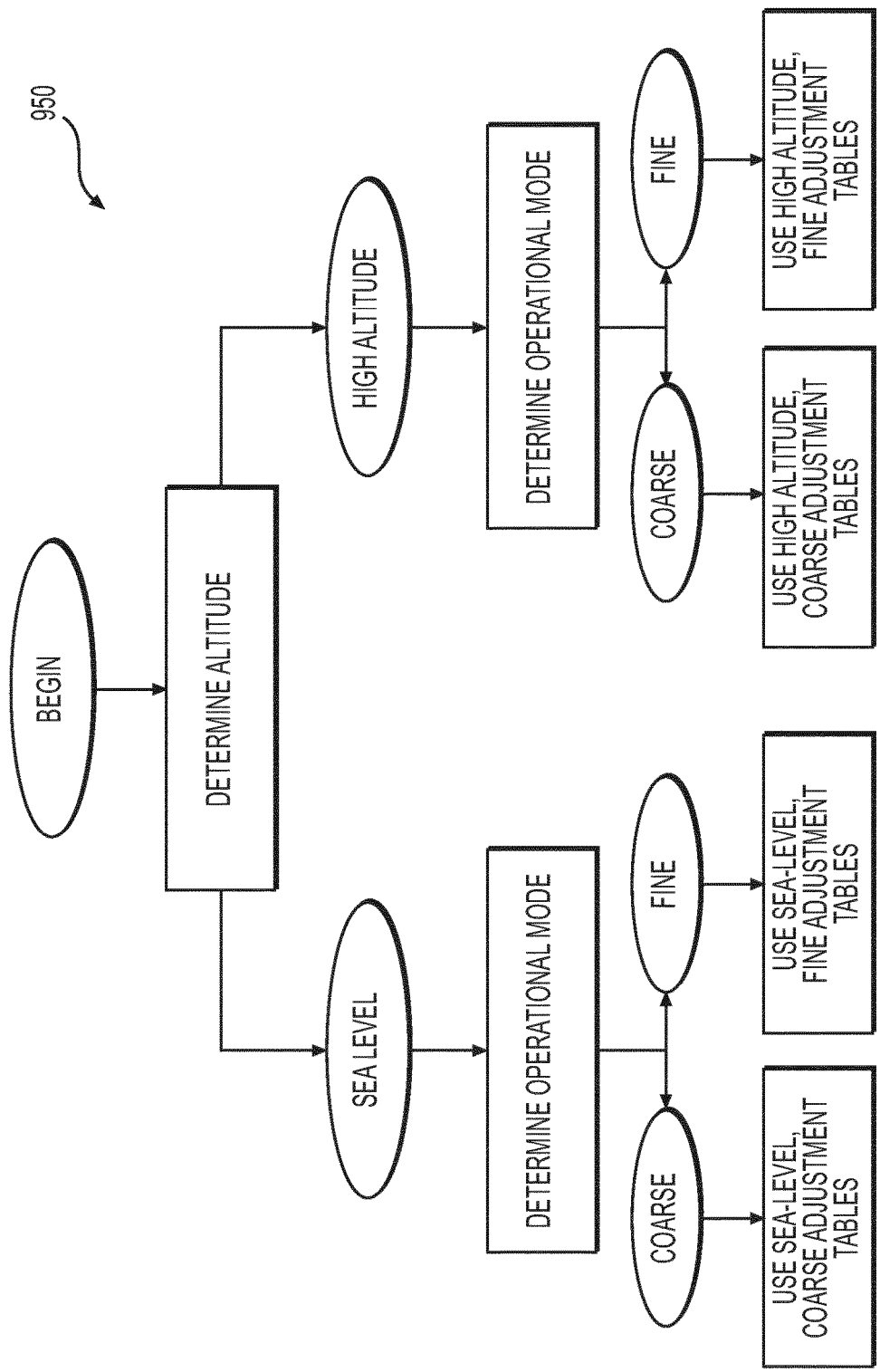
FIG. 31 is a flowchart representing an illustrative scenario of controlling exhaust gas flow through the exhaust system of FIG. 2.
Figure 32:
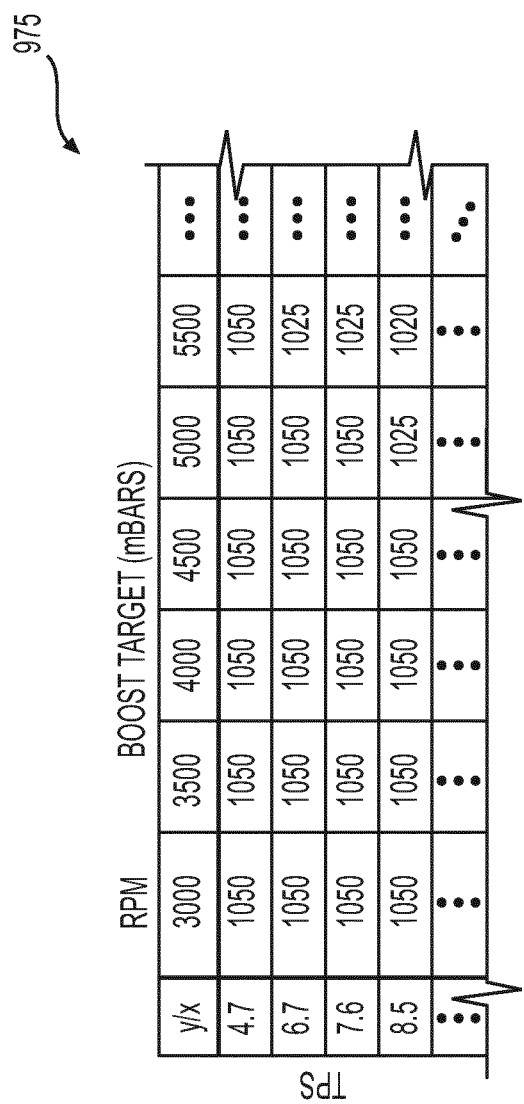
FIG. 32 illustrates an example dataset for use in the illustrative scenario of FIG. 31.

With reference to FIGS. 31 and 32, one non-limiting illustrative scenario of operation of the exhaust system 600 will now be described. Different implementations of specific methods will be described in more detail with reference to FIGS. 21 to 23. It should be noted that this is simply one non-limiting example to provide a high-level understanding of the general operation of the exhaust system 600, and different implementations and details will be set out below.

Broadly stated, the system controller 500 retrieves predetermined positions of the valve 630 from data tables (datasets) based on throttle position (TPS) and engine speed (RPM). Depending on the particular mode of operation (described further below), the exhaust pressure, input pressure, or a difference between the two are simultaneously monitored by comparing their values to similar predetermined pressure datasets. A flow-chart 950 generally depicting the steps taken by the system controller 500 when controlling the valve 630 in the present illustrative scenario is illustrated in FIG. 31.

First, the controller 500 determines whether the snowmobile 10 is being operated near sea-level or nearer to a high altitude. The relative altitude (high or low) is generally determined by the intake pressure sensor 504 by measuring the ambient air pressure entering the air intake system, but in some cases the snowmobile 10 could include an altimeter communicatively connected to the system controller 500 for determining the altitude. The system controller 500 can then retrieve the predetermined datasets of valve position and pressure corresponding to operation of the snowmobile 10 at the relevant altitude range. In order to avoid inaccurate altitude readings by the intake pressure sensor 504 caused by additional pressure created by the turbocharger 300, the altitude-related pressure reading is taken when the RPM and the TPS outputs are below a predetermined level that corresponds to an operating state of the snowmobile 10 where no boost pressure from the turbocharger 300 should be created. It is also noted that datasets corresponding to different altitudes, other than low or high, could be used. Datasets corresponding to more than two altitudes are also contemplated.

Following determination that the snowmobile 10 is either at high or low altitude, the system controller 500 then determines if the valve 630 should be adjusted according to a "coarse" adjustment regime or a "fine" adjustment regime. This determination is performed by comparing an actual boost pressure (the current air intake pressure which is supplemented by the turbocharger 300) with a predetermined desired boost target pressure based on a dataset of TPS vs RPM. The actual boost pressure produced by the turbocharger 300 is determined by the intake pressure sensor 504. A desired boost target pressure for the current TPS and RPM values is determined from a predetermined dataset, an example predetermined desired boost target pressure dataset 975 being shown in FIG. 32. When the actual boost from the turbocharger 300 is within a predetermined range or threshold of the desired boost target (for example within 5, 10, or 15 mbars of the desired boost), the fine regime will be used. Otherwise, the coarse regime will be used. Depending on the specific implementation, the predetermined range could be modified depending on factors such as ambient air temperature, altitude etc. It is further noted that the predetermined range for switching from the coarse regime to the fine regime could, in some cases, be different than the predetermined range for switching from the fine regime to the coarse regime. This hysteresis is introduced into the coarse/fine determination approach to aid in limiting rapid switching between the two control regimes. If the threshold differences for switching between the coarse and fine adjustment regimes were the same, for example, each time the pressure difference is slightly below or above the threshold the method could switch regimes in a rapid alternation between the coarse and fine adjustment regimes. This could be unnecessarily inefficient especially when the pressure difference is oscillating around the threshold value.

Figure 33:
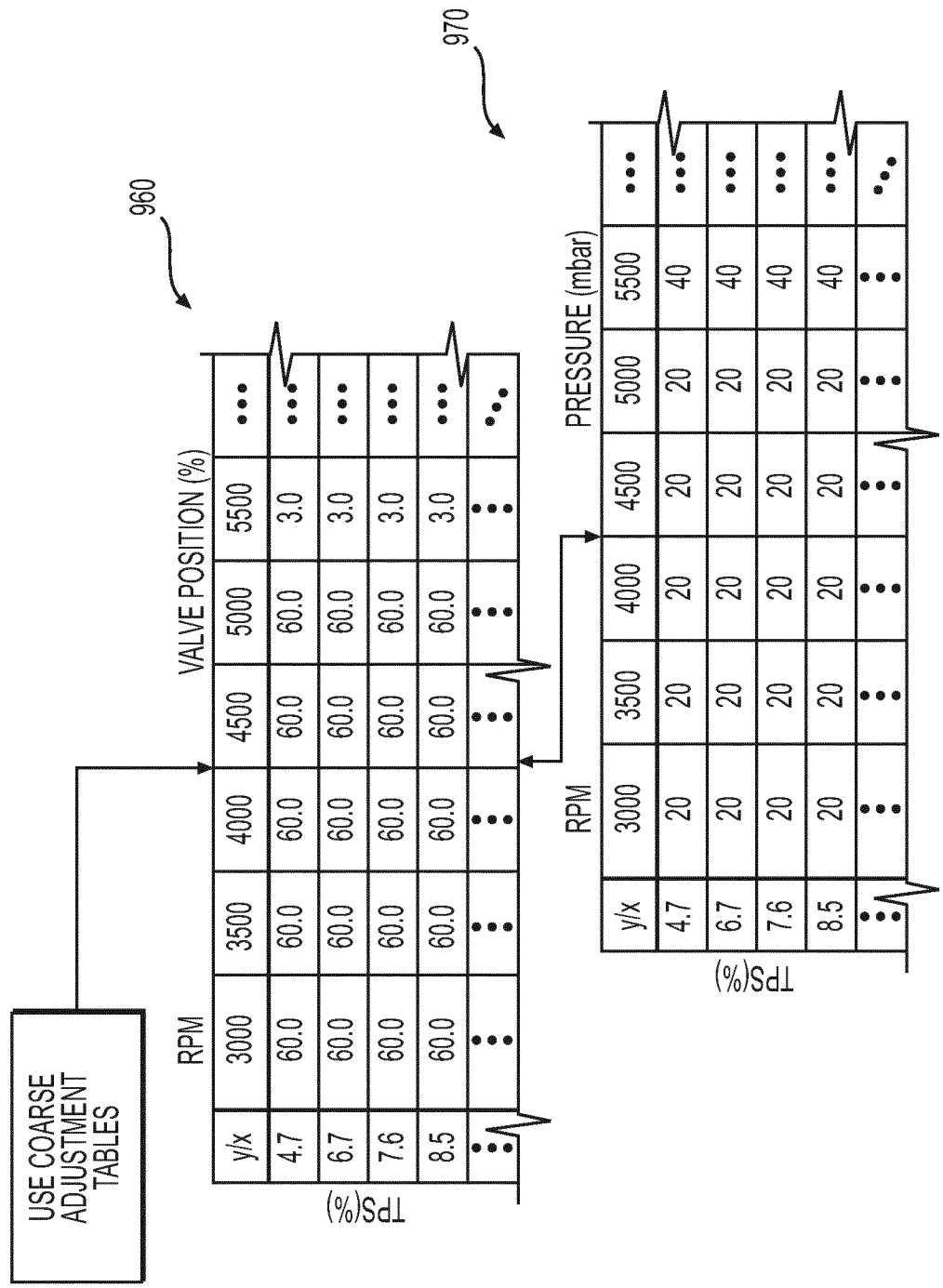
FIG. 33 illustrates additional example datasets for use in the illustrative scenario of FIG. 31.

When operating in the coarse adjustment regime, also known as a dynamic regime, the back pressure is simultaneously monitored and controlled according to a pressure dataset, in order to ensure that movement of the valve 630 to increase boost pressure does not cause a detrimental increase in back pressure. A sample pair of a valve position dataset 960 and a pressure dataset 970 are illustrated in FIG. 33 (the values are simply illustrative and are not meant to be limiting). In the case where pressure dataset 970 is being used in the coarse regime, the output values will represent a maximum value difference between the exhaust pressure and the intake pressure as will be described in more detail below.

During control of the valve 630, if the back pressure rises above a certain amount for the current operating conditions (e.g. RPM and TPS), the performance of the engine 26 could be negatively affected or at least not optimal. To impede this from happening, the representation of the maximum back pressure as determined in the dataset 970 from the current TPS and RPM values, is compared to the actual back pressure, as determined from the exhaust pressure minus the intake pressure obtained from the exhaust pressure sensor 590 and the intake pressure sensor 504 respectively. If the actual back pressure exceeds the value from the dataset 970, the system controller 500 will apply a correction to the valve position dataset 960 in order to move the valve 630 to a position that maintains the back pressure within an acceptable range, i.e. the actual pressure difference below that obtained from the dataset 970. In some cases a correction factor could be mathematically determined and applied across the dataset 960. For instance, the correction factor could be determined based on the difference between the value retrieved from the dataset 970 and the actual back pressure as determined from the pressures measured by the exhaust and intake pressure sensors 590, 504. Notably, the correction factor could be proportional to the difference between the value retrieved from the dataset 970 and the actual back pressure as determined from the pressures measured by the exhaust and intake pressure sensors 590, 504. In some implementations, rather than determining a correction factor, a different predetermined dataset 960 could be retrieved.

It is to be understood that, in order for the calculation of the actual back pressure to be accurate, the amount of time elapsed between the measurements made by the exhaust pressure sensor 590 and the intake pressure sensor 504 should be kept relatively small such that the measurements are made generally simultaneously. Notably, the pressures at the locations of the sensors 590, 504 can change rapidly and therefore if a significant amount of time is allowed to lapse between the measurement made by the exhaust pressure sensor 590 and the corresponding measurement made by the intake pressure sensor 504, the correction made to the position of the valve 630 may not be very accurate to obtain the desired back pressure. For instance, the exhaust pressure sensor 590 and the intake pressure sensor 504 make corresponding measurements within one revolution of the crankshaft 126 from one another. More specifically, in this embodiment, the exhaust pressure sensor 590 and the intake pressure sensor 504 make corresponding measurements within a tenth of a revolution of the crankshaft 126 from one another. The exhaust pressure sensor 590 and the intake pressure sensor 504 may make corresponding measurements between a tenth of a revolution of the crankshaft 126 and one revolution of the crankshaft 126 from one another but other frequencies are contemplated.

In the fine adjustment regime, fine adjustment tables, also referred to as static datasets, are used when there is a small difference between the actual boost pressure and the desired boost pressure as mentioned above. In contrast to the approach taken in coarse adjustment, the fine adjustments are made to approach and maintain the optimal intake pressure (boost pressure) into the engine 26. As small adjustments to the position of the valve 630 should not have a drastic effect on the back pressure, during the fine adjustment regime the back pressure may not be continuously monitored, as it is in the coarse regime. As with the coarse regime, the fine regime uses a valve position dataset similar to that of dataset 960, which is based on the actual TPS and RPM values, and a pressure dataset similar to that of 970 also based on the actual TPS and RPM values. The pressure dataset 970, when in the fine regime, includes values that represent only the intake pressure and that are to be compared to the actual intake pressure measure by the intake pressure sensor 504. The difference between the output from the dataset 970, when in the fine regime, and that of the actual intake pressure, will determine a correction factor to be applied to the valve position from dataset 970.

During operation, the system controller 500 continuously reevaluates the altitude and coarse/fine determinations, as there will be changes to the throttle and RPM positions as the snowmobile 10 is operated, which will also change the exhaust and intake pressures as the valve 630 is controlled to improve operation of the engine 26, and/or changes in the altitude at which the snowmobile 10 is being operated as it travels over terrain.

Figure 21:
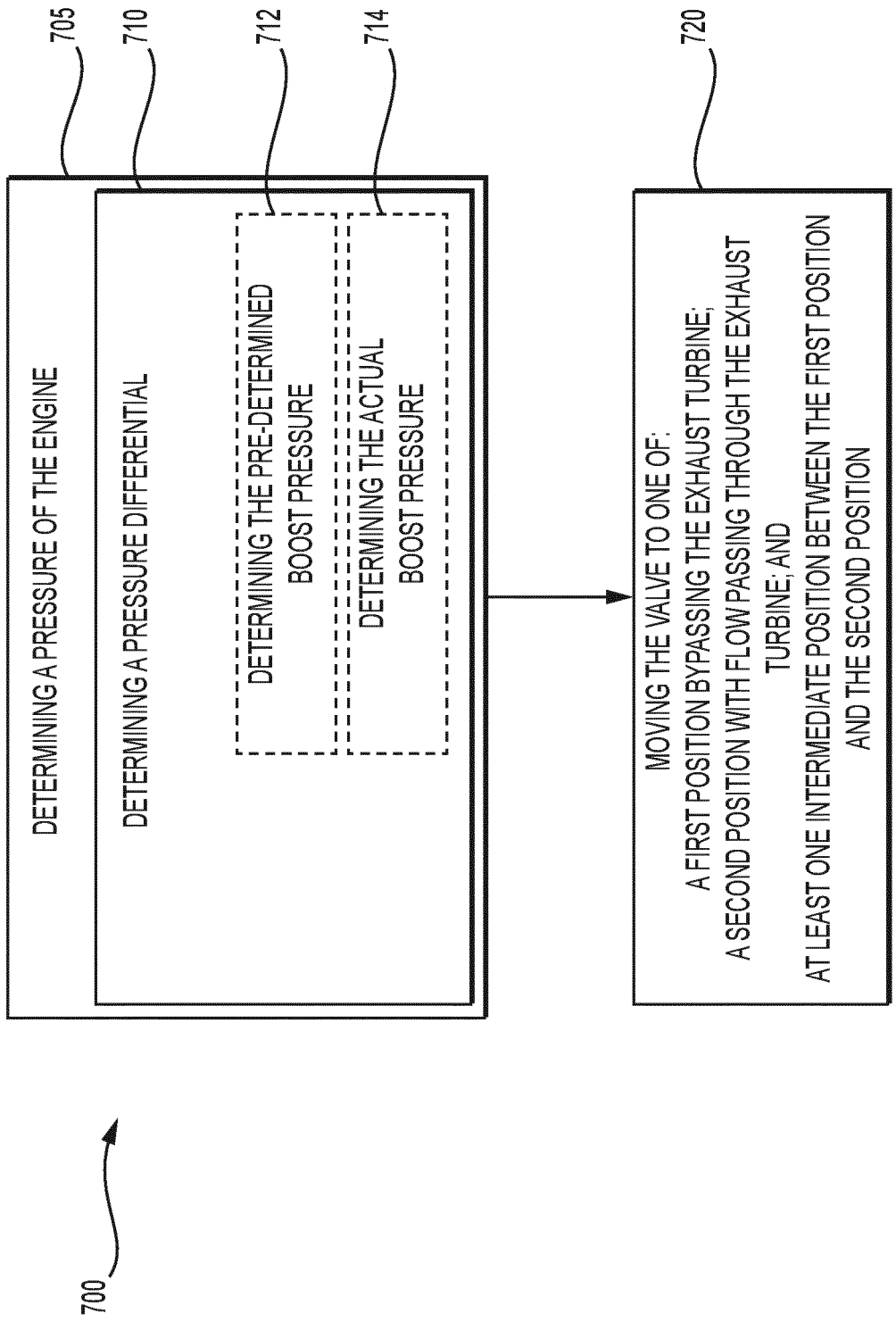
FIG. 21 is a flowchart illustrating a method, according to the present technology, of controlling exhaust gas flow through the exhaust system of FIG. 2.
Figure 22:
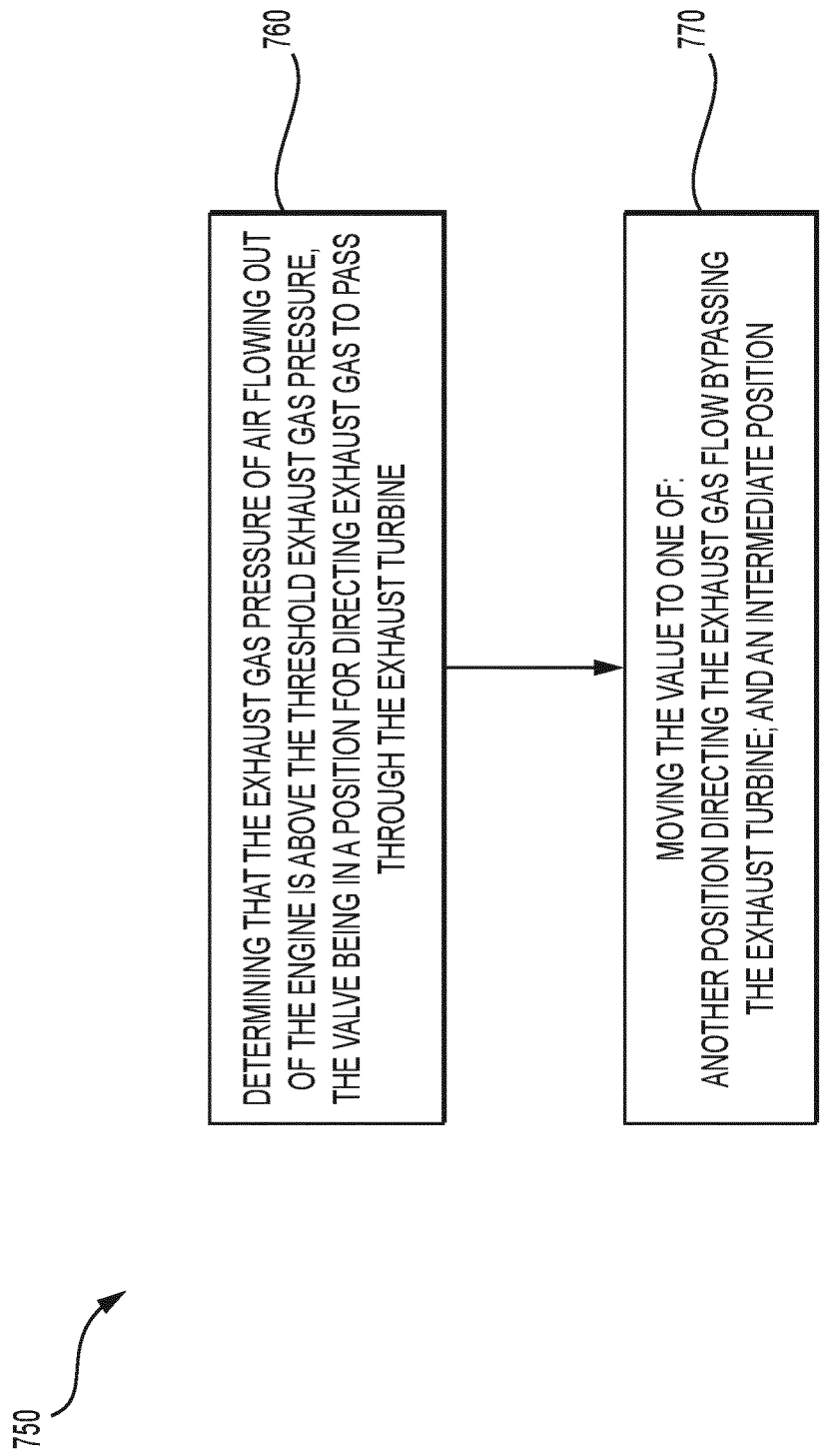
FIG. 22 is a flowchart illustrating another method according to the present technology of controlling exhaust gas flow through the exhaust system of FIG. 2.
Figure 23:
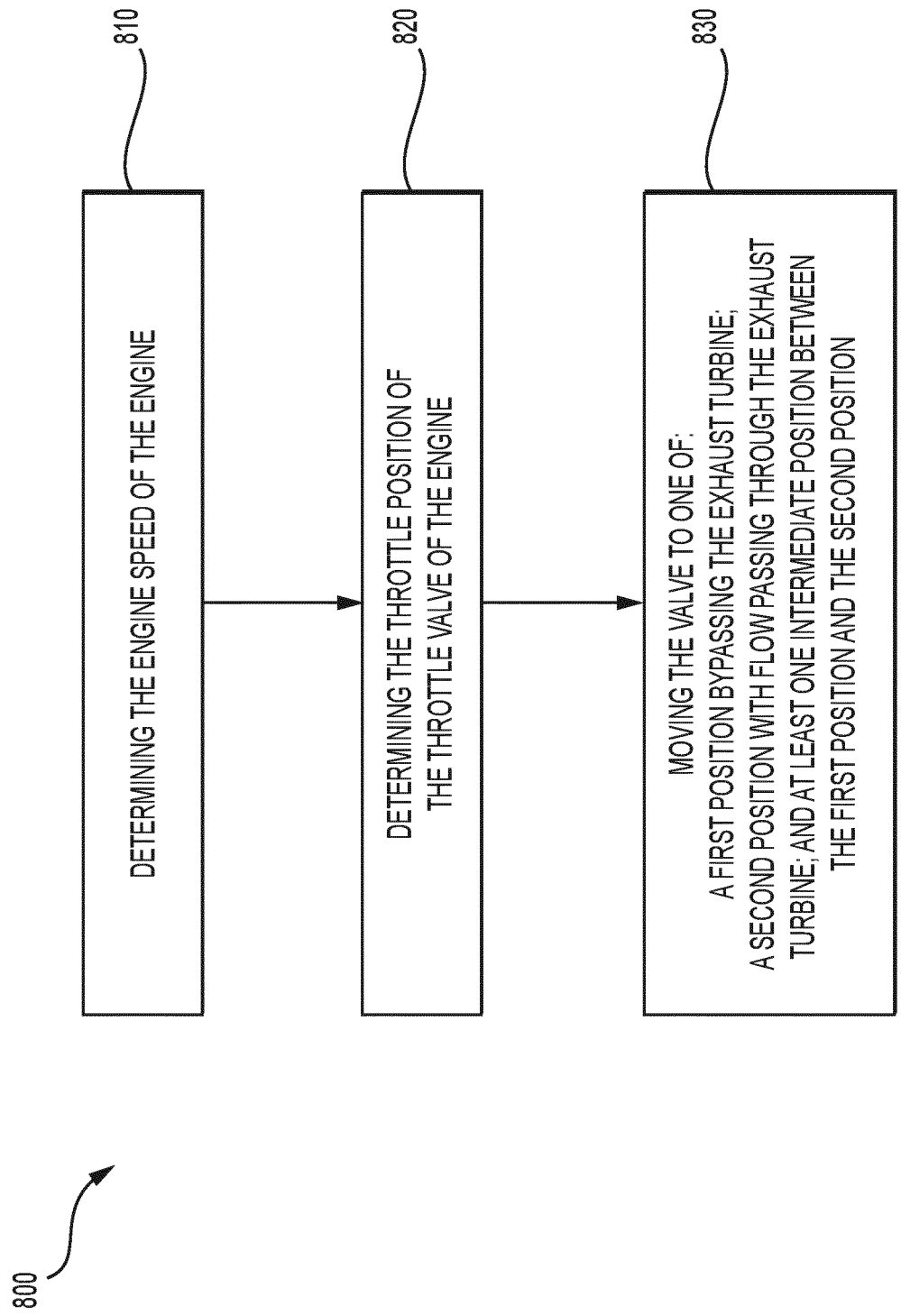
FIG. 23 is a flowchart illustrating another method according to the present technology of controlling exhaust gas flow through the exhaust system of FIG. 2.

With reference to FIGS. 21 to 23, different methods of controlling the flow of exhaust gas from the engine 26 will be described. Each will be described in more detail below. Briefly, the methods 700, 750, 800 aim to balance providing optimized boost to the engine 26 based on operating conditions (in the form of compressed air provided by the turbocharger 300) with the detrimental increase of back pressure that can be caused while the turbocharger 300 is spooling up. This control is provided by the valve 630. As is briefly mentioned above, operation of the exhaust system 600 with the valve 630 assists in preventing back pressure from impeding engine functionality, as the exhaust gas flows out through the bypass conduit 620. By closing the valve 630, exhaust gas is directed into the exhaust turbine 350 such that the turbocharger 300 provides additional air to the engine 26, but this exhaust flow path 675 also increases the back pressure. In some implementations of the methods, adjustments can be made to the positioning of the valve 630 to balance the need for additional compressed air versus negatively impacting engine operation through increased back pressure.

Operation Based on a Pressure Reading

Operation of the exhaust system 600 in accordance with different methods according to the present technology will now be described in more detail. In reference to FIG. 21, a non-limiting implementation of controlling operations in the exhaust system 600 is set out in the form of a method 700 for controlling a flow of exhaust gas from the engine 26. The method 700 is performed by the system controller 500 according to the present technology. In some implementations, it is contemplated that an additional or substitute computational system could be implemented to perform the method 700.

The method 700 begins at step 705, with determining at least one pressure of the engine 26. Based on one or more of the pressures detected for the engine 26, the method 700 determines how to position the valve 630 in order to optimize or improve performance of the engine 26. As will be described in more detail below, the valve 630 could be positioned based on, but is not limited to, exhaust pressure, air intake and/or atmospheric pressure, and the desired or actual boost pressure.

The method 700 then continues at step 720 with moving the valve 630 to the closed position, the open position, or an intermediate position based at least on the pressure determined in step 710. Depending on the determined pressure, the valve 630 is moved to direct more or less exhaust gas into the exhaust turbine 350. In some cases, the desired position of the valve 630 will correspond to the current position of the valve 630, and as such the valve 630 would not be moved.

In some implementations, determining a pressure at step 705 includes determining a pressure differential between an actual boost pressure of air flowing into the engine 26 and a predetermined boost pressure of air flowing into the engine 26 at sub-step 710.

In some implementations, the determining the pressure differential at sub-step 710 is performed in two sub-steps. First the actual boost pressure is determined at sub-step 712. The actual boost pressure is determined based on readings from the intake pressure sensor 504, to determine the air intake pressure coming from the turbocharger 300. It is contemplated, however, that a different sensor and/or operational value could be used to determine the actual boost pressure.

The predetermined boost pressure is determined at sub-step 714. The predetermined boost pressure is a boost pressure calculated or previously determined to be matched generally to the operating conditions of the engine 26, such that operation of the engine 26 is best optimized. The predetermined boost pressure is retrieved from a computer-accessible storage medium 507 operatively connected to or included in the system controller 500 (shown schematically in FIG. 8). It is contemplated that additional sensors could be included in the exhaust system 600 and utilized in the method 700.

In some implementations, determining the predetermined boost pressure at sub-step 714 includes at least one of: determining, by the engine speed sensor 586, the engine speed of the engine 26, determining a throttle valve position of the throttle valve 39 of the engine 26 by the throttle valve position sensor 588, determining a throttle lever position by the position sensor of the throttle lever 86, and determining a rate of throttle valve opening of the throttle valve 39. In some implementations, the rate of throttle valve opening could be determined instead or in addition to determining the throttle valve position. The predetermined boost pressure is then retrieved from the computer-based storage medium 507, based on the determined engine speed, throttle valve position, throttle lever position, and/or rate of throttle valve opening.

It is contemplated that the sub-steps 712, 714 could be performed in any order or simultaneously, depending on the specific implementation and/or operational scenario. In some implementations, it is contemplated that the snowmobile 10 could include a differential sensor for determining the pressure differential at sub-step 710 in a single measurement.

In some implementations or iterations, the method 700 could further include determining that the difference between the predetermined boost pressure and the actual boost pressure, as determined in sub-step 710, is less than a difference threshold. The difference threshold generally indicates whether movement of the valve 630 in order to bring the actual boost pressure more closely in line with the predetermined boost pressure will need to be a coarse adjustment (if the difference is above the threshold) or only needs to be a fine adjustment (if the difference is below the threshold).

Based on the difference being less than the difference threshold, the method 700 then continues with determining a desired valve position of the valve 630 from a fine adjustment data set. The fine adjustment data set, based on at least one of the throttle position and the engine speed as determined above, relates to fine, or minor, adjustments to the position of the valve 630 needed in order to provide the desired pressure in the engine 26 by decreasing the difference between the predetermined boost pressure and the actual boost pressure. The method 700 then continues with moving, following determining the desired valve position, the valve 630 toward the desired valve position.

Based on the difference being greater than the difference threshold, the method 700 then similarly continues with determining a desired valve position of the valve 630 from a coarse adjustment data set. The coarse adjustment data set, based on at least one of the throttle position and the engine speed as determined above, relates to coarse, or larger, adjustments to the position of the valve 630 needed in order to provide the desired pressure in the engine 26 by decreasing the difference between the predetermined boost pressure and the actual boost pressure. The method 700 then continues with moving, following determining the desired valve position, the valve 630 toward the desired valve position.

In some implementations, the method 700 could be done iteratively, such that when the difference between the predetermined boost pressure and the actual boost pressure is large, coarse adjustments are made to reduce the difference. Once the difference between the predetermined and actual boost pressure are reduced below the threshold, then fine adjustments would be used. Use of coarse and fine adjustments is simply one non-limiting example of controlling adjustment of the position of the valve 630. It is also contemplated that the adjustments could be partitioned into three or more datasets. For example, two thresholds could be used to split the adjustments into "large coarse adjustments", "small coarse adjustments", and "fine adjustments". It is also contemplated that a single data set could be utilized for determining a desired valve position.

In some implementations or iterations of the method 700, the determining the pressure differential at sub-step 710 includes determining a difference between an intake air pressure of air flowing to the engine 26, and an exhaust gas pressure of exhaust gas flowing out of the engine 26, in place of determining the difference between predetermined and actual boost pressures. In such an implementation, the method 700 would then include determining the intake air pressure by the intake pressure sensor 504 and determining the exhaust gas pressure by the exhaust pressure sensor 590.

The method 700 would then further include determining a predetermined pressure differential between the exhaust gas pressure and the intake air pressure. Similar to the predetermined boost pressure, the predetermined pressure differential corresponds to the optimal or preferred difference between the exhaust and intake air pressures which correspond to better operation of the engine 26 for the current operating conditions. For example, the predetermined pressure differential could be set based on engine parameters such as engine speed such that the engine 26 generally has the air volume necessary for proper functioning, without creating too much back pressure. In some implementations, the predetermined pressure differential could be determined based on, but is not limited to: throttle position and engine speed.

In such an implementation, the method 700 then continues with determining that a difference between the pressure differential and the predetermined pressure differential is non-zero. The non-zero difference indicates simply that the actual pressure differential is not at the predetermined pressure differential and thus the engine 26 may not be operating optimally. The method 700 thus then continues with moving the valve 630 based on the difference being non-zero to the open position, the closed position, or one of the intermediate positions. In some implementations, the position to which the valve 630 is moved could depend on whether the actual pressure differential is greater or less than the predetermined pressure differential.

In some implementations or iterations of the method 700, the method 700 includes determining that the intake air pressure is below a threshold atmospheric pressure. As with the above steps, determination of the intake air pressure includes measurement of the pressure by the air intake pressure sensor 504. The system controller 500 could then determine if the measured air pressure of air entering the engine 26 is below some predetermined threshold. For example, the threshold could be set based on engine parameters such that the engine 26 generally has the air volume necessary for proper functioning. It is also contemplated that the threshold atmospheric pressure may be a predetermined range of atmospheric pressure. In one non-limiting example, intake air pressure could fall below the threshold when the snowmobile 10 is climbing a mountain and increasing in altitude.

Then, based at least on the intake air pressure being below the threshold atmospheric pressure, the method 700 could continue with moving the valve 630 to or toward the closed position (if the valve 630 is in either the open or intermediate position). This would begin, or increase, operation of the turbocharger 300. As such, when the engine 26 is not getting sufficient air for good or sufficient operation, for instance when the snowmobile 10 is being operated at high altitudes, the turbocharger 300 can be spooled up to provide compressed air to the engine 26 (as is described above).

In some implementations or iterations of the method 700, the method 700 could further include determining that the back pressure is too high and opening up the valve 630 to maintain a balance between increasing intake air pressure to the engine 26 and allowing back pressure to ease through opening of the valve 630.

Subsequent to moving the valve 630 to or toward the closed position, the method 700 could further include determining that the exhaust gas pressure is above a threshold exhaust gas pressure. As is mentioned above, the exhaust gas pressure is measured by the exhaust pressure sensor 590; the system controller 500 then compares the measurement to the determined back pressure threshold.

Based on the exhaust gas pressure being above the threshold exhaust gas pressure, the method 700 then continues with repositioning the valve 630 to either the open position or an intermediate position such that exhaust gas flows at least partially along the bypassing exhaust gas flow path 670. By opening up the valve 630 such that an increased portion of the exhaust gas flows out through the bypass portion 620, the back pressure is eased. Depending on the iteration of the method 700, the valve 630 could be moved to only a small degree, or in some cases moved all the way to the open position. In some implementations, the change in position of the valve 630 could be proportional or directly related to an increase of exhaust gas pressure after moving the valve 630 to the closed position.

In some implementations or iterations of the method 700, the valve 630 could be moved back to the open position once the snowmobile 10 is operated at atmospheric pressures above the threshold used above to begin use of the turbocharger 300. In one non-limiting example, the valve 630 could be opened back up, partially or fully to the open position, when the snowmobile 10 decreases in altitude and the atmosphere surrounding the snowmobile 10 becomes richer.

In such a scenario, the method 700 could further include determining (by the intake pressure sensor 504 and the system controller 500) that the intake air pressure is above the threshold intake air pressure, subsequent to moving the valve 630 to or toward the closed position. Then, based on the intake air pressure being above the threshold intake air pressure, the method 700 could continue with moving the valve 630 such that a majority or more of the exhaust gas flows along the bypass exhaust flow path 670.

It is contemplated that the method 700 could include additional or different steps, either to perform additional functions and/or to perform the steps described above. It is also contemplated that the steps described above could be performed in an assortment of different sequences, depending on for example user preferences, and is not limited to the order set forth in the explanation above.

Operation Based on Exhaust Gas Pressure

In reference to FIG. 22, a non-limiting implementation of controlling operations in the exhaust system 600 is set out in the form of a method 750. The method 750 is performed, at least in part, by the system controller 500 according to the present technology. In some implementations, it is contemplated that an additional or substitute computational system could be implemented to perform the method 750.

The method 750 begins at step 760 with determining that an exhaust gas pressure of air flowing out of the engine 26 is above a threshold exhaust gas pressure, where the valve 630 is in either the closed position or an intermediate position, where a majority of the exhaust gas is flowing along the turbine exhaust flow path 675. The exhaust gas pressure is determined by the exhaust pressure sensor 590 and the system controller 500 in the present implementation, as is noted above. In some implementations, the valve 630 could have been moved to the closed position based on a decrease in atmospheric pressure surrounding the snowmobile 10, similar to the scenario described above in relation to the method 700. It is also contemplated that the valve 630 could have been moved to or toward the closed position for an alternative reason. For one non-limiting example, the valve 630 could have been moved to the closed position to provide more air to the engine 26, via the air compressor 310, based on insufficient performance of the engine 26.

The method 750 then continues, at step 760, with moving the valve 630 to either the open position or toward the open position to an intermediate position, based on the exhaust gas pressure being above the threshold exhaust gas pressure.

It is contemplated that the method 750 could be performed in tandem/consecutively to the method 700, operation of the snowmobile 10 could include implementations of both of the methods 700, 750.

It is contemplated that the method 750 could include additional or different steps, either to perform additional functions and/or to perform the steps described above. It is also contemplated that the steps described above could be performed in an assortment of different sequences, depending on for example user preferences, and is not limited to the order set forth in the explanation above.

Operation Based on Engine Speed and Throttle Position

In reference to FIG. 23, another non-limiting implementation of controlling operations in the exhaust system 600 is set out in the form of a method 800 for controlling the flow of exhaust gas from the engine 26. The method 800 is performed by the system controller 500 according to the present technology. In some implementations, it is contemplated that an additional or substitute computational system could be implemented to perform the method 800.

In addition to controlling the position of the valve 630 to manage intake and exhaust pressures based on environmental conditions (i.e. atmospheric pressure), the exhaust system 600 is further operable to adjust exhaust gas flow to balance providing additional boost while limiting back pressure when the user of the snowmobile 10 requests additional power from the snowmobile 10.

In one non-limiting scenario, the method 800 could be implemented in a situation where the throttle lever 86 is moved to make a high power request to the engine 26, for example during acceleration of the snowmobile 10. As will be outlined in the steps below, the valve 630 is moved to the closed position, to spool up the turbocharger 300, in response to this movement of the throttle lever 86. With the turbocharger 300 in use, the engine 26 would then benefit from a denser intake air charge and would have increased power output compared to a similar engine that would be naturally aspirated. As will further be described below, requesting too much boost and directing all exhaust gas along the turbine exhaust flow path 675 may also cause the back pressure to build beyond an optimized level to the desired engine operation. In such a situation, the method 800 can further move the valve 630 back toward the open position in order to allow some exhaust gas to bypass the exhaust turbine 350, thus decreasing the back pressure.

The method 800 begins at step 810 with determining, by the engine speed sensor 586, the engine speed of the engine 26. The method 800 then continues, at step 820, with determining a throttle valve position of the throttle valve 39 of the engine 26. The position of the throttle valve 39 is sensed by the throttle valve position sensor 588, as is mentioned above.

In some implementations, step 820 could include determining a rate of throttle valve opening of the throttle valve 39 instead or in addition to determining the throttle valve position. The throttle valve position sensor 588, alone or in conjunction with the system controller 500, could also be used to measure the rate of throttle valve opening in some implementations. The steps 810, 820 may be performed in either order, or simultaneously, depending on the specific implementation.

The method 800 then continues, at step 830, with moving the valve 630 to the open position, the closed position, or any intermediate position, based on the engine speed and the throttle valve position determined in steps 810, 820, as well as the starting position of the valve 630. In the method 800, the throttle valve position is taken into consideration to assist in controlling the exhaust gas flow for managing operation of the engine 26.

In some implementations or iterations, the method 800 could further include moving the valve 630 based on a temperature of the exhaust pipe 202, in addition to the engine speed and the throttle valve position determined in steps 810, 820. The temperature of the exhaust pipe 202 is received by the system controller 500 from the temperature sensor 512. In some implementations, moving the valve 630 could be based additionally or alternatively on the temperature of the exhaust gas within the exhaust pipe 202, as sensed by the temperature sensor 512.

In some implementations, the method 800 could further include determining a pressure differential and further moving the valve 630 based on the pressure differential. In some implementations, the pressure differential is determined by comparing a predetermined boost pressure of air flowing into the engine 26 against an actual boost pressure of air flowing into the engine 26. The predetermined boost pressure, described above in more detail, is determined based at least on one of the throttle position and the engine speed, as determined in steps 810, 820 and corresponds to what the boost pressure should be flowing into the engine 26 based on the throttle position and/or the engine speed. The actual boost pressure of air flowing into the engine 26 is determined by measuring the air intake pressure by the intake pressure sensor 504 and the system controller 500, as is described above. In some implementations, the actual boost pressure could be determined differently.

In some implementations, the method 800 could further include determining if the engine 26 is operating at a low altitude or a high altitude (i.e. that the snowmobile 10 is being operated at low or high altitude) prior to moving the valve 630. In some implementations, determining if the engine 26 is operating at low altitude or high altitude includes determining an atmospheric pressure of air entering the snowmobile by the intake pressure sensor 504. It is also contemplated that the system controller 500 could include or be communicatively connected to an altimeter or similar altitude measuring device.

Upon determining that the engine 26 is operating at low altitude, the method 800 could then continue with retrieving a desired valve position for the valve 630 from a low altitude data set. Upon determining that the engine 26 is operating at high altitude, the method 800 could then similarly continue with retrieving the desired valve position for the valve 630 from a high altitude data set. In some implementations, the low altitude data set and the high altitude data set could be stored in the storage medium 507 communicatively connected to or part of the system controller 500.

The desired valve position retrieved from the low or high data sets generally corresponds to an optimized or predetermined valve position based on the altitude and the engine speed and/or the throttle position, such that air flow into the engine 26 is matched to the operating conditions of the engine 26. In such an implementation, having determined a desired position of the valve 630, moving the valve 630 at step 830 would be performed by moving the valve 630 to the desired position.

In some implementations or iterations, the method 800 could further include determining, based at least on the throttle position and the engine speed determined in steps 810, 820, a threshold pressure differential of the engine 26. The method 800 then continues with determining an actual pressure differential of the engine 26. In some implementations, determining the actual pressure differential includes determining the exhaust pressure downstream of the engine 26 by the exhaust pressure sensor 590, determining the air intake pressure upstream of the engine 26 by the intake pressure sensor 504, and determining the difference thereof.

The method 800 then continues with determining that the actual pressure differential is greater than the threshold pressure differential and moving the valve 630 toward the open position if the valve 630 is either closed or an intermediate positions. In such a case, the actual pressure differential being greater than the threshold pressure differential could indicate that there is too much air pressure moving into the engine 26. This could have detrimental effects on operation of the engine 26, and the method 800 could thus provide correction by allowing more exhaust gas to bypass the exhaust turbine 350 by further moving the valve 630 toward the open position.

In some implementations or iterations, the method 800 could further include determining that an intake pressure, as determined by the intake pressure sensor 504, is above an intake threshold and determining that the throttle valve position is beyond a valve position threshold. For instance, the method 800 could determine that there is too much air pressure moving into the engine 26 while the throttle valve 39 has been opened too far. This combination could have detrimental effects on operation of the engine 26, and the method 800 could provide correction by allowing more exhaust gas to bypass the exhaust turbine 350 by further moving the valve 630 toward the open position.

Based on the intake pressure and the throttle valve position being past their respective thresholds, the valve 630, could then be moved from closed position or an intermediate position toward the open position. This allows for a decrease in back pressure induced by either too much air intake or requesting too much throttle too quickly.

In some implementations or iterations, the method 800 could further include moving the valve 630 toward the closed position, subsequent to moving the valve 630 toward the open position, such that a portion of the exhaust gas flowing through the exhaust turbine 350 of the turbocharger 300 is increased. In such implementations, the method 800 provides some tuning of the exhaust gas flow to balance boost from the turbocharger 300 while limiting detrimental effects of increased back pressure, which assists in smoothing the power increase of the engine 26.

In some implementations or iterations, the method 800 could further include determining that the intake pressure is above the air intake pressure threshold, subsequent to moving the valve toward the closed position. The method 800 could then include moving the valve 630 toward the open position, based on the intake pressure being above the threshold.

In some implementations or iterations, the method 800 could further include determining that the intake pressure is below the intake pressure threshold subsequent to moving the valve toward the closed position. The method 800 could then further include moving the valve 630 further toward the closed position, in order to allow further boost from the turbocharger 300.

In some implementations, the determining the intake air pressure could include determining the intake pressure at a location downstream of the turbocharger 300 by a pressure sensor (not shown). Moving the valve could then include selectively moving the valve based on the intake pressure determined by the pressure sensor downstream from the turbocharger 300.

In some implementations, the method 800 could further include determining the exhaust pressure downstream of the engine 26 by the exhaust pressure sensor 590 and moving the valve 630 toward the open position based on the exhaust pressure being above a predetermined exhaust pressure threshold.

In some implementations, where the rate of throttle valve opening is determined, the method 800 could further include determining that the rate of throttle valve opening is above a threshold rate; and moving the valve 630 toward the open position based at least on the rate of throttle valve opening being above the threshold rate. In such an implementation, the valve 630 is opened up, for example, when too much throttle is requested too quickly, in order to prevent back pressure from having a detrimental effect on engine operation (especially when the user is trying to increase power from the engine 26). In some implementations, the method 800 could further include determining that the intake pressure is above the threshold intake pressure and moving the valve 630 based on both the rate of throttle valve opening being above the threshold rate and the intake pressure being above the threshold intake pressure.

It is contemplated that the method 800 could include additional or different steps, either to perform additional functions and/or to perform the steps described above. It is also contemplated that the steps described above could be performed in an assortment of different sequences, depending on for example user preferences, and is not limited to the order set forth in the explanation above.

As described above, various methods of controlling operation of the turbocharger 300 involve monitoring the back pressure affecting the engine 26. In view of the availability of the pressure information in the present technology, operation of the snowmobile 10 can further be optimized by making adjustments to the fuel-air mixture in the engine 26.

Changes in the back pressure in the engine 26 and the exhaust system 600 impacts the fuel to air ratio present in the engine 26. All other things remaining equal, the engine 26 obtains maximum power when a target back pressure is maintained. If the effective back pressure in the engine 26 deviates from that target, the fuel to air ratio is affected, which in turns diminishes the operation of the engine 26.

With increasing back pressure, the total amount of air flowing through the engine 26 is reduced. In such a circumstance, a constant amount of fuel injected would cause an increased fuel to air ratio in the engine 26 and as such the engine 26 would be provided with a fuel-air mixture that is too rich. As such, the engine 26 may not perform optimally.

Too much of a decrease in back pressure at high engine speed, all other things being equal, would also lead to an increase in the fuel to air ratio. When back pressure is too low, pressure waves created by the exhaust pipe 202 (which aid creating a trapping effect to maintain air in a two-stroke engine) could be mistimed, and the combustion chambers of the engine 26 are emptied of more air than optimally would occur. In such a case, the engine 26 would again end up with a richer fuel-air mixture (receiving the same amount of fuel with less air). Once again the engine 26 may not perform optimally.

Supplying a Fuel-Air Mixture

Figure 24:
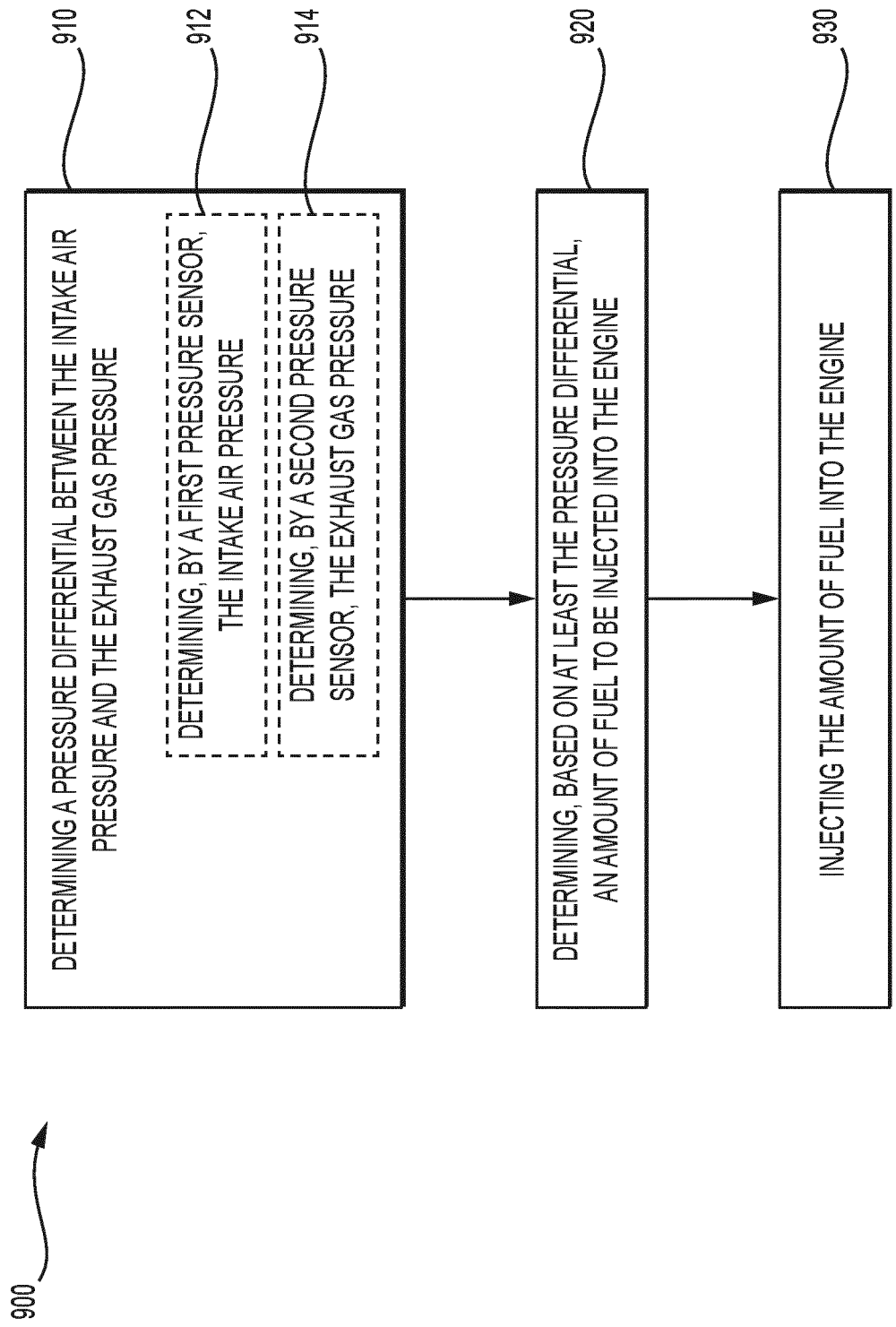
FIG. 24 is a flowchart illustrating a method according to the present technology for providing a fuel-air mixture to the engine of FIG. 2.

With reference to FIGS. 24 and 33, a method 900 of supplying a fuel-air mixture in the engine 26 of the snowmobile 10 will now be described.

The method 900 begins at step 910 with determining a pressure differential between an intake air pressure of air flowing toward the engine 26 and an exhaust gas pressure of exhaust gas flowing out of the engine 26. This pressure differential, as mentioned above with respect to the dynamic regime, generally correlates with the back pressure in the engine 26. The pressure differential is determined by comparing, by the system controller 500, measurements taken from the air intake pressure sensor 504 and the exhaust pressure sensor 590. In some implementations, it is contemplated that the snowmobile 10 could include a differential sensor for determining the pressure differential in a single measurement.

In some implementations of the method 900, the pressure differential is determined in two steps. Specifically, by determining the intake air pressure, by the air intake pressure sensor 504, at sub-step 912. Then the method 900 continues with determining the exhaust gas pressure, by the exhaust pressure sensor 590, at sub-step 914. Depending on the specific implementation, the steps 912, 914 could be performed in any order, or simultaneously.

Figure 34:
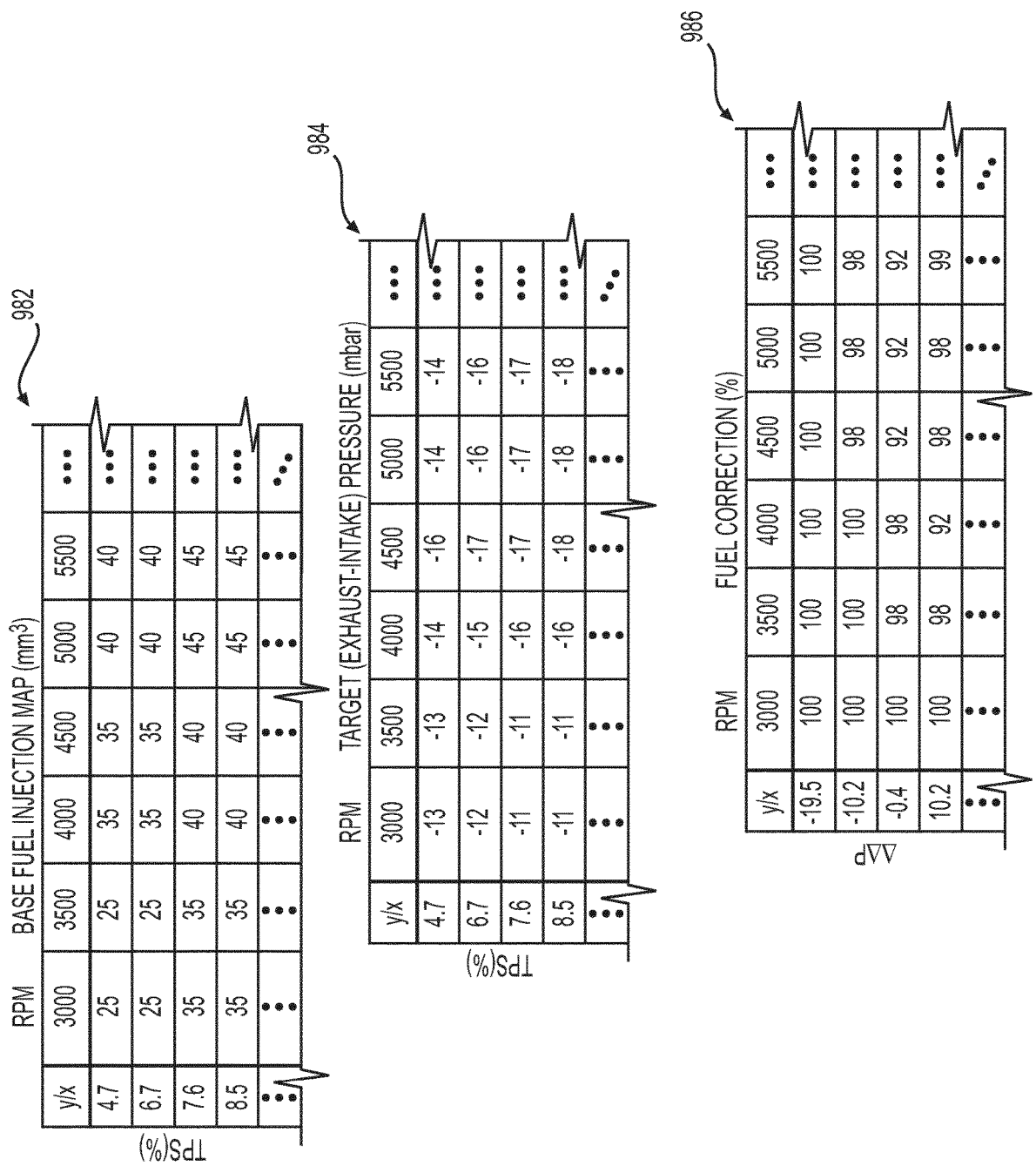
FIG. 34 illustrates example datasets used in the method of FIG. 24.

The method 900 continues, at step 920, with determining an amount of fuel to be injected into the engine 26 based on at least the pressure differential (as determined in step 910). The system controller 500 calculates the amount of fuel to be injected, such that the fuel-air mixture is maintained at an appropriate value, based at least on the backpressure in the engine 26. It is contemplated that another computing system could be included to manage the determination of the amount of fuel to be injected, rather than the system controller 500. A base fuel injection quantity is determined by using a dataset relating an amount of fuel to be injected corresponding to the current TPS and RPM. An example base fuel injection dataset 982 is shown in FIG. 34 where the base fuel injection is indicated as a volume, in this example in $mm^3$.

In some implementations, the base fuel injection quantity could be modified according to the back pressure as follows. A target back pressure (the exhaust pressure less the intake pressure) is determined from a dataset of TPS and RPM, such as in the example dataset 984. The actual back pressure is obtained from the exhaust pressure minus the intake pressure using the exhaust pressure sensor 590 and the intake pressure sensor 504 respectively.

A fuel correction quantity or percentage would then be obtained from a fuel correction dataset 986 of RPM and the difference between the actual back pressure and the target back pressure (identified as AAP). The fuel correction from this dataset 986 would then be applied to the base fuel injection quantity to determine a final injection quantity, modified according to the measured back pressure.

The method 900 then terminates, at step 930, with injecting the amount of fuel (as determined in step 920) into the engine 26. The fuel is injected by the fuel injectors 41, as is described above.

It is contemplated that in some implementations, the method 900 could recommence after step 930. In some implementations, the method 900 could continue beyond step 930 with determining a changed pressure differential. The method 900 could then continue with determining a revised amount of fuel based on the changed pressure differential. This implementation of the method 900 could then terminate with injecting the revised amount of fuel into the engine 26.

In some implementations, the method 900 could include determining that the pressure differential has increased, determining a reduced amount of fuel to be injected, and injecting the reduced amount of fuel into the engine 26. In some implementations, the method 900 could also include determining that the pressure differential has decreased, determining a reduced amount of fuel to be injected, and injecting the reduced amount of fuel into the engine 26.

In some implementations, the method 900 repeats following step 930, at some predetermined time interval, to readjust the fuel-air mixture in order to compensate for changes in the back pressure. In some implementations, the method 900 could be performed by the system controller 500 intermittently during operation of the snowmobile 10. It is also contemplated that that method 900 could be performed only once or only a few times during operation of the snowmobile. It is further contemplated that the method 900 could be performed in response to the pressure differential and/or the intake or exhaust pressures passing a predetermined threshold.

In some implementations, the method 900 could further include determining the engine speed, and the determining the amount of fuel to be injected is also based on the engine speed. In some implementations, the method 900 could further include determining the throttle position of the throttle valve 39, and the determining the amount of fuel to be injected is further based on the throttle position.

It is further contemplated that additional variables could be taken into account when determining or calculating the amount of fuel to be injected, in addition to the pressure differential. These could include, but are not limited to: engine speed (rpm), the throttle position, the air temperature, ambient barometric pressure, close loop wide band lambda control, and temperature of the exhaust gas.

It is contemplated that the method 900 could include additional or different steps, either to perform additional functions and/or to perform the steps described above. It is also contemplated that the steps could be performed in an assortment of different sequences, depending on the specific implementation.

Temperature Management

With reference to FIGS. 37 through 43, as well as FIG. 4, components and methods for managing engine air intake temperature for air entering the engine 26 of the snowmobile 10 will now be described.

Air which is compressed by the compressor 310 of the turbocharger 300 and supplied to the engine 26 generally follows the intake air flow path 444, which is described above and illustrated schematically in FIG. 42. Briefly, air from the atmosphere surrounding the snowmobile 10 flows through the side apertures 113 of the chassis 16 and into the secondary airbox 110. The conduit portion 117 of the Y-shaped conduit 118 fluidly connects at one end to the secondary airbox 110 and to the compressor inlet 312 of the compressor 310 at the other end. The air entering the inlet 312 is then compressed by the compressor 310. The compressed air then flows out of the compressor outlet 314 and into the conduit 316. Air thus flows through one end of the conduit 316 fluidly connected to the compressor outlet 314 and into to the primary air box 120 through the other end of the conduit 316. Air then flows from the primary airbox 120 into the engine 26 via the two air outlets 122 fluidly connected to the engine air inlets 27 (depicted in FIG. 4 and shown schematically in FIG. 42).

In the process of compressing the air in the compressor 310, the temperature of the air to be sent to the engine 26 can increase. In order to manage the temperature of intake air, the snowmobile 10 includes a coolant container assembly 450 for selectively holding and delivering cooling liquid to the intake air flow path 444.

Figure 38:
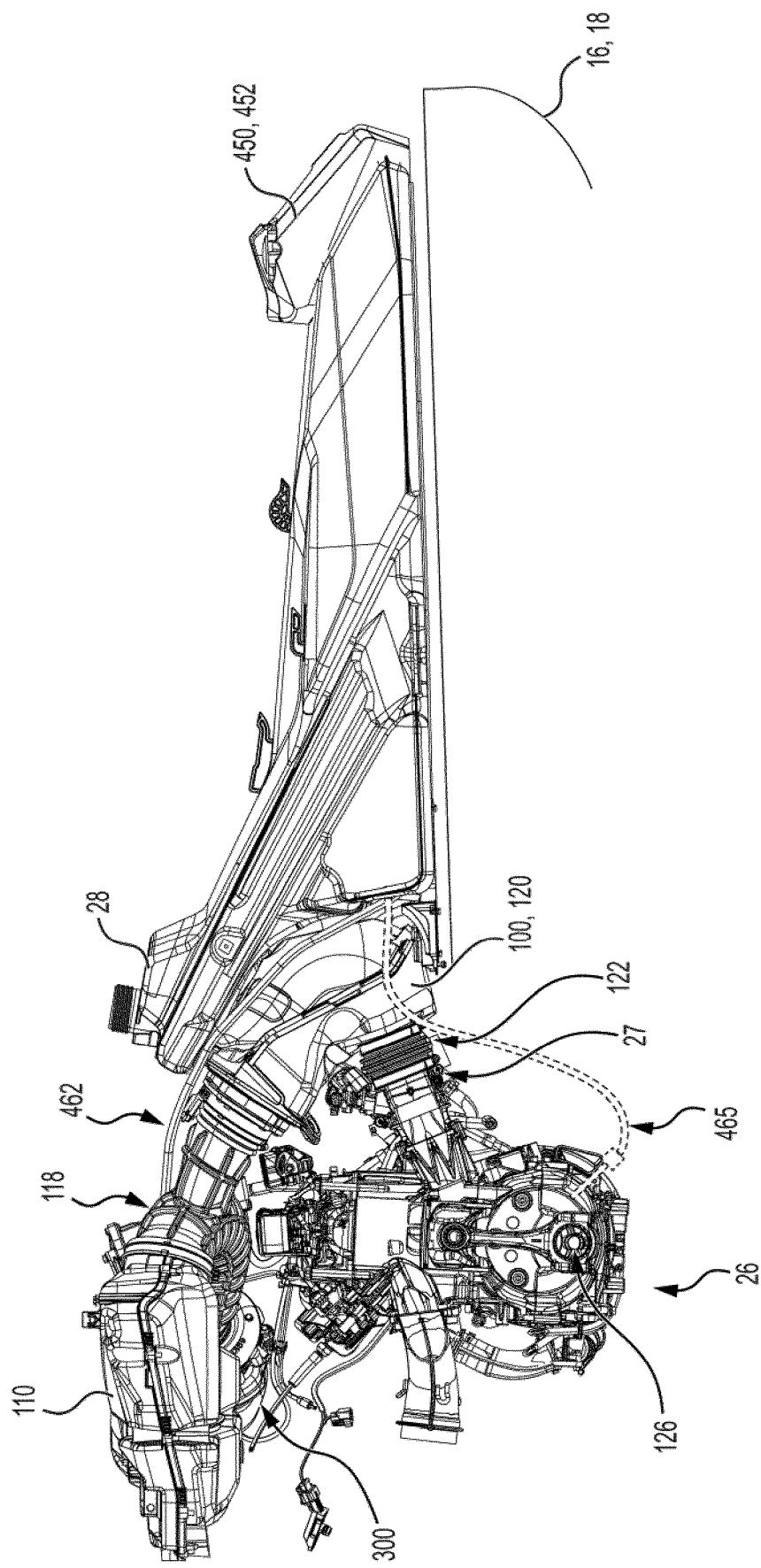
FIG. 38 is a left side elevation view of the vehicle portions of FIG. 37.
Figure 39:
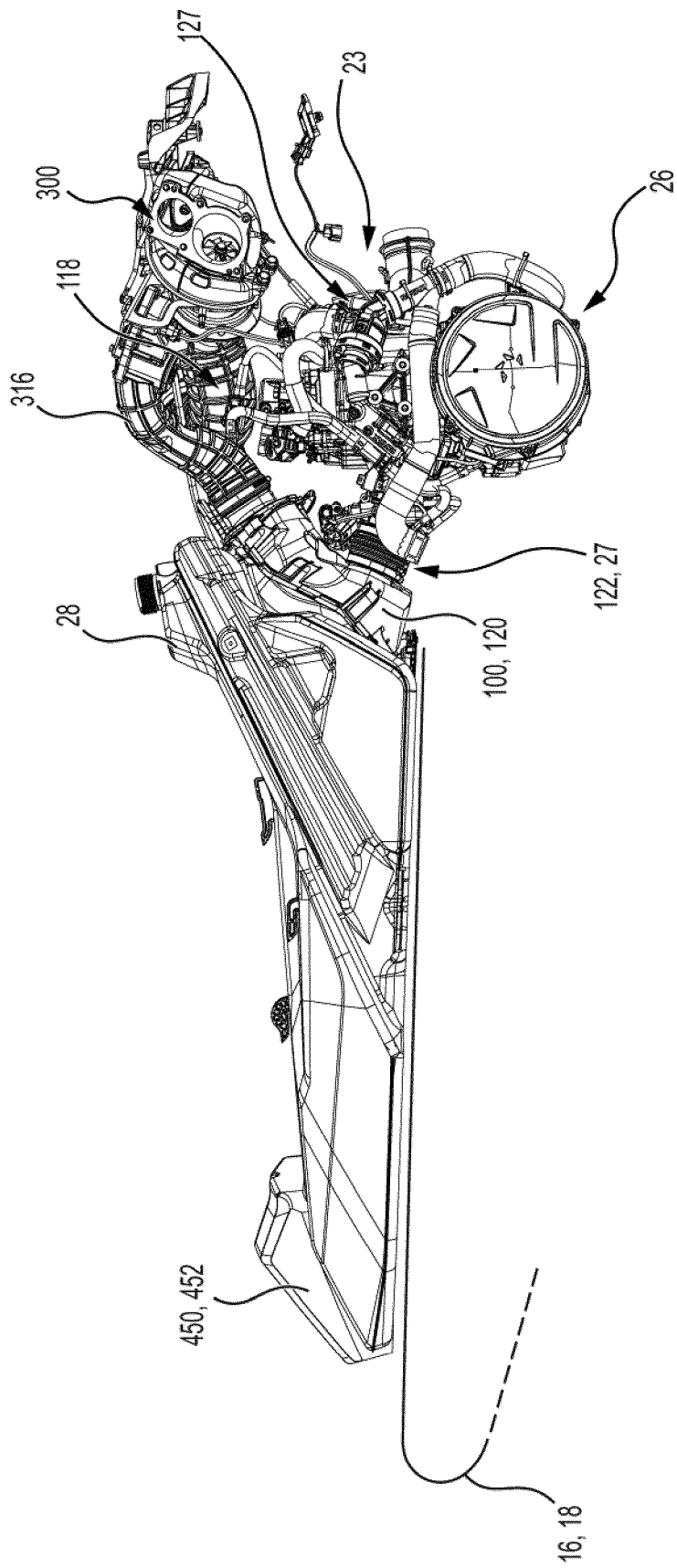
FIG. 39 is a right side elevation view of the vehicle portions of FIG. 37.
Figure 40:
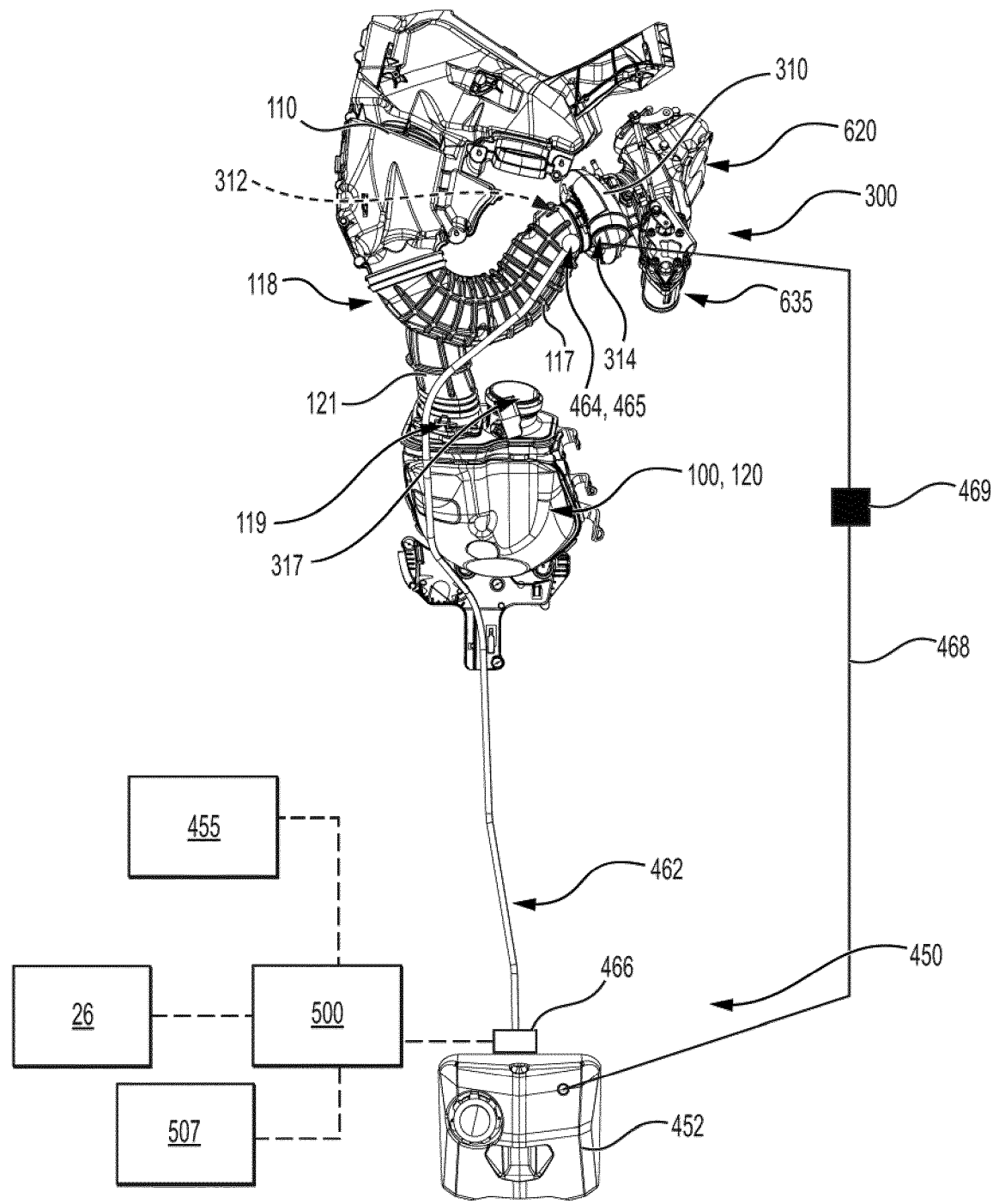
FIG. 40 is a top plan view of portions of the air intake system and the coolant system of FIG. 37.
Figure 41:
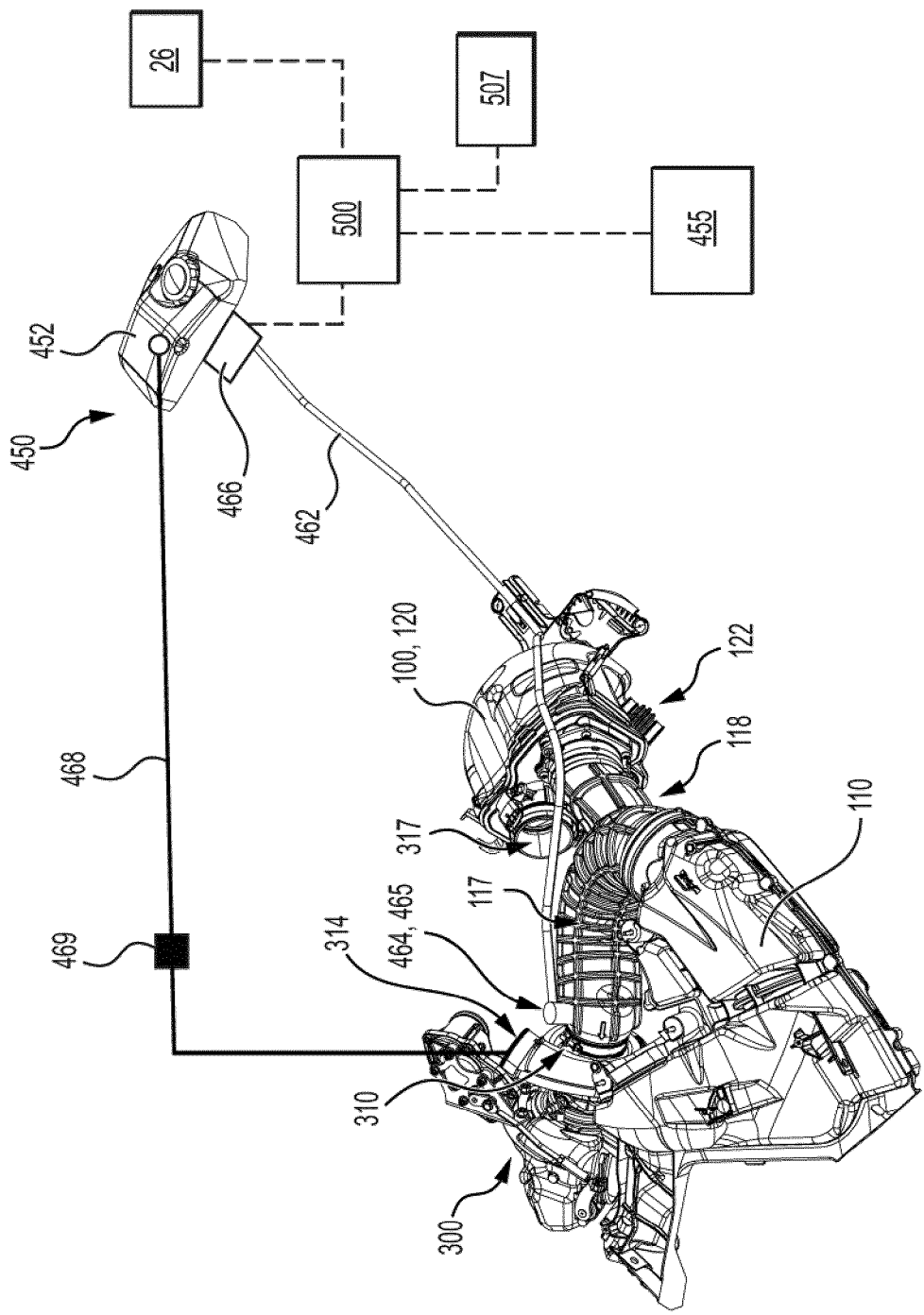
FIG. 41 is a top, front, left side perspective view of the air intake system and coolant system portions of FIG. 40.

The coolant container assembly 520 includes a coolant container 452 supported by the frame 16, specifically by the tunnel 18 (shown schematically in FIGS. 38 and 39). The container 452 is disposed immediately rearward of the fuel tank 28 in a space formed by the fuel tank 28, although in some implementations the container 452 could be located elsewhere.

The coolant container 452, when in use, holds approximately 2 liters of a water-ethanol mix. Depending on the implementation, the coolant container 452 could have a larger or smaller volume. The size of the coolant container 452 for a given implementation is generally adapted for an intended use of the specific vehicle 10. For example, implementations of the snowmobile 10 meant to be utilized in mountainous conditions could be provided with a different size coolant container 452 than an implementation of the snowmobile 10 meant for use on standard trails. While continuously providing cooling liquid to the intake air flow path 444 from the coolant container 452 would also aid in managing the intake air temperature, this would require a large tank of cooling liquid. In the present technology, a smaller container 452 is instead provided to limit the volume and weight, and the cooling liquid is only selectively delivered to the intake air flow path 444 (described in more detail below).

The particular cooling liquid used could also depend on different implementations of the snowmobile 10, or from one set of operating conditions to another for any particular vehicle. Various cooling liquids could be used, including but not limited to: water, ethanol, isopropanol, ethylene glycol, methanol, and combinations thereof. In some implementations, the coolant container 452 could also include a liquid level sensor for sensing a level of the cooling liquid in the coolant container 452. In some cases, the liquid level sensor could be connected to a cooling liquid gauge on display for the user. In some cases, an alert could be communicated to the user that the cooling liquid in the coolant container 452 has fallen below some threshold level.

A coolant tube 462 is fluidly connected to the coolant container 452 for delivering the cooling liquid from the coolant container 452 to the intake air flow path 444. Specifically, coolant tube 462 fluidly connects between the coolant container 452 and the intake air flow path 444 at a connection point 464. In the illustrated implementation, the connection point 464 is on the conduit 117 for delivering cooling liquid to the intake air flow path 444 upstream of the compressor 310. At the connection point 464 on the conduit 117 there is an injection nozzle 465 fluidly connected to the coolant tube 462 and directed into the conduit 117 for delivering the cooling liquid therein. In the present implementation, the coolant tube 462 passes under the fuel tank 28. It is contemplated that the coolant tube 462 could be differently arranged within the snowmobile 10 depending on particular details of a given implementation.

Depending on the particular implementation, the connection point 464 and the injection nozzle 465 could be located elsewhere. In some implementations, the connection point 464 could be located on the conduit 316, as is illustrated schematically by an alternative path of a coolant tube 471 of FIG. 42. In other implementations, the connection point 464 could be located in the compressor inlet 312, illustrated schematically by an alternative coolant tube 473 of FIG. 42. In other implementations, the connection point 464 could be located in a crankcase of the engine 26, where intake air passes prior to entering combustion chambers of the engine 26. In such an implementation (illustrated schematically by an alternative coolant tube 465 of FIG. 38), it is also contemplated that some portion of the cooling liquid could also contact pistons 226 of the engine 26 when injected into the crankcase, further aiding in reducing the piston temperature. It is also contemplated that multiple connections points and/or multiple injection nozzles could be included. It is further contemplated that yet other arrangements could be implemented.

With additional reference to FIGS. 44 to 48, another embodiment of a connection point and arrangement with the coolant container 452 is illustrated. In this non-limiting embodiment, the vehicle 10 includes two coolant-injection collars 480 connected to the engine 26 for injecting coolant into the intake air flow path 444 as described above.

Each coolant-injection collar 480 is connected to the engine 26 between one of the throttle valves 39 of the throttle body 37 and one of the engine air inlets 27, upstream from the corresponding reed valve 227. The intake air flow path 444 passes through an aperture 485 defined by each collar 480. Each collar 480 is formed from rubber, although different materials are contemplated, including for instance resilient plastic. It is also contemplated that the two collars 480 could be integrally formed or connected together.

In order to inject coolant, each collar 480 includes a nozzle 490 fluidly communicating with the aperture 485 for selectively supplying coolant to the intake air flow path 444. As is illustrated in FIG. 48, each nozzle 490 is formed from a tube receiving portion 492 and a collar connecting portion 494. The portions 492, 494 snap fit together, although the particular form of the portions 492, 494 could vary. It is also contemplated that the nozzle 490 could be formed from one integrally connected portion.

Each nozzle 490, specifically the tube receiving portion 492, is connected to a tube 488 for providing coolant to the nozzles 490. Both tubes 488 are connected to a T-fitting 486, the T-fitting 486 being connected in turn to the tube 462 connected to the coolant container 450 as described above.

Figure 44:
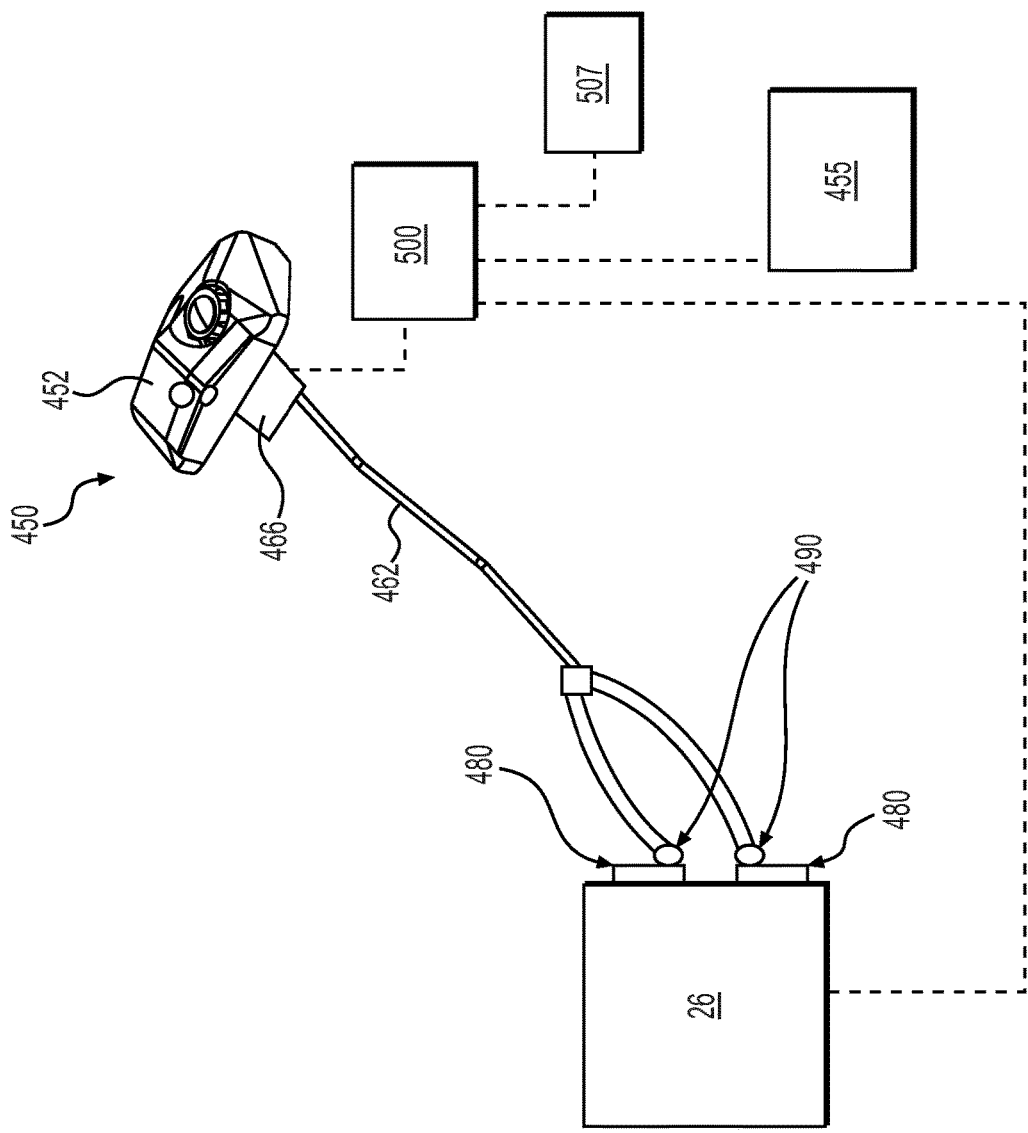
FIG. 44 is a schematic view of the engine, the air intake system of FIG. 40, and another embodiment of a coolant system.
Figure 45:
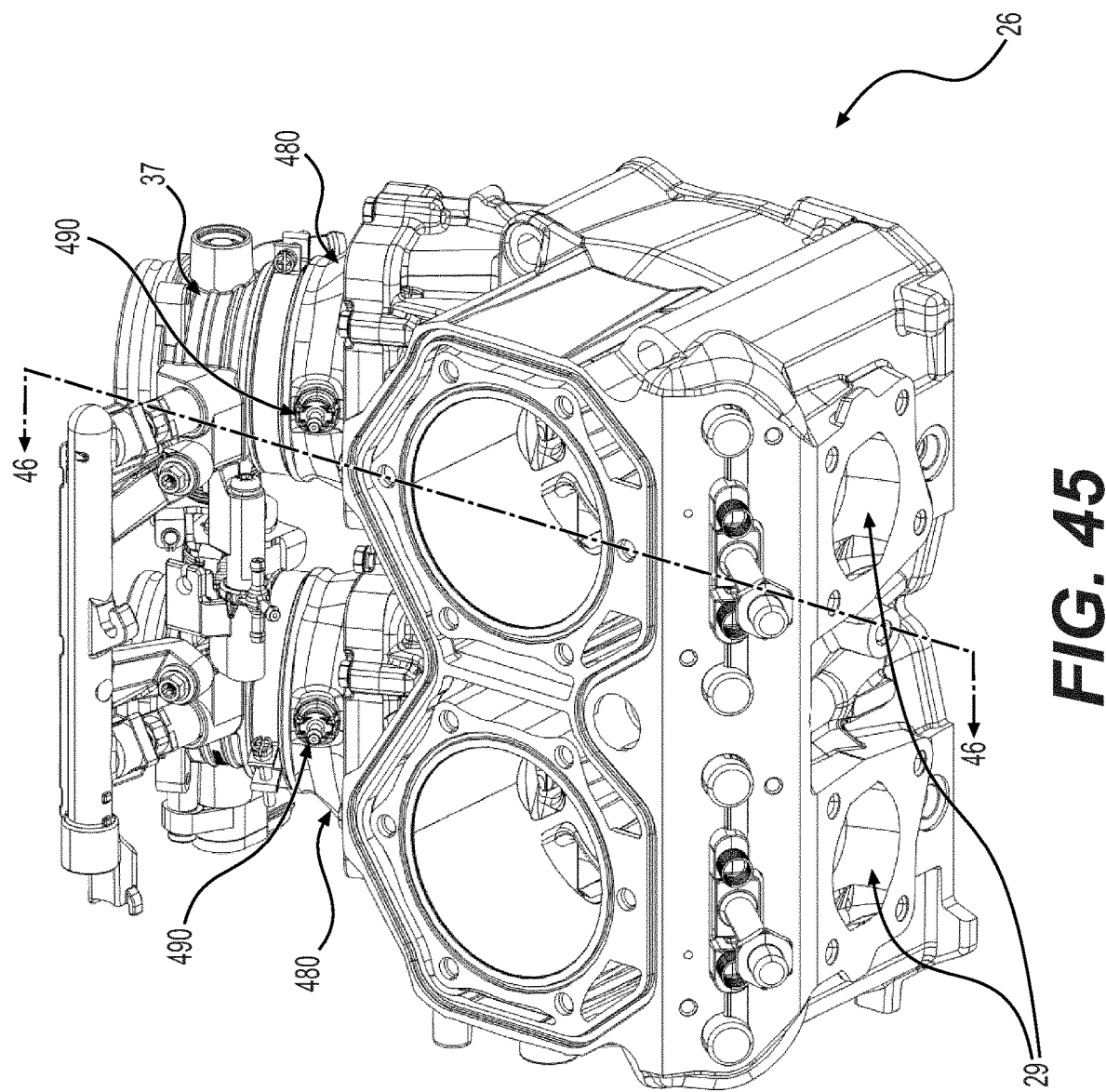
FIG. 45 is a perspective view of portions of the engine of the vehicle of FIG. 1, with coolant-injection collars attached thereto.

Returning to FIGS. 40 to 42 and with continued reference to FIG. 44, the coolant container assembly 450 also includes a solenoid valve 466 disposed and fluidly connected between the coolant container 452 and the coolant tube 462. While the solenoid valve 466 is shown schematically as being connected directly to the coolant container 452, it is contemplated that the valve 466 could be disposed farther from the coolant container 452. For example, additional tubing could connect the valve 466 and the coolant container 452 in some cases, depending on design and space considerations. The solenoid valve 466 selectively controls the flow of the cooling liquid from the coolant container 452 into the tube 462. Controlling the solenoid valve 466 will be described in more detail below. It is contemplated that other types of valves could be used in different implementations. In some implementations, the solenoid valve 466 could be disposed adjacent to or combined with the injection nozzle 465. It is contemplated that the coolant container assembly 450 could include a pump, in addition or in place of the valve 466, fluidly connected to the coolant container 452 for pumping cooling fluid through the coolant tube 462 to the intake air flow path 444.

The snowmobile 10 further includes a pressurization tube 468 for pressurizing the coolant container 452 by fluidly connecting the compressor 310 to the coolant container 452. When the snowmobile 10 is in use, air flows from the compressor 310 to the coolant container 452 via the pressurization tube 468 in order to maintain a certain pressure in the coolant container 452. The pressurization tube 468 includes a pressure regulator 469 in order to prevent over-pressurization, but it is contemplated that other manners for controlling for over-pressurization could be implemented. When the solenoid valve 466 is opened, cooling liquid is forced through the coolant tube 462 by the pressure in the coolant container 452. As such, cooling liquid can be delivered to the intake air flow path 444 from the coolant container 452 without a pump system. As is mentioned above, in some cases the coolant container assembly 450 could include a pump for pumping cooling fluid through the coolant tube 462 to the intake air flow path 444. In such implementations, the pressurization tube 468 could be removed.

The coolant container assembly 450 is communicatively connected with the system controller 500. As is mentioned above, in order to limit the volume and weight added by inclusion of the coolant container, cooling liquid is selectively delivered to the intake air flow path 444. The controller 500 is thus configured to selectively cause of an amount of cooling liquid to flow when an estimated piston temperature of a piston of the engine 26 may be hot enough to risk detonation. Specifically, the controller 500 is configured to selectively cause of an amount of cooling liquid to flow from the coolant container 452 into the intake air flow path 444 via the connection point 464 based on the temperature of fluids in the intake air flow path 444 and/or based on an estimated piston temperature. Determination of the estimated piston temperature and control of the flow of cooling liquid will be described in more detail below. Specifically, the controller 500 is communicatively connected to the solenoid valve 466 for selectively opening the valve 466 to allow cooling liquid to flow from the coolant container 452.

As is described above, the system controller 500 is also operatively and communicatively connected with the engine control unit (or ECU) and/or the electrical system (not shown) of the snowmobile 10 and receives various engine operation values therefrom. While the same system controller 500 described with respect to the above methods and systems of the snowmobile 10 is used in the present implementation, it is contemplated that a separate and/or additional controller could be utilized and communicatively connected with the system controller 500 and/or the ECU.

Engine operation values received or determined by the controller 500 could include, but are not limited to, previous cooling liquid delivery, ambient air temperature, ambient air pressure, throttle position, the engine speed (RPM), engine load, engine run time, oxygen concentration in the exhaust (lambda), engine coolant temperature, position of the exhaust valves 129, and boost pressure. The boost pressure is sensed by the intake pressure sensor 504 communicatively connected with the controller 500 (described in more detail above). Also mentioned above, the system controller 500 is also operatively and communicatively connected to the atmospheric pressure sensor 504 for sensing the atmospheric or ambient air pressure of the intake air, the atmospheric temperature sensor 505 for sensing the atmospheric or ambient air temperature of the intake air, the exhaust oxygen sensor 513 for sensing the exhaust oxygen concentration, and the ECU for retrieving various operating parameters of the engine 26. The system controller 500 is also communicatively connected with the engine coolant temperature sensor 127. The controller 500 could be connected to various other instruments and/or sensors depending on the particular implementation.

In order to monitor temperature of fluids passing through the air intake flow path 444 (either air or a mixture of air and liquids), the snowmobile 10 includes a temperature sensor 455 configured for determining a temperature of fluid in the intake air flow path 444. In the present implementation, the temperature sensor 455 is disposed on the conduit 316 to determine the temperature of fluid entering the engine 26. A portion of the temperature sensor 455 protrudes into an interior of the conduit 316 for sensing the temperature of the fluid therein. It is contemplated that the temperature sensor 455 could be located elsewhere along the intake air flow path 444, including but not limited to: in or on the secondary airbox 110, the conduit 117, the compressor 310, and the primary airbox 120. In implementations where the temperature is measured upstream from the compressor 310 (e.g. in the airbox 110, the conduit 117, etc.), the temperature being determined would be the air temperature before additional heating from the compressor 310. In some implementations, the temperature sensor 455 could measure ambient temperature of air surrounding the snowmobile 10.

Figure 43:
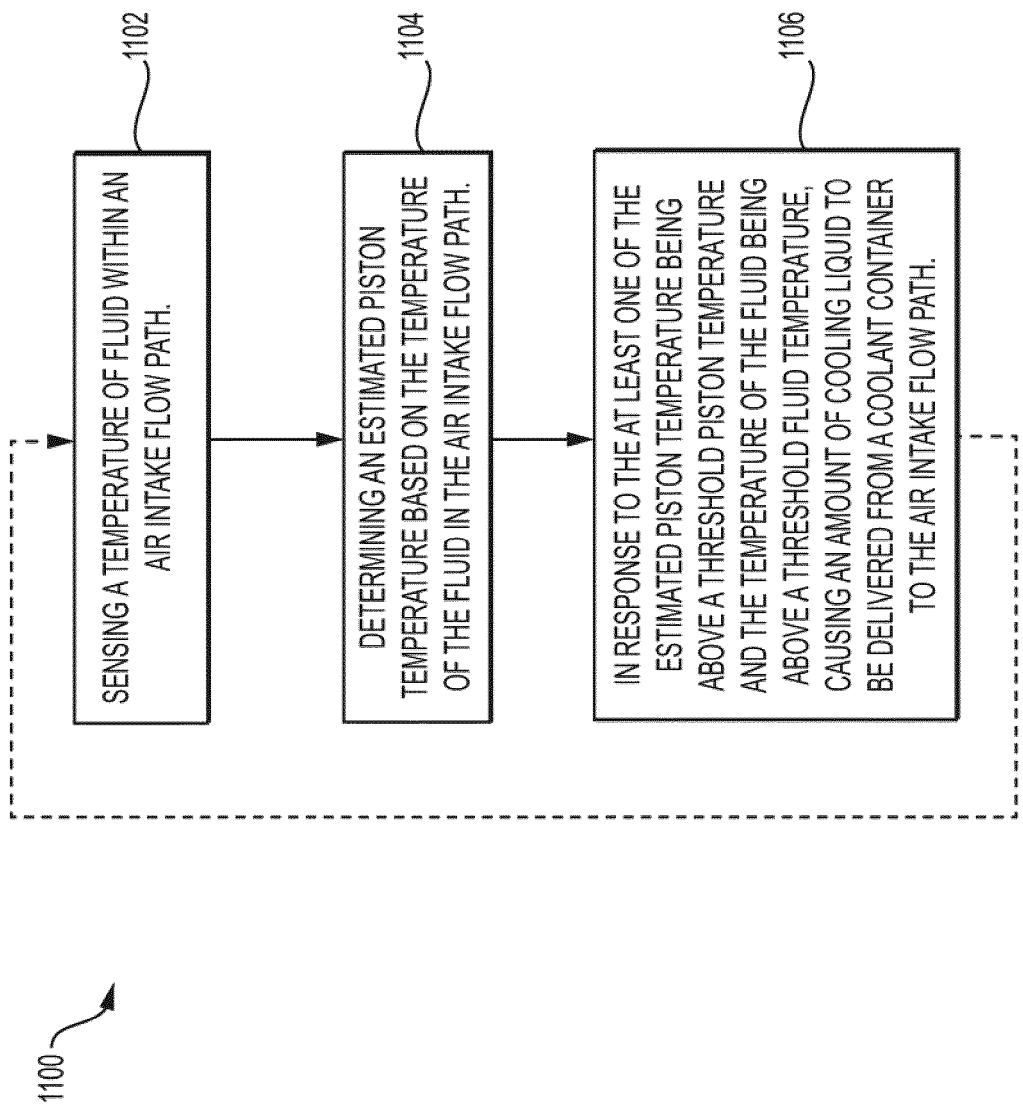
FIG. 43 is a flowchart illustrating a method according to the present technology for operating the air intake system and coolant system of FIG. 37.

With specific reference to FIG. 43, a method 1100 of managing engine air intake temperature to the turbocharged vehicle 10 using the above described elements of the snowmobile 10 will now be described. Generally, the method 1100 includes sensing intake air temperature and determining by the controller 500 the estimated piston temperature of the engine 26. The estimated piston temperature is retrieved from a piston temperature model by the controller 500, based on the temperature of the intake air and/or engine operation values. In response to one or both the temperature of the fluid (generally intake air) and the estimated piston temperature being above a threshold temperature, the controller 500 then causes some amount of cooling liquid to be delivered to the intake air flow path 444 to aid in reducing the intake air temperature (without necessarily reducing boost from the turbocharger 300 and/or reducing engine speed). The threshold temperatures generally correspond to temperatures above which the engine 26 risks detonation, but the threshold could be differently calibrated.

The method 1100 begins at step 1102 with sensing, by the temperature sensor 455, the temperature of the fluid in the intake air flow path 444, the controller 500 receiving the temperature sensed by the sensor 455. The fluid in the intake air flow path 444 is generally the intake air, but can also include moisture and/or cooling liquid in the intake air flow path 444. As the temperature sensor 455 is downstream from the injection nozzle 465 delivering the cooling liquid, the temperature sensor 455 senses the temperature of both the air and remaining cooling liquid in the conduit 316 when cooling liquid is introduced into the intake air flow path 444. When no cooling liquid is present in the intake air flow path 444 and/or in cases where the temperature sensor 455 is upstream from the injection nozzle 465, sensing the fluid in the intake air flow path 444 generally refers to sensing a temperature of the air in the intake air flow path 444.

The method 1100 continues at step 1104 with determining, by the controller 500, an estimated piston temperature based on at least the temperature of the fluid in the air intake flow path 444 sensed at step 1102. Determining the estimated piston temperature includes retrieving, by the controller 500, the estimated piston temperature from a piston temperature model. In the present implementation, the estimated piston temperature model is stored in and accessible via the storage medium 507 communicatively connected with the system controller 500. It is contemplated that the model could be stored in another computer readable medium communicatively connected to the system controller 500, depending on the implementation. In some implementations, one or more tables or databases of piston temperature based on intake air temperature and/or engine operation values could be provided in place of the model.

In some implementations, the method 1100 further includes determining, by the controller 500, at least one engine operation value. As is mentioned above, engine operation values determined or received by the controller 500 can be selected from one or more of: throttle position, engine speed, engine run time, ambient air temperature, previous cooling liquid delivery, and boost pressure. Depending on the implementation, previous cooling liquid delivery can include the specific quantities of cooling liquid previously delivered to the intake air flow path 444, the number of times cooling liquid has previously been delivered to the intake air flow path 444, and/or time elapsed since the most recent delivery of cooling liquid to the intake air flow path 444. In some implementations, determining the estimated piston temperature at step 1104 is further based on retrieving an estimated piston temperature from the model based on one or more of these determined engine operation values. In implementations where the temperature sensor 455 is upstream of the compressor 310, the estimated piston temperature could be further determined based on an anticipated temperature increase due to compression in the compressor 310.

In some implementations or iterations, the method 1100 could omit step 1102 and begin at step 1104 with determining the estimated piston temperature, where the determination is based on one or more engine operation values.

The method 1100 continues at step 1106 with causing, by the controller 500, in response to at least one of the temperature of the fluid sensed at step 1102 being above a threshold fluid temperature or the estimated piston temperature determined at step 1104 being above a threshold piston temperature, an amount of cooling liquid to flow from the coolant container 452.

The threshold piston temperature and threshold fluid temperature values are predetermined values stored to the storage medium 507 and correspond to temperatures above which engine efficiency may be affected, including for example due to engine detonation. In some implementations, the threshold temperatures could be dependent on one or more of the engine operation values, such that the controller 500 further determines one or both of the threshold temperatures prior to determining that the estimated piston temperature and/or the temperature of the fluid are greater than the threshold temperatures.

Specifically, causing the amount of cooling liquid to be delivered at step 1106 includes operating, by the controller 500, the solenoid valve 466 of the coolant container assembly 450 to allow the cooling liquid to flow from the coolant container 452. In some implementations, causing the amount of cooling liquid to be delivered includes operating, by the controller 500, a pump of the coolant container assembly 450 to pump the cooling liquid through the coolant tube 462 from the coolant container 452. In some such implementations, the pump could further be configured to provide pressure in the coolant tube 462 to improve delivery of the cooling liquid to the intake air flow path 444.

The amount of coolant delivered to the intake air flow path 444 is determined by the time the solenoid valve 466 is opened by the controller 500. In the present implementation, the estimated piston temperature being above the threshold piston temperature triggers the controller 500 to release a standard amount of cooling liquid, regardless of the difference between the estimated piston temperature and the threshold piston temperature. In some implementations, the controller 500 could determine the amount of coolant to be delivered depending on the temperature sensed by the sensor 455 and/or the estimated piston temperature.

The method 1100 then generally repeats at step 1102 with sensing anew the temperature of fluid in the intake air flow path 444 and/or at step 1104 with determining a revised estimated piston temperature. Depending on the implementation, the method 1100 generally repeats continuously during operation of the snowmobile such that the controller 500 is managing intake air temperature throughout utilization of the snowmobile. In some cases, the method 1100 could repeat at regular time intervals. In other cases, the method 1100 could be triggered by different operational conditions, such as when the engine speed or throttle position indicate that the engine 26 is being operated in conditions likely to increase the piston temperature.

In some cases, the method 1100 could include sensing that the cooling liquid has been emptied from the coolant container 452 and there is no longer any cooling liquid available for delivery to the intake air flow path 444. In some implementations, the method 1100 could further include communicating a message to the operator of the snowmobile 10 that the coolant container 452 is empty. In some cases, the method 1100 could also include reducing engine load (RPMs) or reduce compressor activity from the turbocharger 300 when the fluid temperature and/or the estimated piston temperature are greater than the threshold temperatures and the coolant container 452 is empty.

It is contemplated that the method 1100 could include additional or different steps, either to perform additional functions and/or to perform the steps described above.

Figure 49:
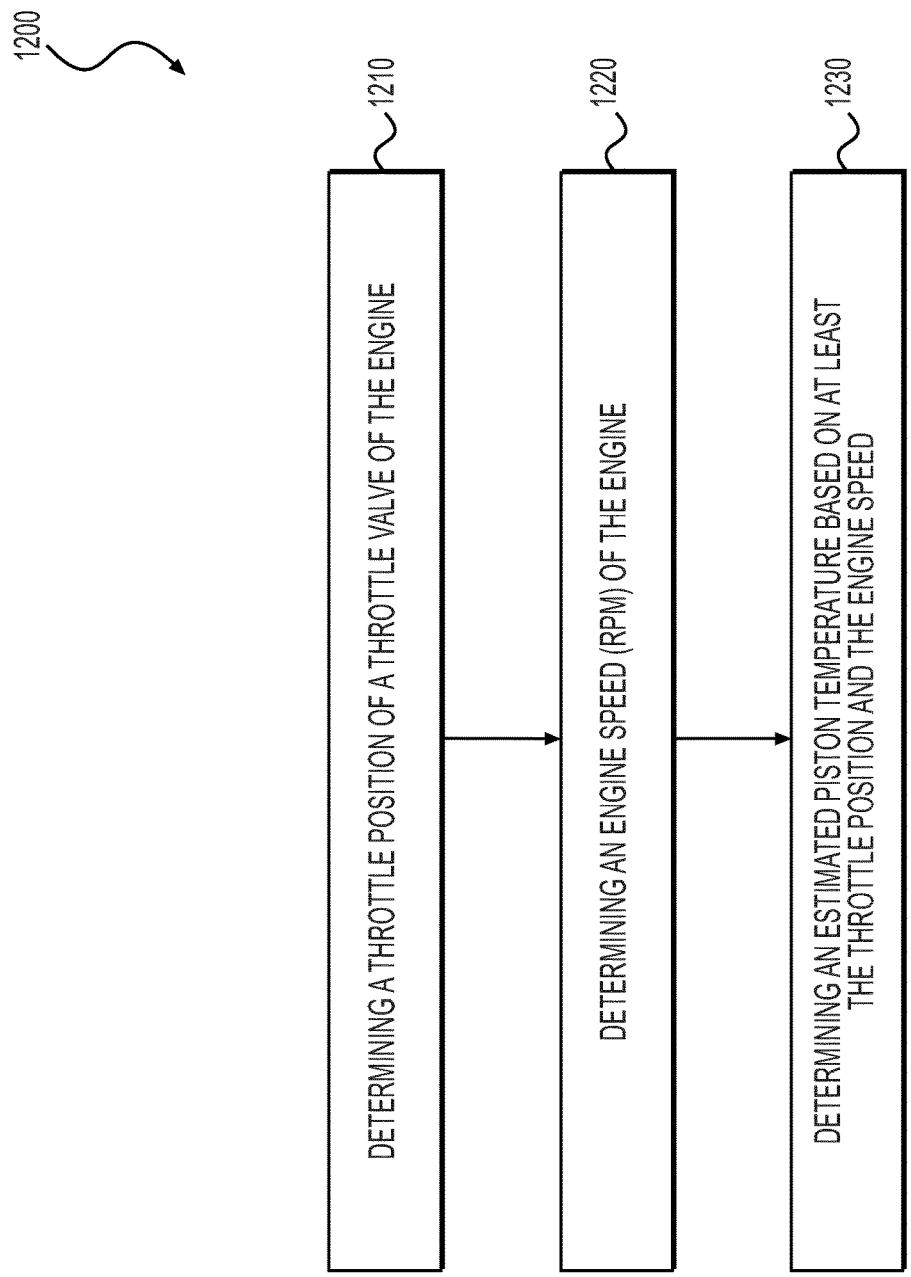
FIG. 49 is a flowchart illustrating a method according to the present technology for managing piston temperature of the engine of the vehicle of FIG. 1.

With specific reference to FIG. 49, a method 1200 of managing piston temperature of the engine 26 of the vehicle 10 using the above described elements of the snowmobile 10 will now be described. Generally, the method 1200 includes determining an estimated steady state piston temperature of the pistons 226 based on the throttle valve position and the engine speed. The estimated piston temperature is retrieved from a piston temperature model by the controller 500, the model being based on the throttle valve position and the engine speed. The estimated piston temperature is then adjusted, where there are changes to engine operation, to determine a non-steady state temperature using on a gradient of temperature change caused by those changes in engine operation parameters.

The method 1200 begins, at step 1210, with determining, by the throttle valve position sensor 588, a throttle valve position of the throttle valves 39 of the engine 26. The method 1200 continues, at step 1220, with determining, by the engine speed sensor 586, an engine speed (RPM) of the engine 26. As is noted above, the throttle valve position sensor 588 and the engine speed sensor 586 are communicatively connected to the controller 500, although it is contemplated that a different computer-implemented device could interact with the sensors 588, 586. For example, the ECU could collect information from the sensors 588, 586 in some embodiments.

Figure 50:
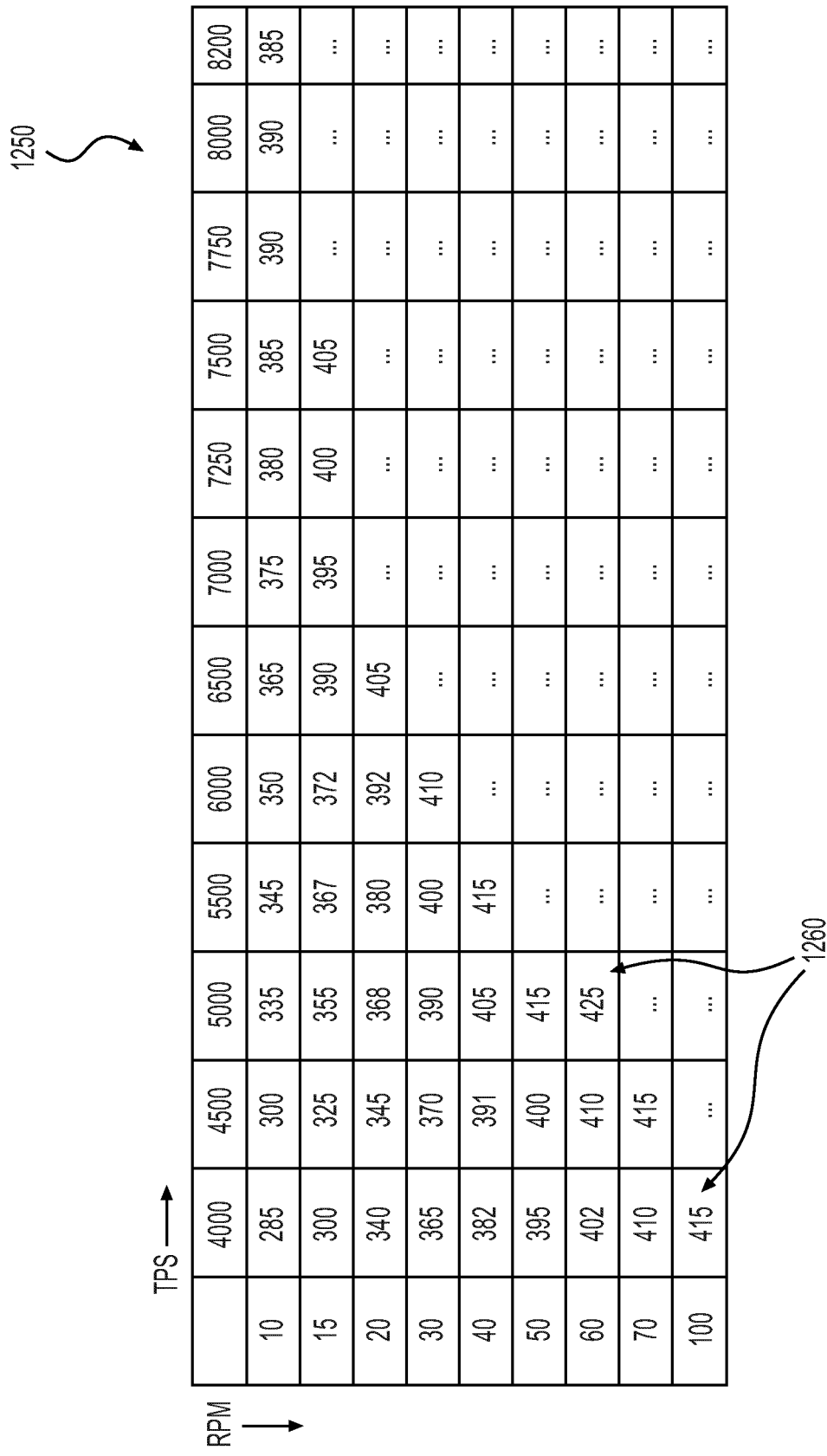
FIG. 50 illustrates an example dataset used in the method of FIG. 49.

The method 1200 then continues, at step 1230, with determining, by the controller 500, an estimated piston temperature based on at least the throttle position and the engine speed. In at least some embodiments, determining the estimated piston temperature based on the throttle position and the engine speed includes retrieving the estimated piston temperature from a temperature model, also referred to as a temperature dataset. The temperature model, such as the non-limiting example model 1250 illustrated in FIG. 50, provides a steady state temperature ($T_S$) 1260 for the pistons 226 based on engine speed and throttle position. It should be noted that the values illustrated in the model 1250 are not meant to be limiting, and the actual values 1260 of the model 1250 will depend on the particular embodiment of the vehicle 10 and/or the engine 26.

In some cases, the temperature model could be a simulated model of predicted piston temperatures based on operating conditions. It is also contemplated that the temperature model could be constructed from a dataset of measured piston temperatures for different operating conditions. In some cases, the temperature model could be a combination of measured temperatures and extrapolated temperatures based on the measured temperatures.

In some embodiments, the method 1200 could then include determining a temperature gradient (dT/dt) based on a calibration equation stored to (or accessible) to the controller 500. The calibration equation (not illustrated) is determined based on calibration tests of the engine 26, where the steady state temperature $T_S$ is compared to an actual measured piston temperature, measured by a piston temperature sensor. The piston temperature sensor is not included in the vehicle 10, but is instead used in calibration testing of each particular embodiment of the engine 26.

Having determined the temperature gradient adjustment the steady state piston temperature, a time duration (t) is then applied to the gradient by the controller 500. A revised estimated piston temperature (T) is then determined based on the steady state temperature $T_S$, the temperature gradient dT/dt, and a repeating time elapsed t of the change inducing the temperature gradient. For example, at time=0 the steady state temperature is determined from the engine parameters as described above. Then, for a time duration t=100 ms, as one non-limiting example, the estimated temperature is adjusted using the gradient multiplied by the time duration. In at least some embodiments, the estimated piston temperature (T) is calculated using a temperature determination relation of:

$$T = T_S + \frac{dT}{dt}t. \quad \text{(Eq. 1)}$$

In at least some embodiments, the relation could be recursive, where the temperature T is readjusted by the gradient change over another time duration added to the previously determined temperature T.

In some embodiments, the method 1200 could include determining an operational temperature gradient based on a change in one or more engine operation values. Depending on the particular embodiment of the vehicle 10, or the implementation of the method 1200, the engine operation values used to revise the estimated piston temperature could include, but are not limited to, one or more of: an ignition timing of the engine, a fuel pressure, a position of the exhaust valve 129, position of the throttle valve 39, a fuel injection timing, a fuel injection quantity, and a boost pressure from the turbocharger 300. In some cases, changes to piston temperature following injection of coolant into the intake air flow path 444 using the systems described above could be included into adjustments to determined piston temperature. By changing one or more of these engine operation parameters, more or less heat could be generated in the engine 26, thereby changing the temperature of the pistons 226 of the engine 26.

In some cases, the method 200 could include the controller 500 detecting the change in the one or more engine operation values. In such a case, the controller 500 could determine a revised estimated piston temperature based on the estimated piston temperature previously determined, as well as the detected change in engine operation value. In some cases, determining the revised estimated piston temperature is further based on a time duration of the change in the one or more engine operation values.

In some embodiments, the method 1200 could further include determining an engine coolant temperature, by the engine coolant temperature sensor 127, and an intake air temperature, by the ambient air temp sensor 505. In some such cases, the method 1200 could then include determining, by the controller 500, a revised piston temperature based on at least the steady state piston temperature or the revised estimated piston temperature T, the engine coolant temperature, and the intake air temperature. In some embodiments, adjustments to the determined piston temperature to determine the revised piston temperature could be based on just one of the engine coolant temperature or the intake air temperature.

In some non-limiting embodiments, the method 1200 could also include determining, by the controller 500, a difference between a desired piston temperature and the estimated piston temperature. In such cases, the method 1200 could then include causing a modification, by the controller 500, to one or more engine operation values of the engine 26. In some embodiments, a magnitude of the modification to the one or more engine operation values could be based at least in part on the difference between the desired piston temperature and the estimated piston temperature.

For example, if the estimated piston temperature, determined using the model 1250 of steady state temperature, is higher than a predetermined threshold operating temperature, the controller 500 could cause a decrease in engine speed in order to aid in decreasing heat created in the engine 26, thereby aiding in decreasing piston temperature. In some embodiments, the method 1200 could include determining a temperature gradient caused by modifying the one or more engine operation values and then determining, based at least on the temperature gradient and the difference between the desired piston temperature and the estimated piston temperature, a time of modification for one or more engine operation value. The controller 500 could then control the engine 26 to modify the one or more engine operation values for the determined time of modification.

In some non-limiting embodiments, the method 1200 further includes, in response to the estimated piston temperature being above a threshold temperature, the controller 500 to cause some amount of cooling liquid to be delivered to the intake air flow path 444 to aid in reducing the intake air temperature (without necessarily reducing boost from the turbocharger 300 and/or changing engine operation values). Reducing the intake air temperature could, in at least some instances, aid in reducing the piston temperature. The threshold temperatures generally correspond to temperatures above which the engine 26 risks detonation, but the threshold could be differently calibrated. In some non-limiting embodiments, the method 1200 could further include, in response to the estimated piston temperature being above a threshold temperature, the controller 500 to cause changes to one or more engine operation parameters.

It is contemplated that the method 1200 could include additional or different steps, either to perform additional functions and/or to perform the steps described above.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A vehicle comprising:
   a frame;
   an engine supported by the frame, the engine having at least one engine air inlet;
   a turbocharger fluidly connected to the engine, the turbocharger including a compressor fluidly connected to the at least one engine air inlet, the compressor having a compressor inlet and a compressor outlet,
   an intake air flow path of the vehicle being defined from air entering the vehicle, passing through the compressor inlet into the compressor, passing out of the compressor through the compressor outlet, and flowing into the at least one engine air inlet;
   a coolant container assembly supported by the frame, the coolant container assembly comprising a coolant container for holding cooling liquid, the coolant container assembly being fluidly connected to the intake air flow path at at least one connection point; and
   a controller communicatively connected with the coolant container assembly,
   at least one coolant-injection collar fluidly connected to the at least one engine air inlet;
   at least one injection nozzle connected to and extending through the at least one coolant-injection collar, the at least one injection nozzle being fluidly connected to the coolant container assembly; and
   wherein:
      the at least one connection point is defined by the at least one nozzle,
      the controller is communicatively connected to the engine; and
      the controller is configured to:
         determine an estimated piston temperature based at least in part on at least one engine operation value received from the engine, and
         selectively cause of an amount of cooling liquid to flow from the coolant container into the intake air flow path via the at least one nozzle based on at least the estimated piston temperature.

2. A vehicle comprising:
   a frame;
   an engine supported by the frame, the engine having an engine air inlet;
   a turbocharger fluidly connected to the engine, the turbocharger including a compressor fluidly connected to the engine air inlet, the compressor having a compressor inlet and a compressor outlet,
   an intake air flow path of the vehicle being defined from air entering the vehicle, passing through the compressor inlet into the compressor, passing out of the compressor through the compressor outlet, and flowing into the engine air inlet;
   a coolant container assembly supported by the frame, the coolant container assembly comprising a coolant container for holding cooling liquid, the coolant container assembly being fluidly connected to the intake air flow path at a connection point;
   a controller communicatively connected with the coolant container assembly; and
   a temperature sensor communicatively connected with the controller, the temperature sensor being configured for determining a temperature of fluid in the intake air flow path;
   the controller being configured to:
      determine an estimated piston temperature based on at least the temperature of fluid determined by the temperature sensor; and
      selectively cause of an amount of cooling liquid to flow from the coolant container into the intake air flow path via the connection point based on at least the temperature of fluid determined by the temperature sensor, and the estimated piston temperature.

3. The vehicle of claim 2, wherein:
   the controller is communicatively connected to the engine; and
   the controller is further configured to determine the estimated piston temperature based at least in part on at least one engine operation value received from the engine.

4. The vehicle of claim 2, further comprising:
   a first conduit fluidly connected to the compressor inlet at a first end, a second end of the first conduit receiving air from air surrounding the vehicle; and
   wherein the connection point is located on the first conduit.

5. The vehicle of claim 2, further comprising:
   a second conduit fluidly connected to the compressor outlet at a first end, a second end of the second conduit being fluidly connected to the engine air inlet; and
   wherein the connection point is located on the second conduit.

6. The vehicle of claim 2, wherein the connection point is disposed in the compressor inlet.

7. The vehicle of claim 2, further comprising a coolant tube for delivering cooling fluid to the intake air flow path, the coolant tube being fluidly connected between the coolant container and the connection point.

8. The vehicle of claim 7, further comprising a fuel reservoir supported by the frame; and
   wherein the coolant container is disposed rearward of the fuel reservoir.

9. The vehicle of claim 7, wherein the coolant container assembly further comprises a pump fluidly connected to the coolant container for pumping cooling fluid through the coolant tube.

10. The vehicle of claim 7, wherein the coolant container assembly further comprises a valve for controlling flow of cooling liquid, the valve being disposed between the coolant container and the coolant tube, the valve being communicatively connected to the controller.

11. The vehicle of claim 10, wherein:
    the compressor is fluidly connected to the coolant container; and
    when the vehicle is in use, air flows from the compressor to the coolant container to pressurize the coolant container.

12. The vehicle of claim 7, wherein a first end of the coolant tube is fluidly connected to the coolant container; and
    further comprising an injection nozzle connected to a second end of the coolant tube.

13. The vehicle of claim 2, wherein the temperature sensor is configured to sense the temperature of fluid in the air intake flow path prior to passing through the compressor.

14. The vehicle of claim 2, wherein the temperature sensor is configured to sense the temperature of fluid having passed through the compressor.

15. The vehicle of claim 2, wherein the connection point is disposed on a crankcase of the engine.

16. A vehicle comprising:
a frame;
an engine supported by the frame, the engine having an engine air inlet;
a turbocharger fluidly connected to the engine, the turbocharger including a compressor fluidly connected to the engine air inlet, the compressor having a compressor inlet and a compressor outlet;
a first conduit fluidly connected to the compressor inlet at a first end, a second end of the first conduit receiving air entering the vehicle;
a second conduit fluidly connected to the compressor outlet at a first end, a second end of the second conduit being fluidly connected to the engine air inlet,
an intake air flow path being defined from air entering the vehicle, passing through the first conduit, into the compressor inlet, through the compressor, out of the compressor outlet, through the second conduit, and into the engine air inlet;
a coolant container assembly supported by the frame, the coolant container assembly comprising a coolant container for holding cooling liquid, the coolant container assembly being fluidly connected to the intake air flow path at a connection point; and
a controller communicatively connected with the coolant container assembly, the controller being configured to selectively cause an amount of cooling liquid to flow from the coolant container into the intake air flow path via the connection point based on an estimated piston temperature determined by the controller.

17. The vehicle of claim 16, further comprising:
a primary airbox fluidly connected between the second end of the second conduit and the engine air inlet; and
a secondary airbox fluidly connected to second end of the first conduit, the secondary airbox being configured to conduct surrounding air into the vehicle.

18. The vehicle of claim 16, further comprising a fuel reservoir supported by the frame; and
wherein the coolant container is disposed rearward of the fuel reservoir.

19. The vehicle of claim 16, further comprising a coolant tube for delivering cooling fluid to the intake air flow path, the coolant tube being fluidly connected between the coolant container and the connection point.

20. The vehicle of claim 19, wherein the coolant container assembly further comprises a pump fluidly connected to the coolant container for pumping cooling fluid through the coolant tube.

21. The vehicle of claim 19, wherein the coolant container assembly further comprises a valve for controlling flow of cooling liquid, the valve being disposed between the coolant container and the coolant tube, the valve being communicatively connected to the controller.

22. The vehicle of claim 21, wherein:
the compressor is fluidly connected to the coolant container; and
when the vehicle is in use, air flows from the compressor to the coolant container to pressurize the coolant container.

23. The vehicle of claim 19, wherein a first end of the coolant tube is fluidly connected to the coolant container; and
further comprising an injection nozzle connected to a second end of the coolant tube.

* * * * *

UNITED STATES PATENT AND TRADEMARK OFFICE
CERTIFICATE OF CORRECTION

PATENT NO. : 12,146,448 B2
APPLICATION NO. : 18/019428
DATED : November 19, 2024
INVENTOR(S) : Sebastien Thibault et al.

Page 1 of 1

It is certified that error appears in the above-identified patent and that said Letters Patent is hereby corrected as shown below:

In the Claims

Claim 17, Column 52, Line 6, "connected to second end of the" should read --connected to the second end of the--

Signed and Sealed this
Twenty-third Day of September, 2025

John A. Squires
*Director of the United States Patent and Trademark Office*